United States Patent [19]

Rosenfeld

[11] 4,223,082

[45] Sep. 16, 1980

[54] ULTRASONOGRAPHY

[75] Inventor: Robert B. Rosenfeld, Rochester, N.Y.

[73] Assignee: Eastman Kodak Company, Rochester, N.Y.

[21] Appl. No.: 31,083

[22] Filed: Apr. 18, 1979

Related U.S. Application Data

[63] Continuation-in-part of Ser. No. 770,323, Feb. 18, 1977, abandoned, which is a continuation-in-part of Ser. No. 854,556, Nov. 25, 1977, abandoned.

[51] Int. Cl.$^2$ .................... G03C 5/04; G03C 5/24; G03C 5/26
[52] U.S. Cl. ........................ 430/3; 430/397; 430/406; 430/570; 430/606; 430/541; 430/353
[58] Field of Search ............... 96/27, 4, 76 C, 138, 96/45.2, 119, 27 E, 95; 128/660, 2 V; 204/157.15; 325/310, 311

[56] References Cited

U.S. PATENT DOCUMENTS

| T878,024 | 9/1970 | Goffe et al. ............................ 96/111 |
| 2,319,369 | 5/1943 | Sease et al. ........................... 430/379 |
| 2,627,600 | 2/1953 | Rines ..................................... 96/48 R |
| 2,945,760 | 7/1960 | Ostergaard ........................... 96/50 R |
| 3,551,157 | 12/1970 | Salminen . |
| 3,765,403 | 10/1973 | Brendon . |

FOREIGN PATENT DOCUMENTS

| 2401159 | 7/1974 | Fed. Rep. of Germany ........... 260/430 |
| 1263121 | 2/1972 | United Kingdom . |

OTHER PUBLICATIONS

P. J. Ernst, "Ultrasonography", *Journal of the Accoustical Society of America*, vol. 22, No. 1, pp. 80–83, Jan. 1951–p. 2, line 27 through p. 3, line 3.
Sidkey, "Blackening of the Photo–Emulsion by Ultrasonics", *Acustica*, 1974, vol. 30, No. 5, p. 286.
Gangoli, "Effect of Ultrasonics on Photographic Films", *Journal of the Physical Society of Japan*, vol. 25, No. 5, Nov. 1968, p. 1500–1507.
Chem. Abst. 11151f, vol. 55.
Totani, "On the Mechanism of the Photographic Effect of Ultrasonic Waves in Water", (vol. 1, pp. 45–54, 1955) and On Latent Image Formation by Ultrasonics in Water, (vol. 2, pp. 51–59, 1956), *Bulletin of the Nagoya City University* and Totani et al., *Symposium on Photographic Sensitivity*, vol. 2, Marizen Co., Ltd., Tokyo, 1958, pp. 155–161-p. 5, lines 10 through 19.
Nyborg et al., "Sonically Induced Microstreaming Applied to a Surface Reaction", *Journal of the Accoustical Society of America*, vol. 31, No. 6, pp. 706–711, Jun. 1959–p. 6, lines 17 through 22.
Greguss, "Techniques and Information Content of Sonoholograms", *Journal of Photographic Science*, vol. 14, pp. 329–332, 1966–p. 6, lines 17 through 22.
Bennett, "On the Mechanism of the Photographic Effect of Ultrasonic Waves", *Journal of the Accoustical Society of America*, vol. 25, No. 6, pp. 1149–1151, Nov. 1953–p. 4, line 8 through line 16.
Arkhangel'skii, "Effects of Ultrasound on Exposed and Unexposed Film", (vol. 9, No. 3, pp. 301–302, Jan.–Mar. 1964) and Action of Ultrasound on the Processes of Photographic Development and Fixing, (vol. 12, No. 3, pp. 241–248, Jan.–Mar. 1967), *Soviet Physics–Acoustics*–p. 4, line 17 through line 28.
Pyatnitsakaya et al., "Effect of Ultrasonic Vibrations on Spectrally Sensitized Photographic Elements", *Zhurnal Nauchinoi i Prikladnoi Fotografii i Kinematografii*, vol. 16, No. 1, pp. 48–50, 1950–p. 6, line 31 through p. 7, line 6.

*Primary Examiner*—Mary F. Downey
*Attorney, Agent, or Firm*—Carl O. Thomas

[57] ABSTRACT

A process is disclosed of forming a visible ultrasonographic image in a silver halide photographic element. This is achieved by imagewise exposing the layer to ultrasonic radiation at an intensity and for a duration sufficient to alter the exposure response of the element to electromagnetic radiation, but below that which will produce a latent image in the absence of externally applied electromagnetic radiation. The element is concurrently or subsequently exposed to electromagnetic radiation to produce a latent image therein defined by the imagewise ultrasonic radiation exposure. The element is then photographically processed to produce a visible image corresponding to the latent image.

63 Claims, No Drawings

ULTRASONOGRAPHY

My invention is an improvement of ultrasonography. More specifically, my invention is directed to a process of forming a visible image in a photographic element through the use of imagewise ultrasonic alteration of a photographic layer and conversion of the imagewise ultrasonically induced alteration of the photographic element to a viewable ultrasonographic image.

DEFINITION OF THE TERMS

The term "ultrasonic radiation" is employed in this specification to designate pressure-rarefaction waves differing from sound waves in exhibiting higher frequencies and shorter wavelengths. The term "ultrasonic exposure" is employed to designate exposure to ultrasonic radiation. The production of visible images by means of ultrasonic radiation is referred to as "ultrasonoscopy". The production of a visible record by means of ultrasonic radiation is referred to as "ultrasonography". The instruments for producing ultrasonoscopic images are designated "ultrasonoscopes", and the ultrasonoscopes which produce ultrasonographic images are referred to as "sonographic cameras". Where an image is formed as a primary result of a particular ultrasonic effect, it is referred to as a "direct" ultrasonographic or ultrasonoscopic image. Where the image produced ultrasonically must be converted to another form to be viewed, it is referred to as an "indirect" ultrasonoscopic or ultrasonographic image.

The definition of terms as here presented is believed to be generally consistent with the use of these terms in the art. Specifically, these terms are suggested by P. J. Ernst in the *Journal of the Accoustical Society of America*, Vol. 22, No. 1, in an article entitled "Ultrasonography", pp. 80–83, January 1951.

Additional terms are defined subsequently in the specification.

THE PRIOR STATE OF THE ART

Brendon U.S. Pat. No. 3,765,403, issued Oct. 16, 1973, teaches the application of direct holographic ultrasonoscopy to mammographic examination. The technique suggested by Brendon is to pass focused ultrasonic radiation through a mamma and to observe the wave pattern indirectly as a standing wave pattern on a liquid surface. A photograph, an indirect ultrasonograph, of the standing wave pattern can be made, if desired. In this approach the ultrasonic radiation employed in imaging is entirely removed from the photographic element being exposed.

A number of investigations have been conducted in which ultrasonic radiation has been impinged directly on a conventional photographic element for the purpose of determining if ultrasonic radiation might be used to form a viewable image. It was first reported by Marinesco in the 1930's that ultrasonic irradiation of a photographic element would produce an observable darkening of the element when developed. Marinesco attributed the effect to the direct mechanical action of the ultrasonic radiation on the silver halide grains of the photographic element. Sease et al U.S. Pat. No. 2,319,369, issued May 18, 1943, taught rendering a residual image pattern of silver halide developable by uniform exposure to ultrasonic radiation.

In 1947 Pinoir and Pouradier conducted experiments using ultrasonic radiation to expose a photographic element. Their conclusion was that the darkening of the photographic element when exposed to ultrasonic radiation was attributable to luminescence stimulated by cavitation in the liquid medium in which the photographic element was immersed. Upon lowering the intensity of ultrasonic exposure to below such cavitation levels it was observed that no darkening of the photographic element could be obtained even when the element was immersed in a photographic developer during exposure.

In the early 1950's Ernst, cited above, and Bennett, *Journal of the Accoustical Society of America*, Vol. 25, No. 6, "On the Mechanism of the Photographic Effect of Ultrasonic Waves", pp. 1149–1151, November 1953, reviewed the prior state of the part and reported their independent findings that ultrasonic radiation will directly form latent images within photographic elements under specified conditions, without stimulated luminescence occurring.

Arkhangel'skii, *Soviet Physics-Acoustics*, Vol. 9, No. 3, "Effects of Ultrasound on Exposed and Unexposed Film", pp. 301–302, January–March 1964, and Vol. 12, No. 3, "Action of Ultrasound on the Processes of Photographic Development and Fixing", pp. 241–248, January–March 1967, performed experiments which were essentially corroborative of the conclusions of Pinoir and Pouradier. In addition Arkhangel'skii examined the effects of ultrasonic radiation on photographic elements which had been previously imagewise exposed to electromagnetic radiation and found that even small intensities of ultrasonic radiation could accelerate development.

While a large number of additional investigations in the art might be individually discussed, the above are considered sufficient to illustrate an overall pattern that appears in the art. First, it appears to be established that ultrasonic radiation at high energy levels is capable of rendering a photographic element developable. The most efficient exposure of photographic elements has occurred at high energy levels with cavitation being induced in the liquid medium conducting the ultrasonic radiation. A number of effects resulting from high energy cavitation have been suggested as possible explanations of the photographic effect, such as luminescence, chemical reaction, pressure induced latent image formation, temperature rise and production of an electric field. For illustrative uses of ultrasonic radiation under high energy cavitation conditions in addition to Pinoir et al and Arkhangel'skii, attention is directed to Totani:, *Bulletin of the Nagoya City University*, Vol. 1, "On the Mechanism of the Photographic Effect of Ultrasonic Waves in Water", pp. 45–54 (1955) and Vol. 2, "On Latent Image Formation by Ultrasonic in Water", pp. 51–59 (1956) and Totani et al, *Symposium on Photographic Sensitivity*, Vol. 2, Marizen Co., Ltd., Tokyo (1958) pp. 155–161.

Second, there appears to be agreement that at lower ultrasonic radiation intensity levels, below those required to produce cavitation stimulated luminescence, photographic elements will respond to ultrasonic radiation under certain identified conditions. For example, softening of the silver halide emulsion layer being exposed has been recognized as one approach to achieving a photographic effect below cavitation stimulated luminescence levels. Another approach has been to immerse the photographic element in a photographic developer. However, no matter what stratagem has been employed for ultrasonic exposure below cavitation stimulated luminescence levels, the photographic response has been generally recognized to be markedly inferior to that obtained under higher intensity, cavitating conditions of exposure. Arkhangel'skii particularly illustrated this point by conducting comparable imaging experiments above and below cavitation stimulated luminescence levels and reporting markedly inferior results for the latter.

Third, it has been recognized in the art that ultrasonic radiation can be used to accelerate the development of a photographic element which has already been exposed to electromagnetic radiation. Arkhangel'skii reported uniform exposure to ultrasonic radiation of previously imagewise electromagnetically exposed photographic elements. A similar effect is taught by Ostergaard U.S. Pat. No. 2,945,760, issued July 19, 1960. This is also reported by Nyborg et at, *Journal of the Accoustical Society of America*, Vol. 31, No. 6, "Sonically Induced Microstreaming Applied to a Surface Reaction", pp. 706–711, June 1959. The opposite approach, first light fogging a photographic element and then imagewise ultrasonically exposing it to accelerate development selectively is reported by Greguss, *Journal of Photographic Science*, Vol. 14, "Techniques and Information Content of Sonoholograms", pp. 329–322, (1966).

It has been generally known that ultrasonics is a useful tool in preparing and handling various materials, quite apart from any imaging effect. Uniformly applied ultrasonic radiation has been reported to be useful in various aspects of making and working with photographic materials and elements. For example, Salminen U.S. Pat. No. 3,551,157, issued Dec. 29, 1970, teaches the use of ultrasonics to dissolve a photographic coupler in a high boiling solvent. Pyatnitskaya et al, *Zhurnal Nauchinoi i Prikladnoi Fotografii i Kinematografii*, Vol. 16, No. 1, "Effect of Ultrasonic Vibrations on Spectrally Sensitized Photographic Elements", pp. 48–50, (1950) reported improved spectral sensitization of emulsions by uniformly applying ultrasonics at cavitation producing intensities. British Pat. No. 1,263,121, published Feb. 9, 1972, teaches cleaning out areas of photopolymerizable material not electromagnetically exposed through the use of ultrasonics in forming a relief printing image.

BRIEF SUMMARY OF THE INVENTION

My invention is directed to an improvement in ultrasonographic processes wherein a photographic element is employed to receive directly and record ultrasonic image patterns. It is a distinct advantage of my process that it can record imagewise ultrasonic radiation at energy levels substantially below those which have been contemplated heretofore in the art using comparable photographic elements. It is a further specific advantage of my process that it can be applied using ultrasonic radiation levels below those required to cause cavitation stimulated luminescence. It is another advantage of my process that it is suitable for nondestructive testing of materials which can be damaged by elevated intensities and/or prolonged durations of ultrasonic exposure. It is an additional advantage of my process that it can be employed to achieve ultrasonographs more rapidly and with better resolution than has been possible heretofore by impinging ultrasonic image patterns on a photographic element. It is still an additional advantage of my process that it exhibits an ultrasonic exposure reciprocity law departure which can be favorably applied to reduce total ultrasonic energy exposure.

I have discovered that my process of obtaining ultrasonographs can be practiced by employing selected photographic elements, and I have discovered a procedure whereby they may be reliably selected. I have further discovered that photographic elements of types which never have been applied previously to ultrasonography can be employed in the practice of my process. Additionally, I have identified and fabricated photographic elements which are well suited to forming ultrasonographic images according to my process, but which are initially inefficient in recording electromagnetic images. Finally, I have discovered specific process steps and combinations of process steps not contemplated previously in ultrasonographic processes and which produce enhanced ultrasonographic images in photographic elements.

In one aspect, my invention is directed to a process of forming an ultrasonographic image using a silver halide emulsion layer containing photographic element. I imagewise expose the photographic element to ultrasonic radiation at an intensity and for a duration sufficient to alter the exposure response of the electromagnetic radiation, but below that which will produce a latent image in the absence of externally applied electromagnetic radiation. The element is exposed to electromagnetic radiation to produce a latent image therein defined by the ultrasonic radiation exposure, and the element is photographically processed to product a visible image corresponding to the latent image.

In the foregoing process the photographic element is preferably selected from among those which when contacted with the polar solvent exhibit a variance in density of at least 0.1 when exposed to the electromagnetic radiation in accordance with the above-noted electromagnetic exposure process step at selected time periods ranging from 10 seconds to 10 hours following contact with the polar solvent and then photographically processed to produce a visible image in accordance with the above-noted development processing step.

My invention may be better appreciated by reference to the following detailed description of my process considered in conjunction with the drawings, in which FIG. 1 is a photograph of various strips given imagewise ultrasonographic exposures and/or uniform light exposures;

Figure 19:
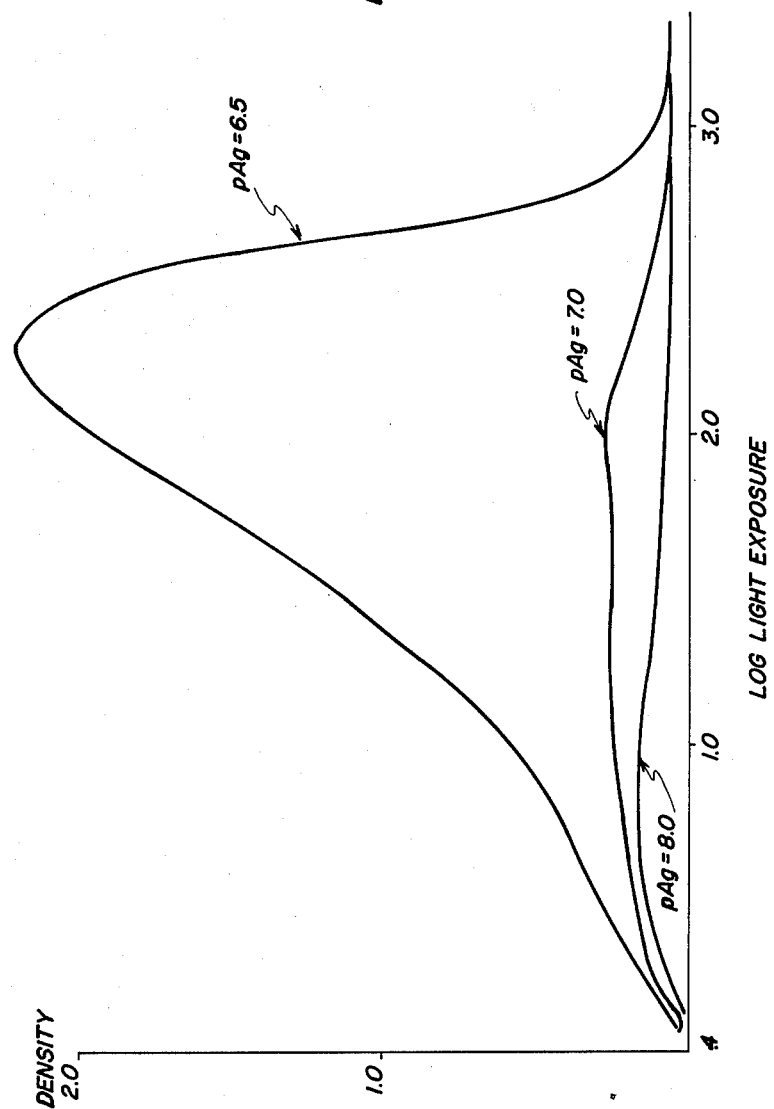
Figure 20:
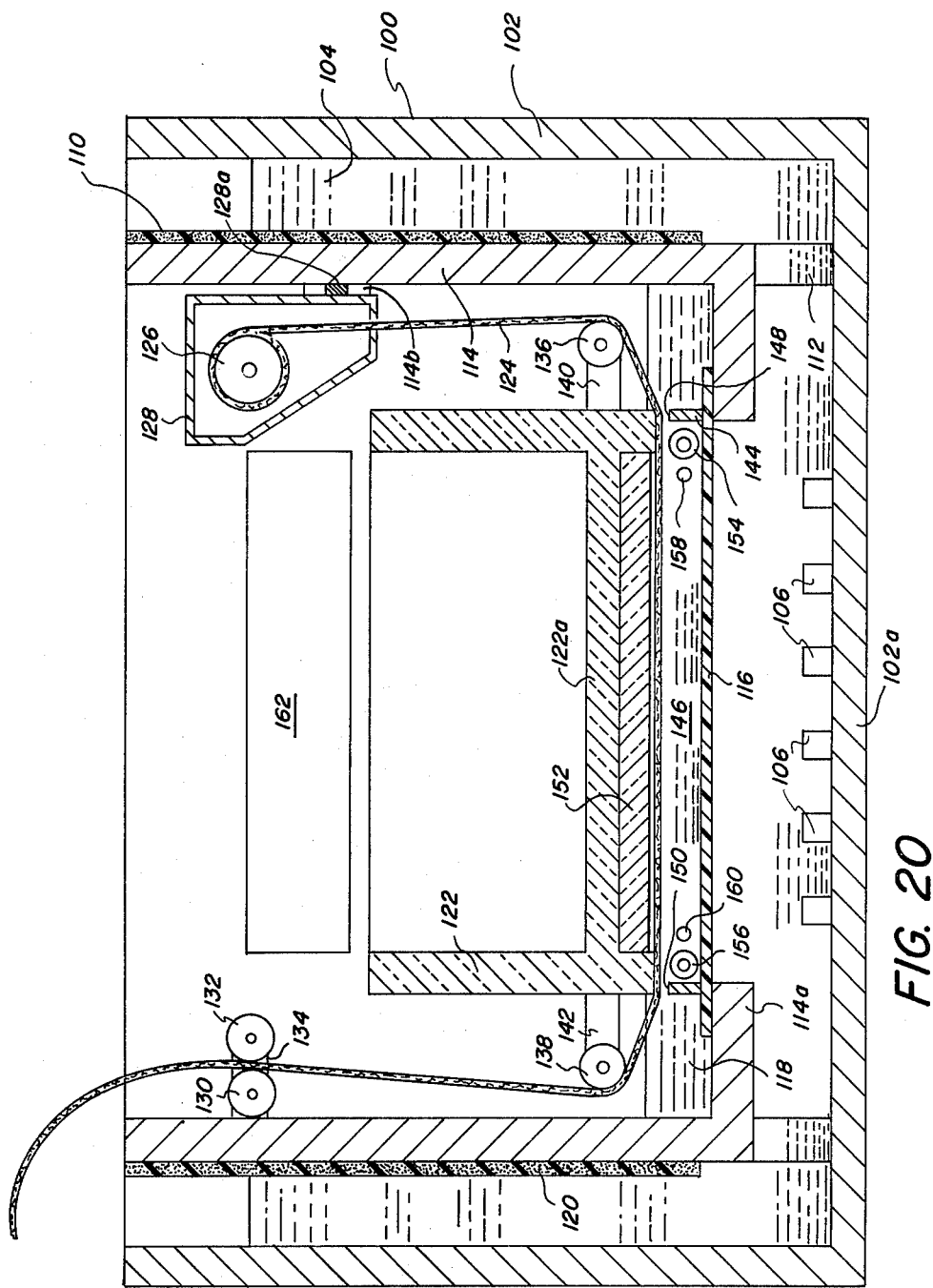
Figure 21:
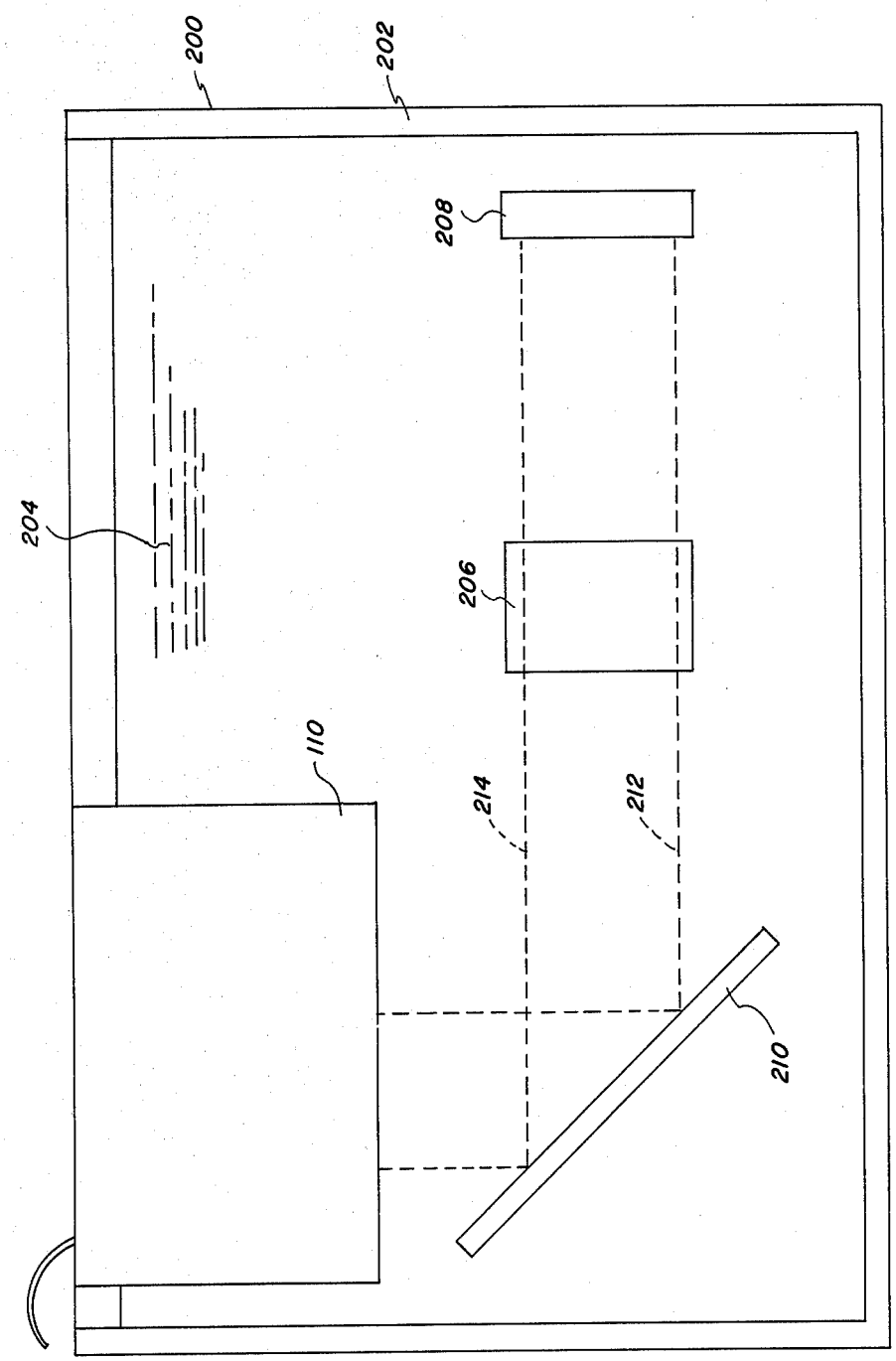

FIG. 19 presents photographic characteristic curves—that is, plots of log light exposure versus density—at differing pAg values;

FIG. 20 is a schematic sectional view of a sonographic sensitometer according to my invention; and FIG. 21 is a schematic sectional view of a sonographic camera according to my invention.

DETAILED DESCRIPTION OF MY INVENTION

While subheadings are provided for convenience, to appreciate fully the elements of my invention it is intended that my disclosure by read and interpreted as a whole.

A PROCEDURE FOR SELECTING PREFERRED ELEMENTS

To form an ultrasonograph according to my process a photographic element is employed having at least one silver halide emulsion layer coated on a support. To identify silver halide photographic elements particularly preferred for use with transport liquids from among conventional photographic elements, a screening technique can be employed. According to this technique a silver halide photographic element is divided into identical samples and contacted with a transport liquid identically as in the practice of my process. The samples are identically treated, except that their periods of contact with the transport liquid are varied from 10 seconds to 10 hours, with intermediate time periods also being selected. During this period the samples are in the dark. At the conclusion of this contact period each sample is given an exposure to light (or other electromagnetic radiation) to be employed subsequently in my process. As will be readily apparent to those skilled in the art, the samples may be exposed to light through a step tablet to aid in selecting the optimum light exposure for a specific photograph element. The samples are thereafter identically photographically processed—e.g., developed in a conventional photographic developer (and optionally further processed)—in accordance with the techniques to be employed subsequently in this process. The photographic element samples which exhibit a difference in density of at least 0.1 as a function of the varied transport liquid contact times are suitable for use in the practice of my process. Although transport media other than liquids can be employed in the practice of my process, this selection procedure is specifically addressed to identifying preferred photographic elements for those forms of this process in which transport liquid contacts at least one silver halide emulsion layer of the photographic element during ultrasound exposure.

The above described selection procedure will identify the overwhelming majority of preferred photographic elements which can be employed with transport liquids in the practice of my process. However, some useful photographic elements may exhibit no change in thier photosensitivity as a function of transport liquid contact time alone. For example, some photographic elements otherwise useful in the practice of my process may not satisfy the selection criteria as described above merely because ultrasonic activation may be necessary. To insure that such photographic elements can be selected for use in this process, it is specifically contemplated, as an optional improvement of the above selection procedure, before or during electromagnetic exposure uniformly ultrasonically exposing the silver halide emulsion layer of the sample being tested to 5.0 watt-sec/cm² of ultrasonic energy over a time period of from between 0.001 to 10 seconds while the sample is in contact with the transport liquid. Preferably ultrasonic exposure is undertaken at or near the completion of the transport liquid contact period with ultrasonic and electromagnetic exposures terminating concurrently. In this way, if a photographic element requires ultrasonic activation to exhibit an alteration in its photosensitivity, it can be recognized as useful in this process.

In both of the above selection procedures, it is preferred for use in my process those photographic elements which exhibit at least a 0.3 variance (most preferably a 0.5 variance) in density as a function of transport liquid contact time. Density differences of 1.0 or more have been observed.

The density difference to be observed in the above selection procedure can take any one of a variety of forms. The photographic sample may initially and after 10 seconds (preferably at least 30 seconds) of contact with the transport liquid exhibit a low density and thereafter show a progressive increase in density until a contact time of 10 hours is reached. More typically, the density can initially be low (less than 1.0, preferably less than 0.5) and remain low for some period of time and then change to a higher plateau for the remainder of the 10 hours association period. Photographic elements which exhibit density differences in the selection procedure as described immediately above undergo silver halide development in ultrasonically exposed areas in the practice of this process and are, for purposes of description, referred to as ultrasonographically negative-working, even though conventional photographic techniques can be employed to reverse the viewable image. Other ultrasonically sensitive photographic elements can exhibit converse properties in which the initial density is the highest observed and the final density is low. These photographic elements will produce images which are opposite in sense to those produced by the ultrasonographically negative-working photographic elements and are referred to as ultrasonographically positive-working. In still other instances a density minimum or maximum may be observed at an intermediate contact time. Photographic elements exhibiting such characteristics can be made to be either ultrasonographically positive- or negative-working merely by selecting the intensity and/or duration of ultrasonic exposure.

Although the above procedure for identifying photographic elements which are preferred for use in practicing this process is a useful one, it is not essential to the practice of invention. Where a particular type of photographic element has been previously used in the practice of this process, the above selection procedure will normally be omitted. The same is true where the photographic element is very closely related to elements already employed. In still other instances, the practice of this process may be undertaken without employing the above selection technique, with the possibility that the photographic element may require routine process adjustments for fully realizing their imaging capabilities being recognized and assumed. Certain specific classes of photographic elements which I have identified to be preferred for use in the practice of this process are discussed below.

THE TRANSPORT MEDIA

To practice my invention a silver halide emulsion layer containing photographic element is located in spaced relation to an ultrasonic transducer and one or a combination of transport fluids are interposed therebetween for the purpose of providing an ultrasonic conduction path. It is specifically contemplated to employ ambient air as a transport medium. In general gases are much less efficient transport media than liquids. Since the photographic elements are responsive to very low ultrasound intensity levels and much higher intensity ultrasound emitters are readily available, the fact that air and other gaseous media attenuate ultrasound does not in itself present an obstacle to the use of gaseous transport media. However, image defining objects placed in the ultrasound radiation path require higher ultrasound intensity exposures in gaseous media than in liquid media because of the higher attenuation. Where higher ultrasound intensities are not objectionable to the object used in imaging, gaseous transport media can be employed. Where it is desired to minimize the intensity of ultrasound incident upon the object being used to define the image pattern of ultrasound exposure, the transport media, at least between the object and the photographic element, is made up of one or more liquids. Since liquids are preferred for use as transport media, subsequent discussion of transport media refers to transport liquids, although it is appreciated that the trnasport media can be chosen from among fluids in general.

The transport liquid path between the photographic element and the ultrasonic energy source can be provided in one of several alternative ways. In perhaps the simplest arrangement a single transport liquid contacts both the ultrasonic transducer and the silver halide emulsion layer of the photographic element. For example, a photographic element consisting of a single silver halide emulsion layer coated on a support can be immersed in a water reservoir also containing the ultrasonic transducer. In a second variant form one transport liquid is coated on or ingested in the photographic element so that it is in contact with the silver halide emulsion layer of the element while a second transport liquid externally contacts the element and the ultrasonic transducer. For example, water can be ingested by a silver halide emulsion layer of a photographic element and the element then immersed in a transport liquid, such as cyclohexane or benzene. In a third variant form one transport liquid is contained in the element in contact with the silver halide emulsion layer and is separated by a liquid impermeable, ultrasound permeable portion of the element from a second transport liquid which contacts only the exterior of the element and the ultrasonic transducer. For example, where the photographic element is an integral image transfer element, processing liquid can be spread from a pod prior to ultrasonic exposure so that it is in contact with the silver halide emulsion layer of the element while another transport liquid contacts a liquid impermeable, ultrasonically conductive cover sheet or support of the element and an ultrasonic transducer. In a fourth variant form one transport liquid contacts the silver halide emulsion layer of the element and an ultrasound permeable, liquid impermeable barrier remote from the element while a second transport liquid contacts the barrier and the ultrasonic transducer. This variant arrangement is illustrated by my preferred apparatus, described below. Additional barriers and/or transport liquids interposed between the ultrasonic transducer and the silver halide emulsion layer of the photographic element are, of course, possible as well as combinations of the variant arrangements described above.

In a preferred form of this process the photographic silver halide emulsion layer or layers to be imagewise exposed contain silver halide grains in contact with a polar solvent acting as a transport liquid. The function of the polar solvent is to provide a medium in which ionic diffusion can occur. To insure a high degree of ionic mobility within the emulsion layer, the photographic element is contacted with polar solvent before ultrasonic exposure. The element can be ultrasonically exposed while it is immersed in a polar solvent reservoir, for example. According to another alternative, the polar solvent can be imbibed into the emulsion layer, and the photographic element removed from the polar solvent reservoir before ultrasonic exposure.

Any conventional technique for contacting the polar solvent with the emulsion layers can, of course, be employed. Instead of immersing the photographic element in a polar solvent reservoir, the photographic element can be sprayed, swabbed, bathed or otherwise analogously contacted with the polar solvent. The photographic element can be contacted with water, for example, by being stored under conditions of high humidity. The polar solvent can be released from a pod of a type employed in image transfer photography. In still another variant form the polar solvent can be encapsulated, coated in the emulsion layer to be exposed and released from encapsulation before ultrasonic exposure to provide contact of the polar solvent and emulsion.

Water is a preferred polar solvent for use in the practice of this process; however, any polar solvent or combination of polar solvents known to be compatible with the photographic elements to be exposed can be employed. Exemplary useful polar solvents in addition to water include water-miscible alcohols, ketones and amides (e.g., acetone, phenol, ethyl alcohol, methyl alcohol, isopropyl alcohol, ethylene glycol, N,N-dimethylformamide, N-methylacetamide, N,N-dimethylacetamide, methyl ethyl ketone), tetrahydrofuran, N-methyl-2-pyrrolidone, dimethylsulfoxide and mixtures of the above, with or without water. Any polar solvent which is compatible with the photographic element and which is sufficiently polar to permit ions, particularly halide ions, silver ions and/or hydrogen ions, to be diffusible therein can be employed in the practice of this process.

While polar solvents are preferred transport liquids for contact with silver halide emulsion layers, particularly those containing a hydrophilic vehicle, such as a hydrophilic colloid (e.g., gelatin or a gelatin derivative), it is recognized that other transport liquids capable of providing a diffusion medium can also be employed. The transport liquid which contacts the silver halide emulsion layer of the photographic element can be any chemically compatible liquid which provides a diffusion path to or from the silver halide grain surfaces for a species capable of altering their electromagnetic exposure response.

Where the transport liquid does not directly contact the photographic element or at least remains out of contact with the silver halide emulsion layer or layers, it is appreciated that it is immaterial whether the transport liquid is or is not a diffusion medium. Such remote or external transport liquids can be chosen from among known ultrasound conducting liquids.

In choosing among otherwise comparable transport liquids, whether they directly contact the silver halide emulsion layer to be exposed or are remote or external, consideration can be given to the ultrasonic absorption coefficient of the transport liquid. Water at an ultrasonic frequency of 5 megahertz and at a temperature of 20° C. has an ultrasonic absorption coefficient of $6 \times 10^{-3}$ cm$^{-1}$. The ultrasonic absorption coefficients for liquids range from about two orders of magnitude higher than that of water to about two orders of magnitude lower than that of water. The advantage to be achieved by a low ultrasonic absorption coefficient is reduced dissipation of ultrasonic energy in the transport liquid. Lower ultrasonic absorption coefficients are particularly preferred for the transport liquids external to the photographic element or remote from the silver halide emulsion layer. It is believed that higher ultrasonic absorption coefficients for transport liquids which contact the silver halide emulsion layers can contribute to improving their response to ultrasound.

Ultrasonic absorption coefficients of transport liquids can be ascertained by reference to published values. For example, values are published by Kinsler and Frey, *Fundamentals of Acoustics*, Wiley, N.Y., 1950; Hueter and Bolt, *Sonics*, Wiley, N.Y., 1955; and Herzfeld and Litovitz, *Absorption and Dispersion of Ultrasound Waves*, Academic Press, N.Y., 1959.

ULTRASONIC EXPOSURE

The photographic element, in contact with the transport liquid, is imagewise exposed to ultrasonic radiation. This can be accomplished using any conventional sonographic camera which is capable of impinging ultrasonic radiation on a photographic element as an image receptor. In such a sonographic camera a sonic source or transducer (i.e., an emitter of ultrasonic radiation) and the photographic element are spatially related so that the ultrasonic radiation, unless absorbed, can impinge on the silver halide emulsion layers to be imagewise exposed. Between the sonic transducer and the photographic element is interposed any means which will imagewise modulate the ultrasonic radiation as it is received by the emulsion layers. In a simple form this can take the form of an apertured template which absorbs or reflects the ultrasonic radiation which strikes it and allows a portion of the ultrasonic radiation to pass through the aperture to the photographic element. Alternatively the reflected ultrasonic radiation can be caused to impinge on the photographic element. In a more sophisticated form the imaging means can include combinations of sonic lenses and reflectors for focusing and directing the ultrasonic radiation. In one application of this process an object whose ultrasonic modulation characteristic is desired to be recorded is placed in the sonographic camera so that it intercepts ultrasonic radiation passing from the sonic transducer to the photographic element. For example, the ultrasonoscope of Brenden, cited above, can be readily adapted for use as a sonographic camera in the practice of this invention merely by locating the photographic element in one of the water tanks so that it is impinged by the ultrasonic radiation which has passed through or been reflected by the mamma under examination.

In performing the selection procedure as described above (without the optional ultrasonic exposure) the maximum elapsed time the photographic element should be left in contact with transport liquid before ultrasonic exposure in subsequent processing will be apparent. Specifically, the photographic element must be ultrasonically exposed before alteration in its photosensitivity attributable to contact with the transport liquid has been completed. Except where rapid alteration of the photosensitivity as a function of contact with the transport liquid prohibits, it is usually preferred to allow the photographic element at least a few seconds, preferably at least about 10 seconds, of contact with the transport liquid before initiating ultrasonic exposure. Delaying ultrasonic exposure after initial contact with the transport liquid can be used to enhance the ultrasonographic response. The optimum delay period for a particular element can be correlated to the transport liquid contact period at which incipient alteration of the photosensitivity of the element is observed in the selection procedure. It is preferred that the transport liquid be in contact with the photographic element in generally the same manner during the selection procedure and in performing the ultrasonic exposure step. For some elements alteration of photosensitivity begins immediately upon contact with the transport liquid, and there is no advantage to delaying the ultrasonic exposure. Where the photographic element is of a type that requires ultrasonic energy to initiate change in photosensitivity, as discussed in connection with the alternative selection procedure described above, the time period that elapses between contact of the photographic element with the transport liquid and ultrasonic exposure in most instances exhibits significantly reduced, if any, effect on ultrasonic response.

Some photographic elements, such as those having photographic film supports, directly absorb only a very small fraction of the total ultrasonic radiation to which they are exposed, the rest passing directly through the element. Accordingly, it is possible during ultrasonic exposure to orient a photographic film element so that either the emulsion layer bearing surface or the film support of the photographic element is nearest to the ultrasonic radiation source. Also, one or a plurality of silver halide emulsion layers can be coated on either or both major surfaces of the film support and concurrently exposed. Further, it is possible to stack two or more photographic film elements so that ultrasonic radiation passes through them sequentially during exposure. Of course, where precise focusing of the ultrasonic radiation is desired, the number of film support elements which will produce optimum images may be limited. By way of contrast, ultrasonographic elements with paper supports absorb almost all of the ultrasonic imaging radiation to which they are exposed according to this process. For photographic elements having paper supports the silver halide emulsion layer must be on the side nearest to the source of the ultrasonic radiation source. Generally better image quality is obtained in all instances where the emulsion layer is on the face of the support nearest the ultrasonic energy source.

Imagewise exposure of the photographic element in the sonographic camera is at an intensity and for a duration which is insufficient to produce a developable image in the absence of light (or other electromagnetic radiation) being externally directed on the photographic element. At these low levels of ultrasonic radiation no cavitation stimulated luminescence is generated that might produce a latent image in the photographic element. The level of ultrasonic exposure is further lower than that which has been recognized in the art to produce ultrasonic images in the absence of light. That is, the ultrasonic imaging exposure is itself insufficient to produce a latent image in the emulsion layer of the photographic element being exposed. This means simply that, in the absence of exposure to electromagnetic radiation, subsequent photographic processing of the ultrasonically exposed emulsion layer under the specific development and other conventional processing conditions chosen will not produce a visible image. Successful imaging is readily achieved at ultrasonic exposures below 100 watt-sec/cm$^2$ by this process.

Just as different photographic elements exhibit marked differences in their threshold sensitivity to electromagnetic exposure, different photographic elements will also exhibit different threshold sensitivities to ultrasonic radiation. By exposing photographic elements to differing ultrasonic intensities and then performing the light exposure and photographic processing steps, as in the selection procedure described above, the optimum ultrasonic exposure for a given photographic element can be readily determined. In a manner analogous to light sensitometry using a step tablet, it is possible to expose a photographic element simultaneously in lateral areas with an array of laterally spaced ultrasonic transducers which are calibrated to transmit ultrasonic radiation at predetermined stepped levels of intensity. Upon subsequent light exposure and photographic processing, densities produced by each transducer can be plotted against ultrasonic exposure. This generates an ultrasonic characteristic curve for the particular photographic element from which the optimum intensity of ultrasonic exposure can be readily determined.

The determination can be repeated using differing durations of ultrasonic exposure, if desired, although this is not usually necessary. In using photographic cameras varied shutter speeds (exposure times) and f-stop settings (exposure intensities) are available to the photographer to achieve a given exposure, since exposure is recognized to be the mathematical product of exposure time and intensity. The proposition that equal photographic exposures differing in intensity and duration produce similar photochemical response is referred to as the photographic reciprocity law, and this law is generally relied upon in photography in varying exposure times and intensities, although it is recognized that many photographic elements exhibit significant reciprocity law failure. By analogy to photography, various combinations of ultrasonic exposure times and intensities which produce like ultrasonic exposures as a mathematical product can be relied upon in a general way in accordance with a reciprocity law of ultrasonic exposure which is analogous to the photographic reciprocity law.

However, it is recognized that this process produces a significant ultrasonic exposure reciprocity law departure which can be put to favorable use. Specifically, I have observed that at equal exposures differing in intensity and duration the ultrasonographic speeds observed progressively increase as a function of the shortening of the exposure duration. Viewed another way, by using shorter durations of ultrasonic exposure, less than expected increases in intensity are required to achieve a particular ultrasonographic speed. This is particularly advantageous, since many objects which might be ultrasonographically examined are limited in both the intensity and duration of the ultrasonic radiation which they can withstand safely without risk of degradation. Generally the higher the intensity of exposure above a threshold minimum level of intensity the shorter the duration of exposure must be to avoid degradation. The favorable ultrasonic exposure reciprocity law departure exhibited by this process allows the use of lower than the expected exposures to produce a selected density with increasing exposure intensities, thereby avoiding degradation without sacrificing ultrasonographic speed.

Any ultrasonic frequency heretofore employed in ultrasonography can be applied to the practice of this process. For a given transmission medium the wavelength of the ultrasonic radiation is reciprocally related to its frequency. Since best imaging results in ultrasonography and ultrasonoscopy are recognized to be obtainable when the wavelength of the ultrasonic imaging radiation is substantially shorter than the dimension of the object or object feature to be imaged, it is generally preferred to operate at shorter wavelengths and hence higher frequencies. For example, at a frequency of 1 megahertz ultrasonic radiation transmitted in water exhibits a wavelength in the order of 1.5 millimeters. Accordingly in obtaining ultrasonographs of objects or object features of about 1.5 millimeters in dimension it is preferred to operate substantially above 1 megahertz, typically in the range of 2.5 to 100 megahertz. Frequencies in the order of gigahertz are known in the art and can be employed, particularly when microscopic image definition is required. The high operating frequencies are, of course, advantageous since they effectively define both large and small objects and object features, although increased absorptivity of many materials at higher frequencies requires thinner object samples. In the prior art ultrasonic exposures of photographic elements have most typically occurred at lower frequencies in order to stimulate cavitation. This process is not similarly limited.

The ultrasonic exposure of the photographic element can be constant in intensity for the duration of exposure or it can be varied in intensity. An increase in response for a given photographic element can be achieved if the ultrasonic exposure is pulsed. Pulsing of the ultrasonic exposure can be achieved by continuously modulating the intensity of exposure or, preferably, interrupting ultrasonic exposure so that ultrasonic exposure is divided into separate burst or discrete pulses. It is preferred to employ discrete pulses wherein the duration of the pulses and the interval therebetween is less than a tenth of a second. The response of the photographic element can be increased further by employing higher frequencies of pulsing. The duration of the ultrasonic pulse and the interval between pulses can be varied independently, if desired. For example, useful results have been obtained with pulse durations of 1 microsecond separated by pauses of 1 millisecond. The minimum useful pulse and interval durations are limited only by the capabilities of the ultrasonic emitters selected for use. Naturally, as the pulses and intervals between pulses approach the frequency of the ultrasonic radiation, continuous exposure will be approached as a limit. I do not fully understand the reason I am able to obtain higher speeds by pulsing. It may in part be accounted for by the ultrasonic exposure reciprocity law departure described above or it may in part be attributable, particularly at lower pulsing frequencies, to the beneficial effect resulting from the delay between ultrasonic exposure and light exposure, discussed below.

ELECTROMAGNETIC EXPOSURE

It is preferred to employ visible light during electromagnetic radiation exposure, and, for convenience, the description of electromagnetic radiation exposure is discussed in terms of light exposure. However, it is to be appreciated that the utility of this invention is not limited to use with any particular portion of the electromagnetic spectrum, but can employ electromagnetic radiation of any wavelength heretofore known to be useful in photography, including ultraviolet and visible light, as well as infrared radiation, unless otherwise specifically qualified below.

In using an ultrasonographically negative-working photographic element (which is initially relatively insensitive to light exposure and which becomes more responsive as a result of ultrasonic exposure) it is only necessary that the light exposure strike those areas of the photographic element that are ultrasonically exposed. In other words, a light image which is a duplicate or approximation of the imagewise ultrasonic exposure can be employed. It is usually more convenient to expose in a nonimagewise manner, preferably uniformly, the photographic element to light so that registration of the two exposures is not required. For ultrasonographically negative-working elements light exposure can usefully occur at any stage following the onset of ultrasonic modification of the photographic element--i.e., either during or after ultrasonic exposure. Since the ultrasonographically negative-working photographic elements are initially relatively light-insensitive, light exposure of the photographic element before ultrasonic exposure can be permitted, but it is not responsible for latent image formation.

In using an ultrasonographically positive-working photographic element (which is initially sensitive to light exposure and becomes less responsive as a result of ultrasonic exposure), light exposure is required in those areas which are not initially imagewise ultrasonically exposed, and, as a practical matter, nonimagewise light exposure, usually uniform light exposure, is generally most convenient. It is generally preferred to avoid light exposure before or during ultrasonic exposure and to defer light exposure until after ultrasonic imagewise desensitization of the photographic element has been accomplished. Light exposure while ultrasonic exposure is still occurring is specifically contemplated, although not preferred. Further, prior to ultrasound exposure, the silver halide photographic element can be given a nonimagewise, preferably uniform, light exposure of any type which does not destroy its photographic imaging capability. For example, it is known in photography that a uniform light pre-exposure of a photographic element can have the effect of reversing the photographic image obtained following subsequent imagewise exposure and processing. This effect is commonly referred to as solarization and is further discussed below.

When ultrasonic and light exposures are concurrently undertaken, or at least undertaken in overlapping time periods, it is necessaryy to light expose the photographic element while it is still in contact with the transport liquid. For example, if the photographic element is immersed in a polar solvent or other transport liquid medium during ultrasonic exposure, light exposure can also be undertaken through this medium. Conveniently the ultrasonic transport liquids are most commonly substantially transparent (specularly transmissive to light over at least a portion of the visible spectrum). Where ultrasonic and light exposures are undertaken consecutively, it is possible to remove the photographic element from the environment of ultrasonic exposure---e.g., contact with the transport liquid--before light exposure is undertaken. However, it is preferred to light expose the photographic element after ultasonic exposure without moving the element with respect to the transport liquid contacting the silver halide emulsion layer, and thus risking degradation of image definition. Where a plurality of photographic elements are stacked for ultrasonic exposure, it is preferred to move the photographic elements before light exposure to insure uniform exposure.

According to a preferred technique for practicing this process, ultrasonic and light exposures are consecutive, rather than concurrent or overlapping. I have discovered quite unexpectedly that a significant increase in the imaging sensitivity of the photographic element occurs if light exposure follows ultrasonic exposure. Specifically, significant enhancement in density differences between ultrasonically exposed and background areas are observed when light exposure is delayed from about 10 to 200 seconds (optimally from about 15 to 50 seconds) following ultrasonic exposure at ordinary room temperatures (20° to 25° C.). This enhancement of the ultrasonographic image is attributed to a furtherance during the delay period of the alterations of the photographic element initiated by ultrasonic exposure. As indicated above, it is preferred not to disturb the photographic element between ultrasonic and light exposure.

For ultrasonographically positive-working photographic elements conventional speed ratings for the photographic elements can be employed as an approximate guide for light exposure. To more precisely determine the exposure properties of an ultrasonographically positive-working photographic element a series of exposures, with different samples or using a step tablet, can be made under the conditions of actual use to identify optimum levels of electromagnetic radiation exposure. For example, the minimum level of light which produces a maximum density as well as the maximum level of light which produces a minimum density can be determined as well as exposures which produce intermediate density levels under the contemplated conditions of photographic processing. It is preferred to employ a light exposure in excess of that required to produce a maximum density in subsequent processing. However, low levels of light exposure which produce a density at least 0.1 above the minimum density (preferably 0.5 above minimum density) can be employed.

For ultrasonographically negative-working photographic elements, optimum levels of light exposure cannot be determined from the normal photographic speed ratings of the elements, since they are typically initially relatively insensitive to light. The optimum exposure for such negative-working photographic elements can be ascertained by contacting the photographic element with the transport liquid to be placed in contact with it during ultrasonic and light exposure and then variably light exposing the element, using different samples or a step tablet, after 10 hours of immersion or any shorter time interval at which the ultrasonographically negative-working photographic element has approached its maximum light sensitivity.

In determining the optimum levels of light exposure as described above, the photographic elements are photographically processed in accordance with the techniques to be employed in this process. Once usable light exposure levels have been identified, intensity and duration of light exposure can be varied in accordance with the photographic reciprocity law.

It is recognized in photography that the integrated sum of intermittent light exposures can produce a higher density than a corresponding continuous light exposure when the average intensity of exposure is less than the intensity (referred to herein as the transition intensity) at the nadir of a plot of log continuous exposure versus log intensity (referred to in the art as a reciprocity curve) for a photographic element. The density difference observed is referred to in the art as an intermittency effect. It is known in the art that the effect of increasing the frequency of intermittent light exposures at an average intensity level below the transition intensity, holding the integrated sum of the exposures constant, causes the densities obtained to increase until a critical frequency is reached. Above the critical frequency no further increase in density occurs.

I have discovered that an unexpected increase in density difference between high density and low density areas of ultrasonographs formed by this process can be achieved by employing pulsed--that is, varied intensity, preferably intermittent, light exposures. This effect can be achieved employing nonimagewise or uniform light exposures of both high and low density rendering areas of the photographic elements in direct contrast with the necessarily differential (e.g., imagewise) light exposures of high and low density areas in obtaining photographic intermittency effects. Specifically, it has been observed that maximum obtainable densities can be increased significantly by nonimagewise or uniform, intermittent light exposures of photographic elements without the same increases in minimum densities occurring. In considering pulsed light exposure, such variants as synchronizing the pulsed light exposure with the ultrasound exposure and also varying the frequency of light pulsing are contemplated. Since the speed of light is much faster than the rate of pressure-rarefaction wave propagation, synchronized delay of light pulses is contemplated so that each light pulse reaches the element being exposed concurrently with or following after a time delay each ultrasound pulse. The duration of the delay of the light pulses with respect to the ultrasound pulses can be chosen to take optimum advantage of the chemical or physical alteration set in motion by the preceding ultrasound pulse or pulses.

As is well understood by those skilled in the art of photography, if silver halide emulsion imaging layers are given progressively greater exposures substantially in excess of those required to produce a maximum density, the densities produced typically plateau at the maximum density and then decline, in many instances, to approach the initial minimum density level (or less) at very high levels of exposure. This photographic effect is referred to in the art as solarization. Solarization is occasionally used in photography to reverse the sense of a photographic image. For example, solarization will produce a positive image using a normally negative-working photographic element.

Unlike conventional photography, the ultrasonographic images obtained with this process exhibit no reversal of the sense of the ultrasonographic image when operating at high levels of exposure approaching solarization. Accordingly, the maximum light exposures which are employed in the practice of this process can be at any level below that which will completely solarize the photographic element. For purposes of providing a point of reference "completely solarizing light exposure" is herein defined as that light exposure which produces a density after processing equal to the density produced in ultrasonically unexposed areas after processing in the absence of light exposure. It is contemplated to employ maximum light exposures which produce a density of at least 0.1 (preferably at least 0.5) above that produced by a completely solarizing light exposure.

If samples of a photographic element are processed according to these teachings, but not ultrasonically exposed, and each light exposed at a different light exposure level ranging up to some maximum exposure, such as a completely solarizing light exposure level, a characteristic curve can be plotted--that is, a curve can be formed by plotting observed density versus light exposure. If another set of samples are similarly processed, but with a fixed ultrasonic level of exposure, a second characteristic curve can be plotted. The density difference between the characteristic curves at a reference light exposure level is the difference between maximum and minimum densities obtained by the practice of this invention in the course of processing that photographic element under those process conditions. The maximum density difference can occur before the light exposure level is reached which produces a maximum density or at a higher light exposure level. For this reason I have found that it is in some instances unexpectedly advantageous to employ light exposure levels which are higher than those which produce a maximum density.

PHOTOGRAPHIC PROCESSING

Once ultrasonic and light exposures of the photographic element have occurred, a selectively developable latent image has been formed in the exposed silver halide emulsion layer or layers of the element. The latent image can be subsequently converted to a visible image employing solutions and procedures which are conventionally employed in photographic processing. The term "photographic processing" is employed in its art recognized sense as designating those processing steps conventionally employed in photography to form a visible image corresponding to a latent image contained in a silver halide emulsion layer of a photographic element. Photographic processing useful in the practice of this process is disclosed, for example, in *Product Licensing Index,* Vol. 92, December 1971, publication 9232, paragraph XXIII, Processing, page 110, and *Research Disclosure,* Vol. 176, December 1978, publication 17643, paragraph XIX, Processing, page 28, both here incorporated by reference. *Research Disclosure* and *Product Licensing Index* are published by Industrial Opportunities, Ltd., Homewell, Havant, Hampshire, P09, 1EF, United Kingdom.

A preferred photographic processing technique is to develop the latent image to a visible silver image. This can be accomplished merely by contacting the exposed silver halide emulsion layer with a photographic developer. It is preferred that other conventional photographic processing steps be employed as well, such as rinsing, fixing and stopping.

Another preferred photographic processing technique is to convert the latent image to a visible dye image. This can be accomplished following procedures which are well appreciated by those skilled in color photography. According to one technique, a dye image can be formed concurrently with developing that latent image to a silver image. Sufficient silver need not be developed to be visible. The silver image developed, since it need not be relied upon for visibility, can be bleached. By techniques well known in color photography, it is also possible to form a color reversal image. It is also recognized that a color image can be produced by altering the mobility of a dye-image-former, such as a dye-developer or redox dye-releaser, and transferring the mobile dye to a conventional receiver for viewing. In still another conventional approach to forming a color image, a redox amplification reaction between an oxidizing agent, such as transition metal complex (e.g., cobalt(III) hexammine) or a peroxide (e.g., hydrogen peroxide), and a dye-image-generating reducing agent, such as a color developing agent or an electron transfer agent employed in combination with dye-image-former (e.g., a dye-developer or redox dye-releaser) can be catalyzed by either the latent image or a silver image developed from it. The oxidizing agent and the dye-image-generating reducing agent are chosen to be substantially inert to oxidation-reduction reaction in the absence of a catalyst. Conventional redox dye image amplification techniques are disclosed in U.S. Pat. Nos. 3,765,891, 3,822,129, 3,834,907, 3,841,873, 3,847,619, 3,862,842, 3,923,511, 3,902,905 and 3,674,490.

Since photographic developer compositions are polar solvent solutions, such as aqueous alkaline solutions, it is recognized that a developer composition can be in contact with the photographic element before or during ultrasonographic exposure. Since the ultrasonic exposure is insufficient to generate a developable latent image in the photographic element in and of itself, no development of the element occurs during or after ultrasonic exposure unless or until accompanied by light exposure. This is in direct contrast to previously reported experiments in which development has occurred immediately upon higher levels of ultrasonic exposure. As an alternative to placing the developer composition in contact with the imaging silver halide emulsion layer(s) during both ultrasonic and light exposures, a transport liquid can be in contact with the element during ultrasonic exposure and a developer contacted with the element during light exposure. In either case, the advantage to be gained is the consolidation of the development processing step with the step of light exposure, thereby permitting very rapid access to a viewable image.

PREFERRED ULTRASONOGRAPHIC IMAGE-FORMING ELEMENTS

Photographic elements preferred for use in the practice of this process can be identified by employing the selection procedures described above. I have investigated certain classes of photographic elements which satisfy the above selection criteria, and I have correlated certain structural characteristics with their satisfactory utility. Although, in using these elements, the selection procedures are not essential, they may be retained as a corroborative tool, if desired.

The photographic elements employed in the practice of this process typically include a support or substrate. The support can conveniently take the form of a conventional photographic support, such as a glass, paper or film support. Typical useful photographic film supports include cellulose nitrate, cellulose acetate, poly(vinyl acetal), polystyrene and poly(ethylene terephthalate) film supports. Useful photographic paper supports can be acetylated or coated with baryta and/or an α-olefin containing polymer, particularly a polymer of an α-olefin containing 2 to 10 carbon atoms such as polyethylene, polypropylene, ethylenebutene copolymers and the like. A conventional photographic subbing layer is typically applied to the support to facilitate coating of a hydrophilic colloid coating, such as a silver halide emulsion layer thereon.

In a simple form, the photographic element can consist of the support as described above and, coated thereon, a single silver halide emulsion layer. The emulsion can be formed by dispersed silver halide grains and a conventional photographic emulsion vehicle, such as a hydrophilic colloid or other suitable vehicle. Exemplary hydrophilic colloid vehicles include both naturally occurring substances, such as proteins, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like. The emulsion layers can also include alone or in combination with hydrophilic, water-permeable colloids, other synthetic polymeric vehicle compounds such as dispersed vinyl compounds such as those in latex form and particularly those which increase the dimensional stability of the photographic materials. Typical synthetic polymers include those described in Nottorf U.S. Pat. No. 3,142,568, issued July 28, 1964; White U.S. Pat. No. 3,193,386, issued July 6, 1965; Houck et al U.S. Pat. No. 3,062,674, issued Nov. 6, 1962; Houck et al U.S. Pat. No. 3,220,844, issued Nov. 30, 1965; Ream et al U.S. Pat. No. 3,287,289, issued Nov. 22, 1966; and Dykstra U.S. Pat. No. 3,411,911, issued Nov. 19, 1968. Other vehicle materials useful alone or in combination with hydrophilic colloids include those water-insoluble polymers of alkyl acrylates and methacrylates, acrylic acid, sulfoalkyl acrylates or metacrylates, vinyl butyral, styrene, butadiene and styrene, those which have crosslinking sites which facilitate hardening or curing as described in Smith U.S. Pat. No. 3,488,708, issued Jan. 6, 1970, and those having recurring sulfobetaine units as described in Dykstra, Canadian Pat. No. 744,054.

The silver halide grains in the emulsion layer can be of any conventional type which can form a latent image predominantly on the surface of the silver halide grains or predominantly in the interior of the silver halide grains. Any photographic silver halide--e.g., silver chloride, silver iodide, silver bromide, silver bromoiodide, silver chlorobromide, silver chlorobromoiodide, etc.--can be employed. Both coarse and fine grain emulsions are useful in the practice of my process. The silver halide grains can be either monodispersed or polydispersed and can be of either regular or irregular crystal structure.

The predominantly surface latent image forming silver halide grains, hereinafter referred to as surface latent image grains, are those most commonly employed in photographic elements and are those obtained by silver halide precipitation in the presence of a peptizer in the absence of special modifying procedures. They can be prepared by either single or double jet (including continuous) precipitation techniques well known to those skilled in the art.

These predominantly surface latent image forming silver halide grains can be surface chemically sensitized, such as by reduction; with sulfur, selenium or tellurium compounds; with gold, platinum or palladium compounds; or combinations of these. Procedures for chemically sensitizing silver halide emulsions are described in Sheppard et al, U.S. Pat. No. 1,623,499, issued Apr. 5, 1927; Waller et al, U.S. Pat. No. 2,399,083, issued Apr. 23, 1946; McVeigh, U.S. Pat. No. 3,297,447, issued Jan.

10, 1967 and Dunn, U.S. Pat. No. 3,297,446, issued Jan. 10, 1967.

The predominantly internal latent image forming silver halide grains, hereinafter referred to as internal latent image grains, can be prepared by either physical or chemical internal sensitization. Exemplary of patents which teach the formation of internal latent image silver halide grains, their internal and, in some instances, surface chemical sensitization are Davey and Knott, U.S. Pat. No. 2,592,250, issued May 8, 1952; Porter et al, U.S. Pat. No. 3,206,313, issued Sept. 14, 1965; Porter et al, U.S. Pat. No. 3,317,322, issued May 2, 1967; Motter U.S. Pat. No. 3,703,584, issued Nov. 21, 1972; Evans U.S. Pat. No. 3,761,276, issued Sept. 25, 1973; and Evans and Atwell U.S. Pat. No. 4,035,185, issued July 12, 1977; here incorporated by reference.

Other conventional silver halide grains responsive to photographic exposure useful in the practice of my process are disclosed in *Product Licensing Index*, paragraph I, of publication 9232, cited above, here incorporated by reference.

To illustrate a simple mode of practicing my invention, surface latent image silver halide grains as described above are employed capable of forming a photographic negative image when light exposed in a conventional imaging silver halide emulsion layer; however, the emulsion in which they are incorporated in the practice of my process is modified by halide ion adjustment so that it is substantially desensitized to light exposure. That is, the pAg of the emulsion is adjusted with halide ion addition so that the maximum density obtainable with the element in the selection procedure (without ultrasonic activation) at 30 seconds of immersion in a polar solvent is less than 1.0 density unit, preferably less than 0.5 density unit.

As is well understood by those skilled in the art, pAg is the negative logarithm (hereinafter designated log) of the silver ion concentration expressed in normality units (which for monovalent ions corresponds to moles/liter). The relationship of the silver ion concentration, expressed as pAg and the concentration of bromide ion, for example, in a silver bromide emulsion can be illustrated by the following equation:

$$-\log K_{sp} = pBr + pAg$$

where;
pAg is the negative log silver ion concentration, expressed in normality units,
pBr is the negative log bromide ion concentration, expressed in normality units, and
$K_{sp}$ is the solubility product constant. As is well appreciated in the art, $K_{sp}$ values are a function of both temperature and the specific halide or mixture of halides chosen.

From the foregoing, it is apparent that to elevate the pAg of the emulsion to a substantially desensitizing level, a higher concentration of halide ions (e.g., a lower pBr) is required in the emulsion layer. The pAg of the emulsion is preferably increased by bringing the emulsion into contact with a source of halide ions, such as alkali halide solution, while the emulsion is in the form of a melt before coating. Alternatively, the pAg of the silver halide emulsion can be regulated as it is formed. pAg is a commonly employed photographic emulsion making measuring approach which provides an indirect measure of halide ion concentration. It is, of course, recognized that the presence of emulsion constituents other than halide ions can also affect silver ion concentrations. Accordingly, pAg measurements must be carefully related to the emulsions with which they are being employed. Optimum halide ion levels to desensitize an imaging silver halide emulsion layer can be established by coating otherwise comparable emulsion layers at differing halide ion adjusted pAg levels. It is, of course, within the skill of the art to measure desensitizing halide ion levels directly rather than indirectly through the measurement of pAg.

The above-described desensitized photographic elements are ultrasonographically negative-working in this process. It appears that ultrasonic exposure of the abovedescribed, high pAg ultrasonic elements has the effect of accelerating the release of halide ions from the surface of the silver halide grains in the presence of a polar solvent with the result of lowering the pAg in the immediate vicinity of the silver halide grain surfaces. These grains are then no longer desensitized and will respond when subsequently exposed to light and further processed.

A corresponding ultrasonographically positive-working element can take the form of a conventional surface latent image-forming silver halide photographic element which is initially light-sensitive. My process can be practiced by bringing the element into contact with a polar solvent containing the bromide ions in solution. For example, the photographic element can be immersed in water containing a bromide salt, such as an alkali bromide, dissolved therein. In this instance imagewise exposure with ultrasonic energy accelerates diffusion of the bromide ions so that in exposed areas the pAg at the silver halide grain surface is locally raised, and the photographic sensitivity of the element is locally and imagewise decreased. The optimum level of bromide ions in the polar solvent can be readily ascertained by repeating the selection procedure using different bromide ion concentrations.

In the foregoing preferred forms of my invention, I adjust the pAg adjacent the surface of the silver halide grains indirectly by controlling bromide ion diffusion either out of or into the silver halide emulsion layer. I can as an alternative adjust the pAg of a silver halide emulsion layer to control its sensitivity using silver ions directly rather than indirectly through the use of halide ions. For example, instead of contacting a polar solvent containing bromide ions with the silver halide emulsion layer, as described above, I can incorporate a soluble silver salt in the polar solvent. In a specific, illustrative mode of practicing my process an ultrasonographically negative-working element can be immersed in an aqueous solution of silver nitrate or another water soluble silver salt. Imagewise ultrasonic exposure accelerates diffusion of silver ions into the silver halide emulsion layer in the exposed regions of the layer. This lowers the pAg of the silver halide emulsion layer in an imagewise manner, thereby imagewise increasing the light sensitivity of the emulsion layer. The optimum level of silver ions in the polar solvent can be readily ascertained by repeating the selection procedure using different silver ion concentrations.

I further recognize that ultrasonic exposure can concurrently stimulate ionic diffusion both into and out of the silver halide emulsion layer being exposed. For example, an ultrasonographically negative-working element useful in the practice of my process can be initially desensitized to light by imbibing bromide ions into the silver halide emulsion layer, as described above, and imagewise ultrasonically exposing the emulsion layer while it is in contact with a polar solvent containing silver ions dissolved therein. In this instance both bromide ion diffusion out of the emulsion layer and silver ion diffusion into the emulsion layer contribute to imagewise sensitizing the silver halide grains of the emulsion layer to light exposure. In a converse mode of practicing this process, the photographic element can be ultrasonographically positive-working, initially containing the silver ions imbibed in the emulsion layer while the bromide ions are dissolved in the contacting polar solvent. In this instance, it is silver ion diffusion out of the emulsion layer that relatively desensitizes the silver halide grains to light exposure.

I have described the foregoing modes of practicing my process by reference to surface latent image forming silver halide grains which are desensitized to light exposure as a function of pAg. Silver halide grains which contain an internal latent image are not developable in surface developers and therefore yield photographic responses in surface developers similar to surface latent image forming silver halide grains which have been desensitized--that is, which contain no or few latent image centers. Conventional silver halide grains and emulsions can then be used in the foregoing modes of practicing my process which exhibit a balance of internal and surface latent image forming efficiencies which can be shifted as a function of pAg adjustment. The references herein to silver halide grains and emulsions which have been desensitized include as a species thereof silver halide grains and emulsions which under the pAg conditions of light exposure from internal latent images, but which can form surface latent images at a different pAg.

To specifically illustrate useful embodiments of this type, what are known in the art as converted-halide type silver halide grains exhibit a balance of internal and external latent image forming capabilities. In the form employed by Davey and Knott and Motter, cited above, the internal and external latent image forming efficiencies of the converted-halide type silver halide grains are weighted in favor of forming an internal latent image. However, in Evans U.S. Pat. No. 3,622,318, issued Nov. 23, 1971, the converted-halide type silver halide grains are surface chemically sensitized to a degree to balance the internal and external latent image forming efficiencies in favor of the formation of a surface latent image. In Motter, cited above, surface latent images can be similarly formed if surface chemical sensitization is undertaken to the same degree. Evans U.S. Pat. No. 3,761,276, cited above, is an illustration of internally doped and surface chemically sensitized silver halide grains exhibiting a balance of internal and surface latent image efficiencies, which under the contemplated conditions of photographic use disclosed therein, are predisposed to form an internal latent image. Evans and Atwell U.S. Pat. No,. 4,035,185, cited above, illustrates a blended emulsion of the type disclosed by Evans (U.S. Pat. No. 3,761,276) wherein the silver halide grains are internally doped with a combination of a noble metal and a middle chalcogen sensitizer.

The photographic elements of Davey and Knott, Motter, Evans (U.S. Pat. No. 3,761,276) and Evans and Atwell are useful as ultrasonographically negative-working elements in the practice of my process, since they are initially incapable of forming a surface latent image when exposed to light, but can be made capable of forming a surface latent image by lowering the pAg at the silver halide grain surface. The photographic elements of Evans (U.S. Pat. No. 3,622,318) can be employed in my process as ultrasonographically positive-working elements, since they are initially capable of forming a surface latent image upon exposure to light, but can be converted to a form in which an internal latent image is formed by increasing the pAg adjacent the surface of the silver halide grains. I recognize that the pAg of the photographic elements of these patents could be altered uniformly before ultrasonic exposure so that the ultrasonographically negative-working elements are converted to ultrasonographically positive-working elements and vice versa.

The term "surface developer" is used in its art recognized sense and encompasses those developers which will reveal the surface latent image on a silver halide grain, but will not reveal substantial internal latent image in an internal image-forming emulsion, and conditions generally used to develop a surface-sensitive silver halide emulsion. The surface developers can generally utilize any of the silver halide developing agents or reducing agents, but the developing bath or composition is generally substantially free of a silver halide solvent (such as water-soluble thiocyanates, water-soluble thioethers, thiosulfates, ammonia and the like) which will disrupt or dissolve the grain to reveal substantial internal image. Low amounts of excess halide are sometimes desirable in the developer or incorporated in the emulsion as halide-releasing compounds, but high amounts are generally avoided to prevent substantial disruption of the grain, especially with respect to iodide-releasing compounds.

In photographic processes for producing direct-positive images employing conventional silver halide emulsions exhibiting a balance of internal and surface latent image forming efficiencies, the use of fogging or nucleating agents in the element or developer is common. These fogging or nucleating agents can be employed in the practice of my process, but they are not required, since the nonimagewise or uniform light exposure step of my process simultaneously performs functions similar to both the imagewise light exposure step and the fogging or nucleating step of direct-positive photographic imaging. I recognize, of course, that light exposure could be confined selectively to only those areas of the ultrasonographic element which are intended to form an internal latent image and, instead of light exposing areas to form a surface latent image, the direct-positive photographic nucleating procedure can be relied upon.

I specifically incorporate by reference the patents of Davey and Knott, Motter, Evans (U.S. Pat. No. 3,761,276) and Evans (U.S. Pat. No. 3,622,318), cited above, to illustrate further details of silver halide grains and emulsions exhibiting balanced internal and surface latent image forming efficiencies as well as the techniques for their processing and to define and illustrate the terms of art, such as "converted-halide", "surface developer", "internal latent image" and the like, which are well known and understood by those skilled in the art of photography.

Although light exposure of the silver halide emulsion layer can be confined to the portion of the spectrum to which the imaging grains possess a native sensitivity, it is contemplated to sensitize spectrally the silver halide grains so that they respond also to other portions of the electromagnetic spectrum. Spectral sensitization can be undertaken using the dyes and techniques which are conventional in preparing spectrally-sensitive photographic elements.

Sensitizing dyes useful in sensitizing silver halide emulsions are described, for example, in Brooker et al, U.S. Pat. No. 2,526,632, issued Oct. 24, 1950; Sprague, U.S. Pat. No. 2,503,776, issued Apr. 11, 1950; Brooker et al, U.S. Pat. No. 2,493,748, issued Jan. 10, 1950; and Taber et al, U.S. Pat. No. 3,384,486, issued May 21, 1968. Spectral sensitizers which can be used include the cyanines, merocyanines, complex (tri- or tetranuclear) cyanines, holopolar cyanines, styryls, hemicyanines (e.g., enamine hemicyanines), oxonols and hemioxonols.

Dyes of the cyanine classes suitable for sensitizing silver halide can contain such basic nuclei as the thiazolines, oxazolines, pyrrolines, pyridines, oxazoles, thiazoles, selenazoles and imidazoles. Such nuclei can contain alkali, alkylene, hydroxyalkyl, sulfoalkyl, carboxyalkyl, aminoalkyl and enamine groups and can be fused to carbocyclic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei mentioned above as well as acid nuclei such as thiohydantoins, rhodanines, oxazolidenediones, thiazolidenediones, barbituric acids, thiazolineones, and malononitrile. These acid nuclei can be appropriately substituted with alkyl, alkylene, phenyl, carboxyalkyl, sulfoalkyl, hydroxyalkyl, alkoxyalkyl, alkylamino groups, or heterocyclic nuclei. Combinations of these dyes can be used, if desired. In addition, super-sensitizing addenda which do not absorb visible light can be included, for instance, ascorbic acid derivatives, azaindenes, cadmium salts, and organic sulfonic acids as described in McFall et al, U.S. Pat. No. 2,933,390, issued Apr. 19, 1960; and Jones et al, U.S. Pat. No. 2,937,089, issued May 17, 1960.

It is known in the art that spectral sensitizing dyes in addition to extending the spectral response of the silver halide grains can have a definite desensitizing effect on the grains. The degree of desensitization exhibited is a function of parameters such as the concentration of the dye incorporated, the oxidation and reduction potentials of the dye and the pAg of the silver halide emulsion layer into which it is incorporated. By employing sensitizing dyes as desensitizers, I am able to reduce the background or minimum densities of negative-working ultrasonographic elements, since the densensitizing action of the dye supplements the desensitization effect attributable solely to the high initial pAg of the emulsion layer. By employing desensitizers which become less effective at lower pAg's, I have also been able to avoid desensitization in ultrasonically exposed areas of the ultrasonographic element. In fact, I have obtained surprisingly large differences in density between ultrasonically exposed and unexposed areas of ultrasonographically negative-working elements using selected desensitizers.

I contemplate employing in the practice of my process any conventional silver halide emulsion desensitizer. I prefer to employ desensitizers which exhibit a variation in desensitizing as a function of pAg and, in ultrasonographically negative-working elements, I prefer to employ desensitizers which become less effective at lowered pAg values.

Specifically preferred desensitizers are dyes such as cyanine and merocyanine dyes which exhibit a strong desensitizing effect. It is generally known, for example, that nuclei containing nitro groups cause desensitization (Glafkides, *Photographic Chemistry*, London, Fountain Press, 1960, page 921; Hamer, *Cyanine Dyes and Related Compounds*, N. Y. Interscience, 1964, page 728). Generally, cyanine and merocyanine dyes containing at least one of the following nuclei are well suited for use as desensitizers: nitrobenzothiazole; 2-aryl-1-alkylindole; pyrrolo[2,3-b]pyridine; imidazo[4,5-b]quinoxaline; carbazole; pyrazole; 5-nitro-3H-indole; 2-arylbenzindole; 2-aryl-1,8-trimethyleneindole; 2-heterocyclylindole; pyrylium; benzopyrylium; thiapyrylium; 2-amino-4-aryl-5-thiazole; 2-pyrrole; 2-(nitroaryl)indole; imidazo[1,2-a]pyridine; imidazo[2,1-b]thiazole; imidazo[2,1-b]-1,3,4-thiadiazole; imidazo[1,2-b]pyridazine; imidazo[4,5-b]quinoxaline; pyrrolo[2,3-b]quinoxaline; pyrrolo[2,3-b]pyrazine; 1,2-diarylindole; 1-cyclohexylpyrrole and nitrobenzoselenazole. Dyes containing such nuclei are disclosed in U.S. Pat. Nos. 2,293,261; 2,930,694; 3,501,310; 3,431,111; 3,492,123; 3,501,311; 3,501,312; 3,579,345; 3,574,629; 3,567,456; 3,592,653; 3,582,343; 3,615,639; 3,598,595; 3,598,596 and 3,598,303.

Where the dye is a merocyanine, it can contain in addition to one of the above desensitizing nuclei an acidic nucleus of the ketomethylene type. The following desensitizing acidic nuclei can be employed in merocyanine dyes: pyrido[1,2-a]pyrimidinedione; pyrimido[2,1-b]benzothiazoledione; pyrimido[1,2-a]benzimidazoledione; tetrazolo[1,5-a]pyrimidin-7-one and quaternized 3-anilinopyrazolone; isoxazolone; pyrazolone; pyrido[1,2-a]pyrimidinedione and pyrimido[2,1-b]benzothiazoledione nuclei. Merocyanine dyes containing such nuclei are disclosed in U.S. Pat. Nos. 3,598,595; 3,598,596; 3,598,603; 3,528,811; 3,579,344; 3,539,349 and 3,582,348.

Conventional desensitizers which are not dyes can also be employed, such as paraquat, nitron, thiuram disulfide, piazine, nitro-1,2,3-benzothiazole, nitroindazole and 5-mercaptotetrazole desesitizers. Such desensitizers and their use in silver halide emulsions are described, for example, in U.S. Pat. Nos. 2,271,229, issued Jan. 27, 1942; 2,541,472, issued Feb. 13, 1951; 2,403,927, issued July 16, 1946; 3,184,313, issued May 18, 1965; 3,295,976, issued Jan. 3, 1967; 3,403,025, issued Sept. 24, 1968; and 3,922,545, issued Nov. 25, 1975.

While I have described above a simple photographic element, it is apparent that my process is generally useful with any conventional photographic element, the imaging silver halide emulsion layer or layers of which have been desensitized through the use of a high pAg, preferably halide ion adjusted high pAg. Stated still more generally, it is apparent that any conventional photographic element which exhibits a speed dependence on the pAg of the silver halide imaging layer or layers can be employed in the practice of my process. The halide ions employed for adjusting the pAg can correspond to the halides forming the silver halide grains. I prefer to employ soluble bromide salts, such as alkali metal bromides, to raise pAg. I prefer to employ water soluble silver salts for lowering pAg, such as silver nitrate.

While the above mode of practicing my process employs a photographic element which exhibits an alteration in sensitivity as a function of halide ion adjusted pAg, it is appreciated that my process can be practiced using still other mechanisms of sensitization or desensitization. For example, I can employ in the practice of my process any conventional photographic element having at least one silver halide emulsion layer which is spectrally sensitized with a dye which can be protonated to a colorless form and/or deprotonated to a light absorbing form.

In one mode of practicing my process with such a photographic element, the element with the spectral sensitizing dye in its light absorbing form incorporated in the imaging silver halide emulsion layer is immersed in a polar solvent, such as an acid solution, which is at a sufficiently low pH to protonate and thus decolorize the dye. The pH is adjusted so that protonation of the dye in the absence of ultrasonic exposure requires from about 10 seconds to 10 hours. My process of contacting the acid polar solvent with the photographic element, exposing to ultrasonic radiation and then light and subsequently processing, can then be practiced as I have generally described above. During the light exposure step I prefer to expose the element to a region of the electromagnetic spectrum where the emulsion layer lacks native sensitivity, but where substantial absorption by the unprotonated dye is observed, in order to obtain low minimum density levels. However, this is not required, since the unprotonated dye can be employed to substantially enhance light response even in the spectral region of native sensitivity. It is apparent that these photographic elements are initially light responsive and then are densensitized to light as a function of ultrasonic exposure. Thus, in this form, the elements are ultrasonographically positive-working, as that term has been defined above.

Where the spectral sensitizing dye is of a type which can be converted from an initially colorless form to a light absorbing form by deprotonation, it is apparent that the above-described process can be readily adapted to forming negative ultrasonographic images. In this instance, the dye in its protonated form is incorporated in the imaging silver halide emulsion layer. The polar solvent to be contacted with the element is then chosen so that it is of a higher pH than the emulsion layer so that the element when immersed in the polar solvent experiences a deprotonation of the dye to its chromophoric form in from 10 seconds to 10 hours. By practicing the process as described above, it produces an ultrasonographic negative image, and the element, since it goes from an initially light-insensitive form to a light-sensitive form, is ultrasonographically negative-working, as that term has been defined above.

Exemplary of conventional spectral sensitizing dyes which are known to be protonatable to a colorless form and/or deprotonated to generate the dye chromophore are those disclosed by A. H. Herz, *Photographic Science nd Engineering*, Vol. 18, No. 2, March-April 1974, pages 207 through 215; and VanLare, U.S. Pat. No. 3,482,981, issued Dec. 9, 1962. Preferred spectral sensitizing dyes of this type are benzimidazole carbocyanine dyes. By proper choice of nuclei substituents such dyes can be made to exhibit absorption maxima at wavelengths within the blue, green, red, and infra-red portions of the electromagnetic spectrum.

In addition to spectral sensitizing dyes whose effectiveness can be modified by pH, desensitizers having pH dependence are also known in the art. For example, Itoh, *J. Soc. Sci. Photo.*, Volume 32, page 18, published in 1969, discloses that adenine, a known desensitizer, will adsorb to silver halide grains at a pH of 6, but not at a pH of 2. Similarly E. J. Birr, *Z. Wiss. Phot.*, Volume 49, page 261, 1954; Volume 50, page 107, 1955; and Volume 50, page 124, 1955; discloses the pH dependence of adsorption of tetraazaindenes. E. J. Birr in his book *Stabilization of Photographic Silver Halide Emulsions*, Focal Press, 1974, page 175, discloses that the desensitizers nitrobenzimidazole, mercaptobenzimidazole, mercaptobenzimidazole sulfonic acid, benzotriazole and phenylmercaptotetrazole are selectively adsorbed by silver halide grains at higher pH.

It is apparent that the ultrasonographically positive-working and negative-working elements discussed immediately above illustrate that I can employ ultrasonic radiation to modify locally the pH of an imaging silver halide emulsion layer so that its light response is also locally modified. I can then use this ultrasonically induced modification of the element to generate a viewable ultrasonographic record. Since the component of the emulsion layer in this instance being acted upon is the sensitizer or desensitizer, it is apparent that I can employ generally in the practice of this form of my invention any conventional photographic element comprised of at least one imaging silver halide emulsion layer compatible with such a pH modifiable sensitizer or desensitizer.

The photographic elements described above as being pAg or pH modifiable in their photographic response through the use of ultrasonic radiation can, of course, contain a variety of conventional photographic silver halide emulsion addenda. For example, any of the conventional addenda disclosed in *Research Disclosure* publication 17643, pp. 22–31 and *Product License Index*, publication 9232, pp. 107–110, cited above, not incompatible with obtaining the desired pAg and pH modification effects, can be used in the practice of my process.

The photographic elements described above as being pAg or pH modifiable in their photographic response through the use of ultrasonic radiation represent preferred embodiments of two distinct classes of photographic elements which can be employed in the practice of my process. The photographic elements whose alteration in photographic response is dependent on pAG charge are illustrative of a broad class of photographic elements each having at least one silver halide emulsion layer containing silver halide grains and, adsorbed thereon, a substance chosen from among silver halide emulsion addenda which are diffusible in a polar solvent and which are capable of altering the sensitivity of the silver halide grains to electromagnetic radiation when adsorbed. In such photographic elements ultrasonic radiation initiates or accelerates desorption of the sensitivity modifying addenda from the silver halide grains.

The photographic elements whose alteration in photographic response is dependent on pH are illustrative of a broad class of photographic elements each having at least one silver halide emulsion layer which contains silver halide grains and, adsorbed thereon, a substance chosen from among silver halide emulsion addenda capable of altering the sensitivity of the silver halide grains when adsorbed and capable of being chemically modified to alter their influence on silver halide grain sensitivity by a diffusible reactant introduced into the emulsion layer prior to or during exposure to ultrasonic radiation. In such elements the sensitivity modifying addenda remain adsorbed by the silver halide grains throughout my process. The effect of ultrasonic radiation is to initiate or accelerate diffusion of another substance which will chemically alter the sensitivity controllying characteristic of the adsorbed addenda.

Although the photographic elements are described above in terms of a single silver halide emulsion layer coated on a photographic support, I have found that significant advantages can be obtained in terms of maximum densities and image discrimination (maximum density divided by minimum density) by providing a transport liquid permeable layer in contact with the silver halide emulsion layer and between the emulsion layer and the support. The transport liquid permeable layer can be formed of any of the conventional vehicle materials described above in conjunction with the silver halide emulsions. These layers, hereinafter referred to as undercoats, are preferably formed of a hydrophilic colloid, such as gelatin or a gelatin-derivative, as described above. Undercoat layers of this type are conventional in silver halide photographic elements. It is also recognized that further improvements in maximum densities and image discrimination can be achieved when the silver halide emulsion forms a plurality of layers as opposed to a single layer. In such an arrangement it is preferred that each silver halide emulsion layer be undercoated with a transport liquid permeable layer in contact with the emulsion layer and interposed between the emulsion layer and the support. Conventional photographic elements with vehicle interlayers between adjacent emulsion layers illustrate useful elements of this type.

I specifically recognize that the photographic elements employed, particularly the silver halide emulsion layers thereof employed in imaging, can be protected against the production of fog and can be stabilized against variations of sensitivity during keeping. Useful antifoggants and stabilizers, each used alone, or in combination, include: (a) thiazolium salts described in Brooker et al U.S. Pat. No. 2,131,038 issued Sept. 27, 1938 and Allen et al U.S. Pat. No. 2,694,716 issued Nov. 16, 1954; (b) the azaindenes described in Piper U.S. Pat. No. 2,866,437 issued May 12, 1959 and Heimbach et al U.S. Pat. No. 2,444,605 issued July 6, 1948; (c) the mercury salts as described in Allen et al U.S. Pat. No. 2,728,663 issued Dec. 27, 1955; (d) the urazoles described in Anderson et al U.S. Pat. No. 3,287,135 issued Nov. 22, 1966; (e) the sulfocatechols described in Kennard et al U.S. Pat. No. 3,236,652 issued Feb. 22, 1966; (f) the oximes described in Carroll et al British Pat. No. 623,448 issued May 18, 1949; (g) nitron; (h) nitroindazoles; (i) the mercaptotetrazoles described in Kendall et al U.S. Pat. No. 2,403,927 issued July 16, 1946; Kennard et al U.S. Pat. No. 3,266,897 issued Aug. 16, 1966; and Luckey et al U.S. Pat. No. 3,397,987 issued Aug. 20, 1968; (j) the polyvalent metal salts described in Jones U.S. Pat. No. 2,839,405 issued June 17, 1958; (k) the thiuronium salts described in Herz et al U.S. Pat. No. 3,220,839 issued Nov. 30, 1965; and (l) the palladium, platinum and gold salts described in Trivelli et al U.S. Pat. No. 2,566,263 issued Aug. 28, 1951; and Yutzy et al U.S. Pat. No. 2,597,915 issued May 27, 1952.

The viewable image produced in each of the various modes of practicing my invention discussed can be either a silver image, a dye image or a combination of both. Dye images can be formed through the use of a color developer composition and color couplers, for example. The color couplers can be incorporated in either the developer composition, as in the case of mobile couplers, or in the photographic element, as in the case of ballasted couplers. Ballasted couplers are typically incorporated directly in the imaging silver halide emulsion layer or in a layer adjacent thereto. Generally any color image forming approach which makes use of a silver image can be employed in the practice of my process. Color materials are discussed, for example, in *Research Disclosure,* Item 17643, paragraph VII, and *Product Licensing Index,* Item 9232, paragraph XXII, both cited above.

I specifically contemplate the use of redox dye-releasers in forming dye images. The redox dye-releasers are initially immobile and undergo oxidation followed, in certain instances, by hydrolysis in an aqueous alkaline environment to provide an imagewise distribution of a mobile image dye. Compounds of this type are disclosed, for example, in Whitmore et al, Canadian Pat. No. 602,607 (issued Aug. 2, 1960); Fleckenstein, Belgian Pat. No. 788,268 (issued Feb. 28, 1973); Fleckenstein et al, published U.S. Patent Application Ser. No. B351,673 (published Jan. 28, 1975); Gompf, U.S. Pat. No. 3,698,897; Becker et al, U.S. Pat. No. 3,728,113; Anderson et al, U.S. Pat. No. 3,725,062; and U.S. Pat. Nos. 3,443,939; 3,443,840; 3,443,841; 3,390,380 and the like; all of which are herein incorporated by reference. The released mobile image dye can be transferred to a receiver element, if desired, to form a viewable image. Alternatively, the mobile image dye can be rinsed or otherwise removed from the ultrasonographic element and dye image formed by the retained immobile redox dye-releasers can be directly viewed in the element itself.

As is well recognized in the art, photographic elements containing one or more silver haide emulsion layers can take the form of varied photographic systems intended to produce a visible image in a particular form or in response to processing of a particular type. The ultrasonographic process of this invention can be readily applied to such varied photographic systems. For example, the process of this invention can be applied to forming an ultrasonographic image in a photothermographic system. This can be achieved by imagewise exposing a photothermographic layer of a photothermographic element to ultrasonic radiation at an intensity and for a duration sufficient to alter the exposure response of the photothermographic layer to electromagnetic radiation, but below that which will produce a latent image in the absence of externally applied electromagnetic radiation. The photothermographic layer can be concurrently or subsequently exposed to electromagnetic radiation to produce a latent image therein defined by the imagewise ultrasonic radiation exposure. The exposed photothermographic element can then be uniformly heated to a temperature and for a time sufficient to produce a visible image in the photothermographic layer. A variety of photothermographic materials can be used for forming a visible ultrasonographic image. The photothermographic materials that can be useful are described in, for example, *Research Disclosure,* June 1978, Item 17029, pages 9–15, the disclosure of which is incorporated herein by reference. The photothermographic element that can be useful can comprise, for example, the following components on a suitable support: (a) photosensitive silver halide prepared in situ or ex situ, (b) an oxidation-reduction image-forming combination comprising (i) a metallic salt or complex of an organic compound as an oxidizing agent and (ii) an organic reducing agent or developing agent, and (c) a vehicle or binder. Since silver halide grains are present dispersed in the vehicle or binder, it is apparent that the photothermographic layer is a silver halide emulsion layer. The silver halide and the oxidation-reduction image-forming combination can be coated in contiguous adjacent layers rather than in a single photothermographic layer, if desired.

Ultrasonographic imaging by this process can also be applied to image transfer photographic systems. Image transfer systems can be employed which are of either the peel apart or integral format type. In employing the peel apart image transfer systems little, if any, variation in conventional image transfer photographic procedures are required. The silver halide emulsion layer or layers of the image-forming portion of the peel apart system are brought into contact with a transport liquid capable of providing a diffusion medium and imagewise ultrasonically exposed. Thereafter nonimagewise light exposure is undertaken and photographic processing subsequent thereto is undertaken in a manner conventional in image transfer photography. Upon lamination to a separate receiver and peel apart, a retained and/or transferred ultrasonographic image is produced.

Using an integral format image transfer system it is usually not convenient to bring an external transport liquid into contact with the silver halide emulsion layers, since the integral format usually forms a liquid impermeable unit. A transport liquid capable of providing a diffusion medium in contact with the emulsion layer or layers can be provided, however, by releasing the internal processing liquid into contact with the emulsion layer or layers prior to ultrasonic exposure. Imagewise ultrasonic exposure can then be undertaken. Since light exposure must occur during or after ultrasound exposure, the processing liquid is free of any opacifying agent, and the integral format system is of a form which employs a preformed reflective layer for the image which is positioned not to interfere with light exposure of the silver halide emulsion layer. Where the silver halide emulsion layer or layers are initially light desensitized, as in the case of an ultrasonographically negative-working element, the integral format can be, but preferably is not, exposed to ambient light before ultrasound exposure. Ultrasonographically positive-working elements can be intentionally light exposed prior to ultrasound exposure to adjust the light response characteristic of the emulsions, as has been discussed above. In a simple form of practicing this process with an integral format system the only active steps required are bringing the processing liquid into contact with the emulsion layer or layers and imagewise ultrasonically exposing. Ambient light can perform the light exposure step, and the processing liquid can complete photographic processing to produce a visible transferred image. However, to assure uniformity of the ultrasonographic image the process preferably includes a positive step of nonimagewise light exposure and subsequent processing of the element in the dark. Once development has been terminated, as by release of acid by a timing layer, the ultrasonographic image is viewed under ambient lighting conditions.

Image transfer systems useful in the practice of this invention include colloid transfer systems, as illustrated by Yutzy et al U.S. Pat. Nos. 2,596,756 and 2,716,059; silver salt diffusion transfer systems, as illustrated by Rott U.S. Pat. No. 2,352,014, Land U.S. Pat. No. 2,543,181, Yackel et al U.S. Pat. No. 3,020,155 and Land U.S. Pat. No. 2,861,885; imbibition transfer systems, as illustrated by Minsk U.S. Pat. No. 2,882,156, and color image transfer systems, as illustrated by *Research Disclosure*, Vol. 151, November 1976, Item 15162, and Vol. 123, July 1974, Item 12331.

Useful color image transfer systems (including emulsion layers, receiving layers, timing layers, acid layers, processing compositions, supports and cover sheets) and the images they produce can be varied by choosing among a variety of features, combinations of which can be used together as desired.

Film units can be chosen which are either integrally laminated or separated during exposure, processing and/or viewing, as illustrated by Rogers U.S. Pat. No. 2,983,606, Beavers et al U.S. Pat. No. 3,445,228, Whitmore Canadian Pat. No. 674,082, Friedman et al U.S. Pat. No. 3,309,201, Land U.S. Pat. Nos. 2,543,181, 3,053,659, 3,415,644, 3,415,645 and 3,415,646 and Barr et al U.K. Pat. No. 1,330,524.

Chemistries which are referred to in image transfer photography as positive-working can be chosen utilizing initially mobile dyes which are immobilized by development, as illustrated by Rogers U.S. Pat. No. 2,983,606, Yutzy U.S. Pat. No. 2,756,142, Lestina et al U.S. Pat. No. 3,880,658, Bush et al U.S. Pat. No. 3,854,945 and Janssens et al U.S. Pat. No. 3,839,035, or initially immobile dyes which are rendered mobile by development, as illustrated by Hinshaw et al U.K. Pat. No. 1,464,104 and Fields U.S. Pat. No. 3,980,479; or, conversely, negative-working image transfer chemistries can be chosen utilizing the release of diffusible dyes from an immobile image dye-forming compound as a function of development, as illustrated by Belgian Pat. No. 838,062, Whitmore et al Canadian Pat. No. 602,607 and U.S. Pat. No. 3,227,550, Bloom et al U.S. Pat. No. 3,443,940, Puschel, et al U.S. Pat. Nos. 3,628,952 and 3,844,785, Gompf et al U.S. Pat. No. 3,698,897, Anderson et al U.S. Pat. No. 3,725,062, Becker et al U.S. Pat. No. 3,728,113, Fleckenstein U.S. Pat. No. 4,053,312, Fleckenstein et al U.S. Pat. No. 4,076,529, Melzer et al U.K. Pat. No. 1,489,695, Degauchi German OLS 2,729,820 and Kestner et al *Research Disclosure*, Vol. 151, November 1976, Item 15157.

Silver halide emulsions particularly preferred for use in image transfer systems include emulsions used with image-reversing techniques, as illustrated by Barr et al U.S. Pat. No. 3,227,551, Danhauser et al U.S. Pat. No. 3,736,136, Whitmore et al U.K. Pat. No. 904,364 (page 19), Barr et al U.K. Pat. No. 1,330,524, Wingender et al U.S. Pat. No. 3,925,075, Pfaff U.S. Pat. Nos. 4,047,952, and 4,047,953, and Schwan et al U.S. Pat. No. 3,630,731; direct-positive emulsions can be chosen, including those of the fogged type as disclosed in Leermakers U.S. Pat. No. 2,184,013, Kendall et al U.S. Pat. No. 2,541,472 and Whitmore et al U.S. Pat. No. 3,227,550, and direct reversal emulsions of the unfogged internal latent image-forming type employed with fogging development as disclosed in Whitmore U.S. Pat. No. 3,227,552, Gilman et al U.S. Pat. No. 3,761,267, Evans U.S. Pat. No. 3,923,513 and Klotzer et al U.S. Pat. No. 3,957,488.

An image to be viewed can be retained in or transferred from the image-forming layers. A retained image can be formed for viewing as a concurrently formed complement of the transferred image. Images retained in and transferred from the image-forming layers are illustrated by U.K. Pat. No. 1,456,413, Friedman U.S. Pat. No. 2,543,691, Bloom et al U.S. Pat. No. 3,443,940, Staples U.S. Pat. No. 3,923,510 and Fleckenstein et al U.S. Pat. No. 4,076,529.

One-step photographic processing can be employed, as illustrated by U.K. Pat. No. 1,471,752, Land U.S. Pat. No. 2,543,181, Rogers U.S. Pat. No. 2,983,606 (pod processing), Land U.S. Pat. No. 3,485,628 (soak image-former and laminate to receiver) and Land U.S. Pat. No. 3,907,563 (soak receiver and laminate to image-forming element); or multi-step photographic processing can be employed, as illustrated by Yutzy U.S. Pat. No. 2,756,142, Whitmore et al U.S. Pat. No. 3,227,550 and Faul et al U.S. Pat. No. 3,998,637.

Preformed reflective layers can be employed as illustrated by Whitmore Canadian Pat. No. 674,082, Beavers U.S. Pat. No. 3,445,228, Land U.S. Pat. Nos. 2,543,181, 3,415,644, 3,415,645 and 3,415,646, and Barr et al U.K. Pat. No. 1,330,524.

PREFERRED ULTRASONIC EXPOSURE APPARATUS

My process can be practiced using conventional ultrasonic exposure apparatus or adaptations of such apparatus, as has been described above. However, certain advantages can be achieved by employing my preferred exposure apparatus. Such apparatus can take the form of a sonographic sensitometer or a sonographic camera.

In FIG. 20, a preferred sonographic sensitometer 100 according to the invention is illustrated. An outer reservoir 102 confines a first transport liquid 104. Adjacent the bottom wall 102A of the outer reservoir are positioned an array of ultrasonic transducers 106. The ultrasonic transducers can be of conventional construction and, by suitable connections to energy sources, not shown, can be made to emit continuous, modulated or pulsed ultrasonic radiation into the first transport liquid reservoir at selected intensities and frequencies. In a preferred form, the tranducers are supplied with energy in a stepped relationship so that each transducer radiates ultrasonic energy at a predetermined multiple or fraction of that emitted by a next adjacent transducer. In this way, the transducers collectively form an array of ultrasonic radiation emitters which vary in a predetermined manner in their intensity of emission.

Located within the outer reservoir is an ultrasound reception unit 110. The unit is positioned by supports 112 in a fixed spatial relationship to the outer container and the ultrasonic transducers. The ultrasound reception unit includes rigid barrier walls 114 which turn inwardly at their lower edges to form an integral flange 114A. The flange, together with a flexible membrane 116 sealed to the upper surface of the flange, form an inner or second reservoir for a second transport liquid 118. The barrier walls are provided with an outer covering 120 of a sound-absorbing material. The flexible membrane is formed of a liquid-impermeable, ultrasonically transmissive material.

A damper unit 122 is positioned in contact with the second transport liquid. Photographic element 124 to be ultrasonically exposed is interposed between the second reservoir and the damper unit in contact with the second transport liquid. The photographic element is pulled from a supply spool 126 rotatably mounted in a light-tight box 128 by a pair of drive rolls 130 and 132 rotatably attached to the second reservoir by mounting bracket 134. The light-tight box includes a lug 128A which cooperates with a bayonet slot 114B on the inner surface of the adjacent barrier wall to mount the box removably in position. Identical guide rolls 136 and 138 are rotatably attached to the damper unit by mounting brackets 140 and 142, respectively. One or both of the drive rolls can be driven by a motor or other drive mechanism, not shown, while the supply spool can be constructed to provide enough frictional drag for the photographic element to remain taut. In one preferred form, the photographic element can be provided along one or both edges with apertures to permit sprocket feed of the element.

A peripheral skirt 144 supports the damper unit in fixed spatial relation with the second reservoir. The skirt, together with the bottom walls of the damper unit and the second reservoir, forms an exposure chamber 146 for the photographic element. The skirt is provided with guide slots 148 and 150 to permit the photograhic element to be drawn through the exposure chamber. Within the exposure chamber, the damper unit provides an ultrasound absorptive layer 152 in contact with its bottom wall 122A. To seal the exposure chamber adjacent to the guide slots, pressure-expansible bladders 154 and 156 are provided connected to fluid conduits, not shown, extending through the skirt. To permit selective circulation of the transport liquid within the exposure chamber, ports 158 and 160 are provided, which can be connected through the skirt to liquid conduits, not shown. At least the bottom wall and the ultrasound absorptive layer of the damper unit are capable of transmitting light. They can be translucent, but are preferably substantially transparent. A light source 162 is positioned above the damper unit.

The sonographic sensitometer 100 can be used to establish an ultrasonographic characteristic curve for a photographic element to be employed in the practice of this process. As discussed elsewhere in the specification, an ultrasonographic characteristic curve is a plot of intensity of ultrasound exposure versus density (following ultrasound and light exposure and photographic processing) in ultrasonically exposed areas. The sensitometer permits exposure of the photographic element to a number of different ultrasonic intensity levels in a single process step.

Where the support of the photographic element being employed in the sensitometer does not appreciably absorb ultrasonic energy, the silver halide emulsion layer or layers of the element can be positioned on the surface of the support nearest or farthest from the ultrasonic transducers. It is preferred that the emulsion coated surface of the photographic elements be positioned nearest the ultrasonic transducers.

The advantages of the sonographic sensitometer 100 can be illustrated by describing its use with reference to the photographic element 124 in the form of an photographic film having a single silver halide emulsion layer coated on a single major surface thereof. Preferably the entire procedure until processing is completed, except for the light exposure step, is conducted in the dark, although this is not necessary where the photographic element is ultrasonically negative-working.

The first transport liquid 104 of any convenient composition is introduced into the outer reservoir. The ultrasound reception unit 110 is next prepared for use by introducing a second transport liquid into the second reservoir to form the second transport liquid 118. The photographic element with the silver halide emulsion layer on the surface remote from the damper unit 122 is fed from the supply spool 126, over the guide roll 136, through the guide slots 148 and 150, over the guide roll 138 and between the drive rolls 130 and 132. The apparatus is now ready for use substantially as shown in FIG. 20.

The drive rolls are activated to bring a length of the photographic element not previously in contact with the second transport liquid into the exposure chamber 146. The expansible bladders 154 and 156 are then inflated substantially to seal the exposure chamber. The bladders press against the photograhic element, causing it to lie against the surface of the ultrasound absorptive layer 152. This fixes the element securely in the desired plane for ultrasound exposure. The element can be allowed to remain in contact with the second transport liquid in the exposure chamber for a short period prior to exposure, as has been described in connection with this process, or the element can be imagewise ultrasonically exposed without delay after being positioned as described within the exposure chamber.

During ultrasound exposure, the ultrasonic transducers 106 each transmit ultrasonic energy into the first transport liquid, through the ultrasonically transmissive membrane 116 forming the lower wall of the second container, through the second transport liquid in the exposure chamber and to the silver halide emulsion layer of the ultrasonographic element. Each transducer emits ultrasound at a different level of intensity, and ultrasound is received at different intensity levels in differing areas of the photographic element. Light exposure of the photographic element film can occur during or after ultrasound exposure. As has been discussed above in connection with this process, it is generally preferred that light exposure be delayed for a short period after ultrasound exposure. Light travels from the light source 162 through the bottom wall 122A of the damper unit and the ultrasound-absorptive layer 152.

During ultrasound exposure, it is desired to expose the photographic element to ultrasound transmitted from the tranducers 106 through the transport liquid 104, the membrane 116 and the transport liquid in the exposure chamber 146 while protecting the element from exposure by ultrasound which has passed through the element and then been reflected back. The damper unit 122 protects the photographic element from such reflected ultrasonic energy. If the photographic element is clamped into the position shown for exposure, but with the damper unit omitted, the second transport liquid 118 forms an interface with air behind the photographic element. That is, the photographic element is interposed in the second transport liquid between the air-liquid interface and the ultrasonic transducers. Ultrasound passing through the photographic element causes a wave pattern to form at the surface of the second transport liquid behind the element. Ultrasonic energy reflected back from the air-liquid eservoir interface bearing the wave pattern produces background nonuniformities in the ultrasonographic pattern produced in the photographic element. With the damper unit interposed between the second transport liquid and ambient air, a wave pattern is prevented from forming behind the photographic element during ultrasound exposure. This greatly enhances the definition of the transmitted ultrasound pattern by the photographic element.

The ultrasound absorptive layer 152, though not necessary to avoid wave formation, offers further protection against ultrasound reflection from the bottom wall of the damper unit. The ultrasound-absorptive layer is analogous to a photographic antihalation layer. This layer can, in fact, be located on the surface of the photographic element remote from the ultrasound transducers and actually form a part of the photographic element being exposed. However, the ultrasound-absorptive layer, though advantageous, is not an essential feature in either the apparatus or the photographic element.

The ultrasonic exposure of the photographic element is at an intensity below that required to form a latent image in the silver halide emulsion layer. The ultrasound exposure merely alters the sensitivity of the silver halide emulsion layer to light exposure. After ultrasonic exposure has occurred and before light exposure has formed a latent image in the photographic element, image definition can be degraded by even small disturbances in the transport liquid in contact with the photographic element. Disturbance of the second transport liquid is greatly reduced by its restriction within the exposure chamber. To protect the exposure chamber further from disturbances, the first container acts as a shock absorber. In actual use, it has been shown that a shock or blow delivered to the first container is substantially entirely dissipated in the first transport liquid even when the outer covering 120 is omitted. The outer covering, however, provides additional protection. Once the developable latent image is formed in the silver halide emulsion layer of the photographic element, the element can be thereafter handled in accordance with conventional photographic processing techniques and is not susceptible to degradation or obliteration under ordinary conditions of handling.

Depending upon the specific choices of transport liquid and photographic element, diffusion of a sensitivity altering material can occur in the exposure chamber from the silver halide emulsion layer of the photographic element into the polar solvent forming the second transport liquid or from the polar solvent into the silver halide emulsion layer. Diffusion into or out of the photographic element occurs at least during ultrasonic exposure and may occur also before and/or after ultrasonic exposure. In any case, the composition of the polar solvent within the exposure chamber is at least slightly altered as a result of this diffusion. Changes in the composition of the second transport liquid can lead to variations in the ultrasonographic exposure patterns being produced.

Before the expansible bladders are deflated to permit the photographic element to be drawn from the exposure chamber, the polar solvent in the exposure chamber is displaced by fresh polar solvent using the ports 158 and 160. Because of the relatively restricted volume of the exposure chamber, this can be accomplished very quickly. The small amount of liquid withdrawn from the exposure chamber can either be processed to its original composition and returned to the second transport liquid, or else simply discarded.

In FIG. 21, a sonographic camera 200 is shown. The camera includes a reservoir 202 confining a transport liquid 204 which can be identical to the first transport liquid 104. Contained within the reservoir is an object 206 intended to modulate or imagewise configure ultrasonic energy emanating from ultrasonic transducer 208. The object, of course, is the subject and not itself a part of the sonographic camera. An ultrasonic mirror 210 (such as a polished metal plate) is positioned in the reservoir. As indicated by dashed lines 212 and 214, which schematically illustrate ultrasound propagation paths, the ultrasonic mirror is positioned to reflect ultrasound so that it impinges upon the ultrasonic reception unit 110. The ultrasonic reception unit is operated identically as in the sonographic sensitometer 100, described above.

Although the preferred sonographic sensitometer and camera have been described with reference to specific embodiments, it will be appreciated that the advantages of this preferred apparatus can be achieved at least in part when the structure of the specific embodiments is varied. For example, referring to the sonographic sensitometer, when the ultrasonic transducers 106 are positioned in the exposure chamber 146, it is apparent that the outer reservoir 102 and the first transport liquid 104 can be eliminated. In another variant form, the damper unit 122 is omitted. In this case guides or clamps, not shown, can be used to hold the photographic element against the skirt. The element then forms the upper wall of the exposure chamber. Although the function of the damper unit in reducing reflected ultrasound is lost, the advantages of having a separate exposure chamber are retained. In this regard it is pointed out that the exposure chamber need not be sealed to fluid in order to be effective. It is sufficient that the flow of transport liquid into and out of the exposure chamber is restricted. Thus, the bladders are not required.

The ultrasound reception unit, when present in the sonographic camera, is subject to similar modifications as those described above, although the ultrasonic transducers generally would not be located in the reception unit. The use of an ultrasonic mirror in the sonographic camera is not required. The object and ultrasonic transducer 208 can be relocated so that no reflection of ultrasound is required to impinge ultrasound on the reception unit. For example, the ultrasound reception unit can be positioned to intercept ultrasound which is reflected rather than transmitted by the object. Although a comparatively simple sonographic camera configuration has been illustrated, it is appreciated that sonographic camera configurations can be employed using a variety of ultrasonic mirror and ultrasonic lens arrangements heretofore known for use in sonographic cameras and ultrasonoscopes.

The light source can be integrated with the damper unit so that one unit performs both functions. It is also possible to reposition the light source so that the photographic element is both ultrasonically and light-exposed from the same side. In still another variant form, the light source need not form a part of the apparatus at all. Its function can be performed by a separate light source, or ambient light can be relied upon for latent image formation.

Although this apparatus is shown in a form particularly adapted to feed a photographic film, it is appreciated that this apparatus can be adapted without the exercise of invention to the exposure of elements in the form of discrete sheets or strips. The drive rolls 130 and 132, in addition to advancing the photographic element, can be used to laminate a receiver to the photographic element to produce a transferred image. For example, the receiver can contain a developing agent and an alkali which are activated by the polar solvent ingested in the photographic element during transport through the exposure chamber. Photographic processing then begins immediately upon laminating the receiver to the photographic element. Alternatively, the alkali can be incorporated in the polar solvent in the second transport liquid, which then becomes an activator bath. In still another form, the second transport liquid can be a developer bath. Other variations will readily occur to those of ordinary skill in the art in view of this disclosure.

The preferred sonographic sensitometer and camera described above is the subject matter of my commonly assigned, concurrently filed, patent application Ser. No. 030,972, titled ULTRASONOGRAPHIC EXPOSURE APPARATUS.

The foregoing discussion is considered sufficiently complete to permit those familiar with the photographic and ultrasonic arts to practice this process. To the extent that specific details and variants of this process and means for its practice are not explicitly discussed they can be appreciated by reference to the photographic and ultrasonographic arts. For example, it is contemplated that the ultrasonic and light exposure and processing steps of this process can be practiced within the temperature ranges conventionally employed in photography and that the elements employed can be chosen from among photographic elements generally.

The invention can be further described by the examples illustrated below.

EXAMPLE 1

Imaging as a Function of Ultrasonic and Light Exposures

A cubic-grained gelatino-silver bromide emulsion free of surface chemical sensitization and having a mean grain diameter of 0.2 micron, to which a desensitizing dye of the formula (1)

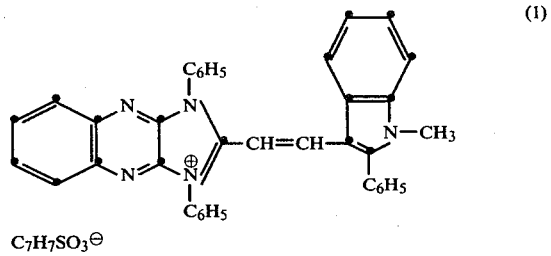

$C_7H_7SO_3^{\ominus}$ had been added at a level of $1.0 \times 10^{-4}$ mole per mole of silver, was coated on a polyethylene terephthalate (hereinafter referred to as PETP) film support to obtain silver coverage of 3.2 grams per square meter and gelatin coverage of 2.7 grams per square meter.

The resulting desensitized photographic element was divided into five (5) separate strips, and each strip was separately exposed in a sonographic sensitometer. The sonographic sensitometer was made up of a rectangular plastic vessel open at its top and containing a water reservoir. Arranged along the bottom wall of the vessel were twelve (12) ultrasonic transducers. The ultrasonic transducers each presented a circular emitting surface of 0.785 square centimeters, as viewed from above, and were arranged in a row, adjacent transducers being separated by 2.4 cm, with power levels supplied to the transducers increasing by a factor of 2 in going from one transducer to another adjacent thereto. Except for the power supplied to each transducer, they were identical. The emitting surfaces of the transducers were in contact with the water in the reservoir. The ultrasonic frequency supplied to the transducers was 5 megahertz. Each strip to be tested was immersed in the reservoir just beneath its surface and held spaced from the transducers by about 15.0 cm using a suitable clamp to hold the strip flat and in position. Approximately 20 cm above the mounted strip was positioned a lamp. The lamp used for light exposure contained two General Electric high arc cool white fluorescent tubes, F 24T 12 CW HO.

Each strip was immersed for a specified time before exposure. The exposures were as follows:

Strip 1 was immersed in the reservoir for 25 seconds and then exposed imagewise to ultrasonic energy for 10 seconds. There was no subsequent light exposure.

Strip 2 was immersed for 15 seconds, exposed uniformly to light for 10 seconds and then exposed imagewise to ultrasonic energy for 10 seconds.

Strip 3 was immersed for 25 seconds and then exposed uniformly to light for 10 seconds. There was no ultrasonic exposure.

Strip 4 was immersed for 15 seconds, exposed imagewise to ultrasonic energy for 10 seconds and then exposed uniformly to light for 10 seconds.

Strip 5 was immersed for 25 seconds and then exposed to ultrasonic energy imagewise and to light uniformly simultaneously for 10 seconds.

The strips were processed for three (3) minutes in D-19 developer, fixed, washed and dried.

Figure 1:
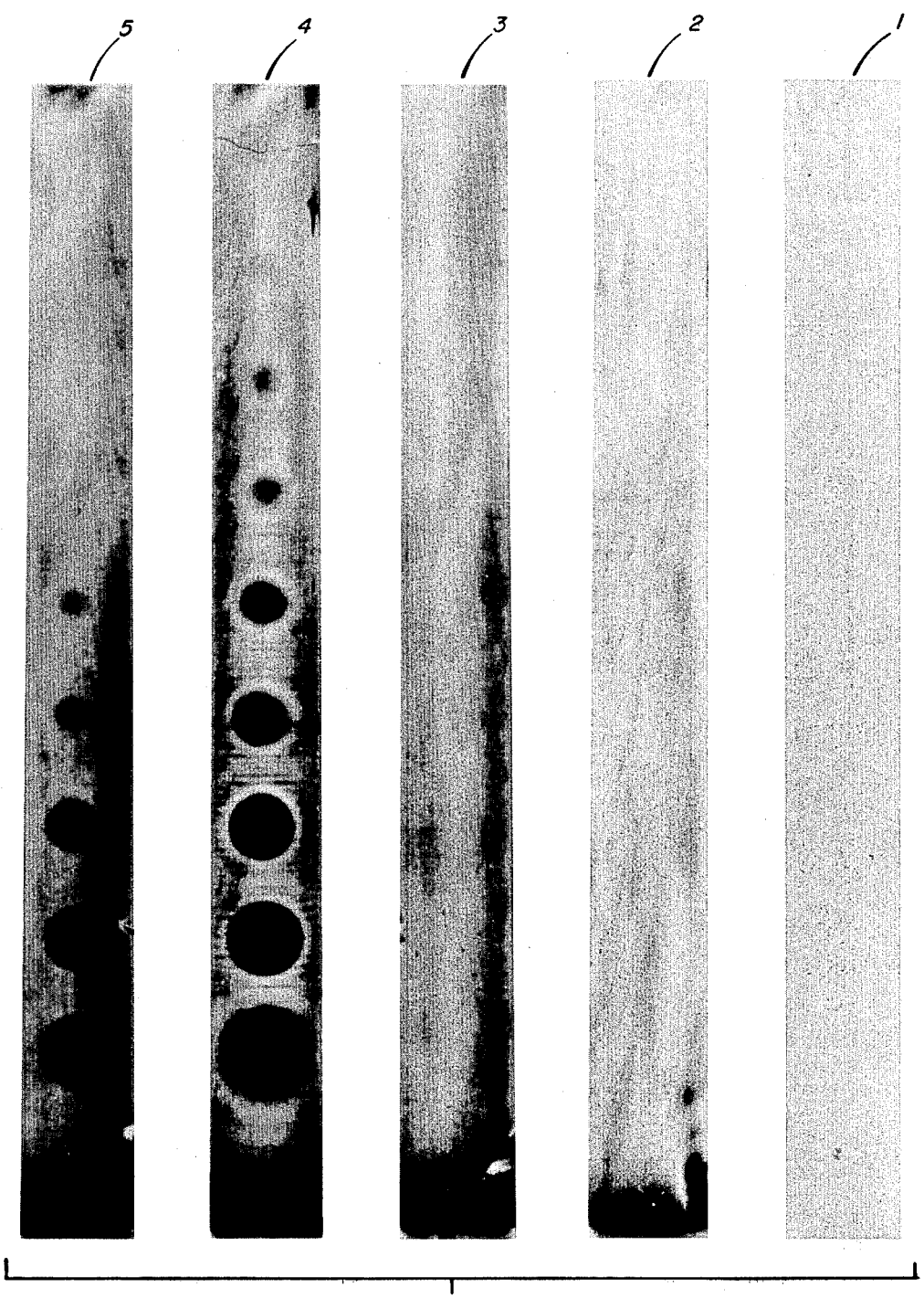
Figure 2:
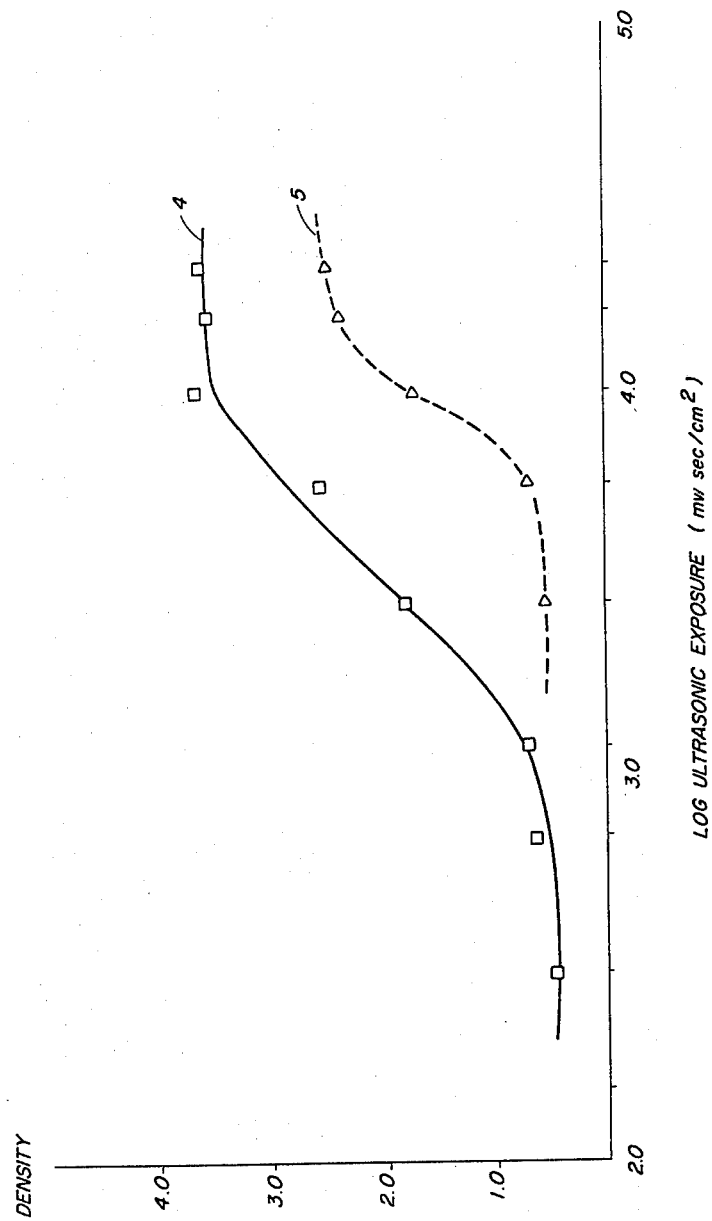
FIGS. 2, 4, 6, 8, 10, 11, 16 and 18 are plots of the log of ultrasonic exposure versus density in ultrasonically exposed areas.

As can be seen by referring to FIG. 1, strip 1 was uniformly clear. Strips 2 and 3 were the same in appearance. Both were fogged due to light exposure, but neither showed an image in areas exposed to ultrasonic energy. Strips 4 and 5 were also fogged to the same extent as strips 2 and 3 but ultrasonic images were obtaned as well. They appeared as areas of greater density, the density increasing as a function of the power supplied to the transducers. The density of the ultrasonographic image for Strips 4 and 5 is plotted versus the log of the ultrasonic exposure expressed in milliwatt-seconds per square centimeter (mw-sec/cm$^2$) in FIG. 2. It is clear that Strip 4 was more sensitive to ultrasonic energy than Strip 5. Less exposure was required for ultrasonographic imaging and the density produced by each transducer on Strip 4 was greater than that produced by the same transducer on Strip 5. The background density (fog) due to light exposure was 0.5.

When the above-described procedure is repeated, but with Kodak Developer D-19 substituted for the water reservoir, a qualitatively similar result is obtained with each of Strips 1 through 5. Ultrasonic exposure alone produces no density, and light exposure alone produces only uniform fog. Ultrasonic exposure after light exposure does not produce appreciably different results than light exposure alone. Ultrasonic exposure concurrently with light exposure or before light exposure produces an ultrasonographic image. The photographic elements exhibit enhanced light sensitivity in developer as opposed to water.

EXAMPLE 2

Dye Imaging with Redox Amplification

The emulsion of Example 1 containing in addition an incorporated cyan coupler of formula (2) was coated on a PETP film support to obtain silver coverage of 0.10 g/m$^2$, coupler coverage of 1.1 g/m$^2$ and gelatin coverage of 2.7 g/m$^2$.

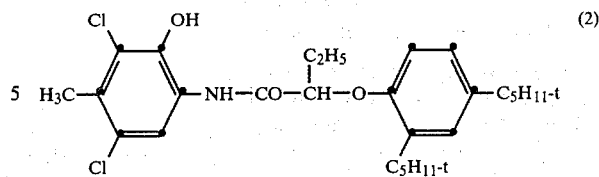

One strip of the coating was exposed in water in the sonographic sensitometer of Example 1. The strip was immersed for fifteen seconds, then exposed imagewise to ultrasonic energy for ten seconds, subsequently exposed uniformly to light for ten seconds, processed for four minutes in a color developer of the composition described in U.S. Pat. No. 3,989,526, Example 10 for the processing of strip 2 therein, washed and dried. Cyan dye ultrasonographic images were obtained, the size and density of which were directly proportional to the power of the ultrasonic transducer.

EXAMPLE 3

Imaging in the Absence of a Desensitizing Dye

An emulsion identical to that of Example 1, except that no desensitizing dye was present, was coated on a PETP film support as in Example 1. The coating was divided into several strips. Fourteen (14) strips were used for wet sensitometry, or immersion testing, and two were used for recording ultrasonographic images. Except as specifically stated, exposures and processing were identical to that employed for Strip 4 in Example 1.

Figure 3:
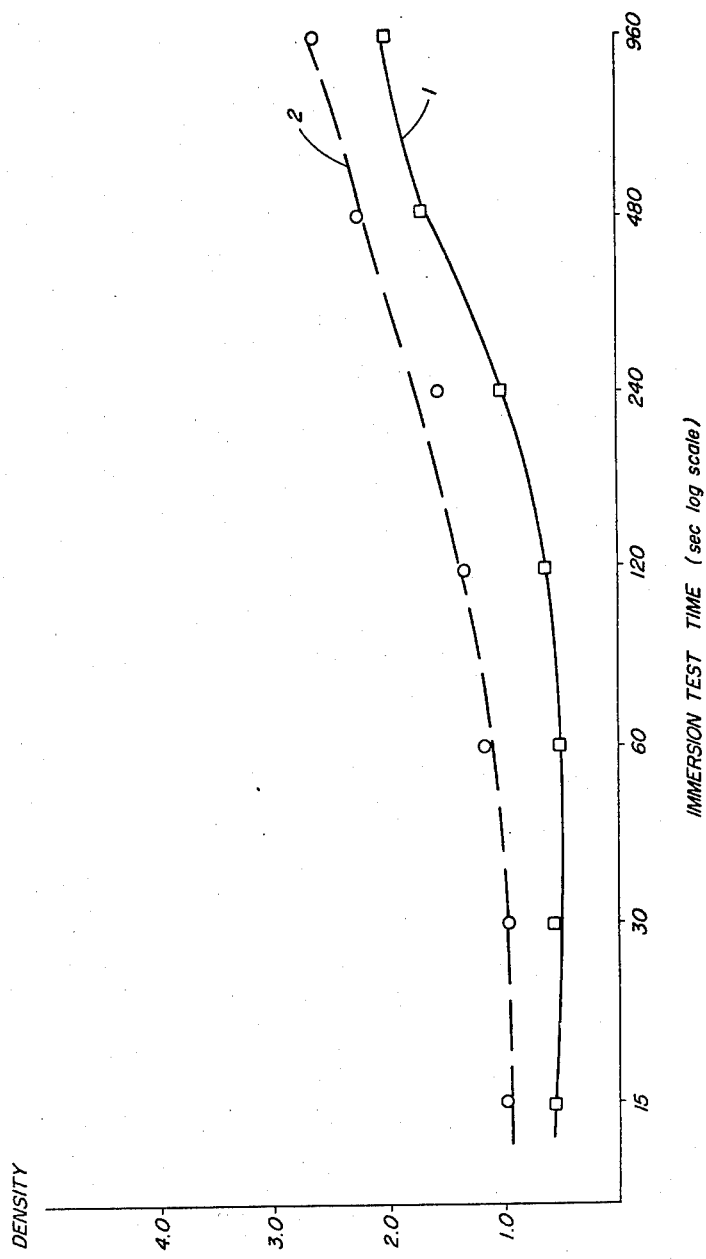
FIGS. 3, 5, 7, 9 and 17 are plots of selection procedure polar solvent contact times in seconds, plotted on a log scale, versus density.

The fourteen strips used for immersion testing were divided into two groups of seven (7) strips each, hereinafter designated Set 1 and Set 2. A strip from each set was immersed in water for a period of seconds, as indicated in FIG. 3. At the end of the immersion period the strips of Set 1 all received a light exposure, the log of which, expressed in foot-candle units, was 0.85. The strips of Set 2 were identically light exposed, but at a log intensity of 1.0, based on foot-candle units. FIG. 3 graphically illustrates the results of the immersion tests. As would be expected, higher densities were exhibited by the set receiving the higher intensity exposure to light, intensities being measured at the film plane. Sets 1 and 2 each show a gradual increase in light sensitivity as a function of immersion time and more developed density initially than is observed in coatings with desensitizing dye present. Photographic processing of each strip after immersion and light exposure was identical with that of Example 1.

Figure 4:
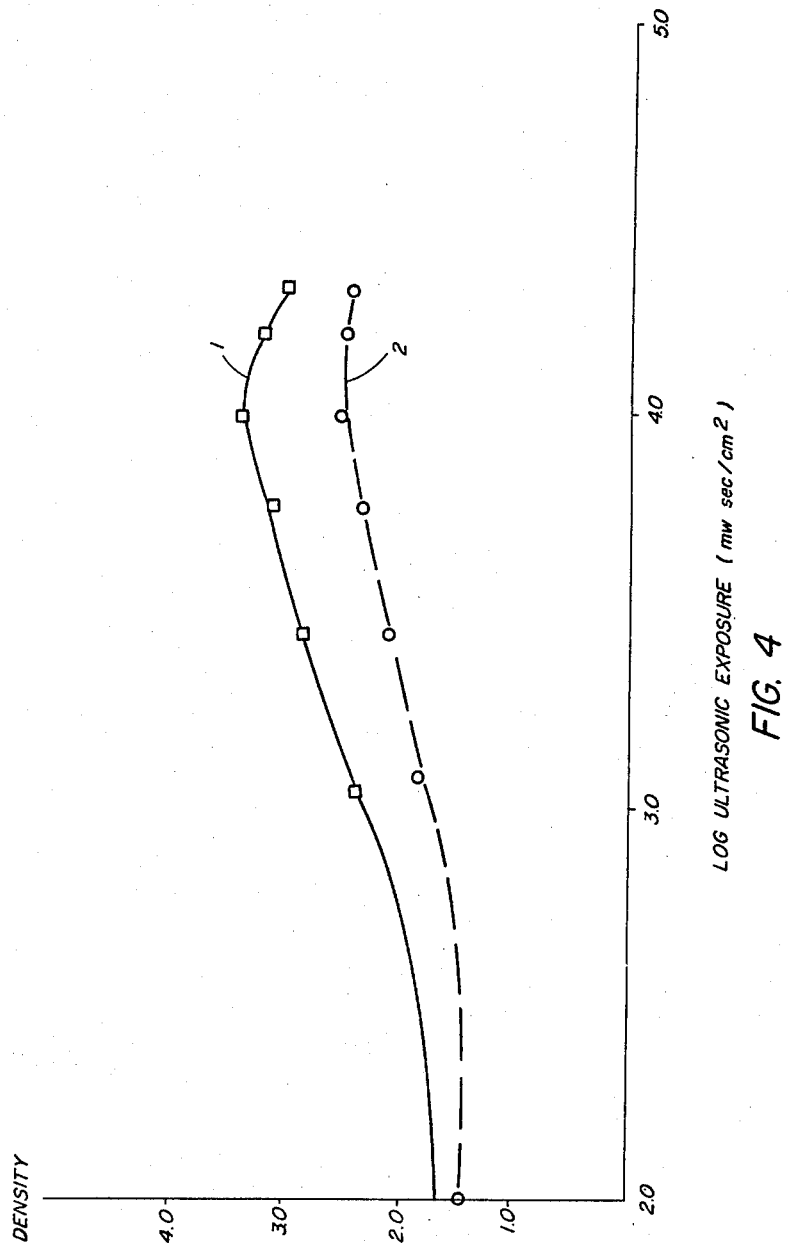

The two remaining strips were imagewise exposed and processed as follows: Strip 1 was immersed in water in the sonographic sensitometer of Example 1 for 15 seconds, then exposed imagewise to ultrasonic energy for ten seconds and subsequently exposed uniformly to light for ten seconds. Strip 2 was exposed in the same way as Strip 1, except that light exposure was five seconds. The curves in FIG. 4 show the ultrasonographic characteristic curves produced by Strips 1 and 2. As expected from the immersion tests, Strip 1, with the longer light exposure, produced a higher maximum density and both strips tended to show more background density than did strips with desensitizing dye present. The ultrasonographic characteristic curves of Strips 1 and 2 clearly show both to be suitable for ultrasonographic imaging.

EXAMPLE 4

Imaging Emulsions Known to be pAg Sensitive

In a number of occurrences in the published photographic literature silver halide emulsions have been identified as exhibiting increasing sensitization (or decreasing densitization) as a function of lowering the pAg of the emulsion. Illustrative of such publications are the following:

(1) Mee and James, The Theory of the Photographic Process, 3rd Ed., Chap. 12, 252, 258–259 (1966).
(2) S. D. Natanson, J. Photogr. Sci., 10, 9–14 (1962).
(3) S. S. Collier and P. B. Gilman, Photogr. Sci. Eng., 16, 413–420 (1972).
(4) R. W. Berriman and P. B. Gilman, Photogr. Sci. Eng., 17, 235–244 (1973).
(5) P. B. Gilman, Photogr. Sci. Eng., 18, 475–485 (1974).

To illustrate the applicability of my invention to such emulsions, a 1.0 to 1.25 micron silver bromoiodide internally fogged emulsion of the type described by publication 4 above was coated on a PETP film support to obtain a silver coverage of 6.4 g/m$^2$ and a gelatin coverage of 6.4 g/m$^2$. Seven coating strips were used for immersion tests.

Figure 5:
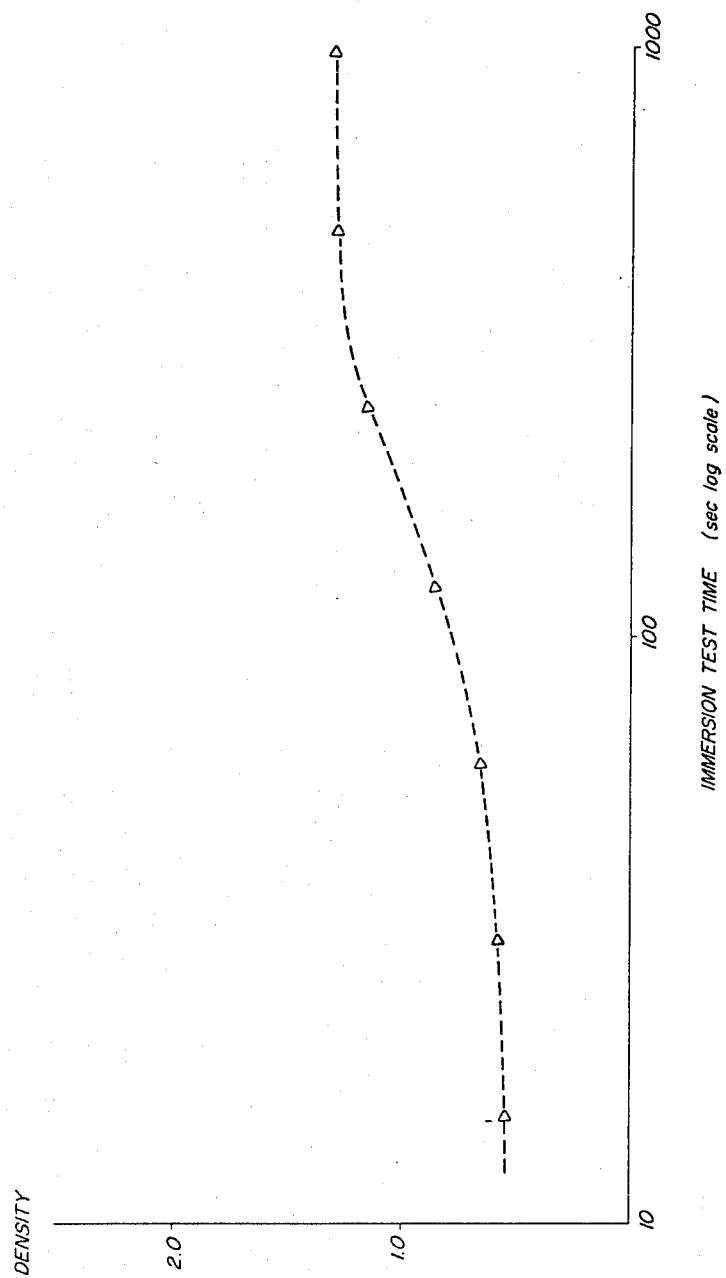

Immersion testing was performed as described above in Example 3, but with the light exposure intensities provided by the sonographic sensitometer described in Example 1. Unless otherwise specifically stated, all subsequent immersion testing was performed in a like manner. FIG. 5 shows the resulting plot of density versus immersion time. The result indicates that this coating is capable of producing ultrasonographic images.

Figure 6:
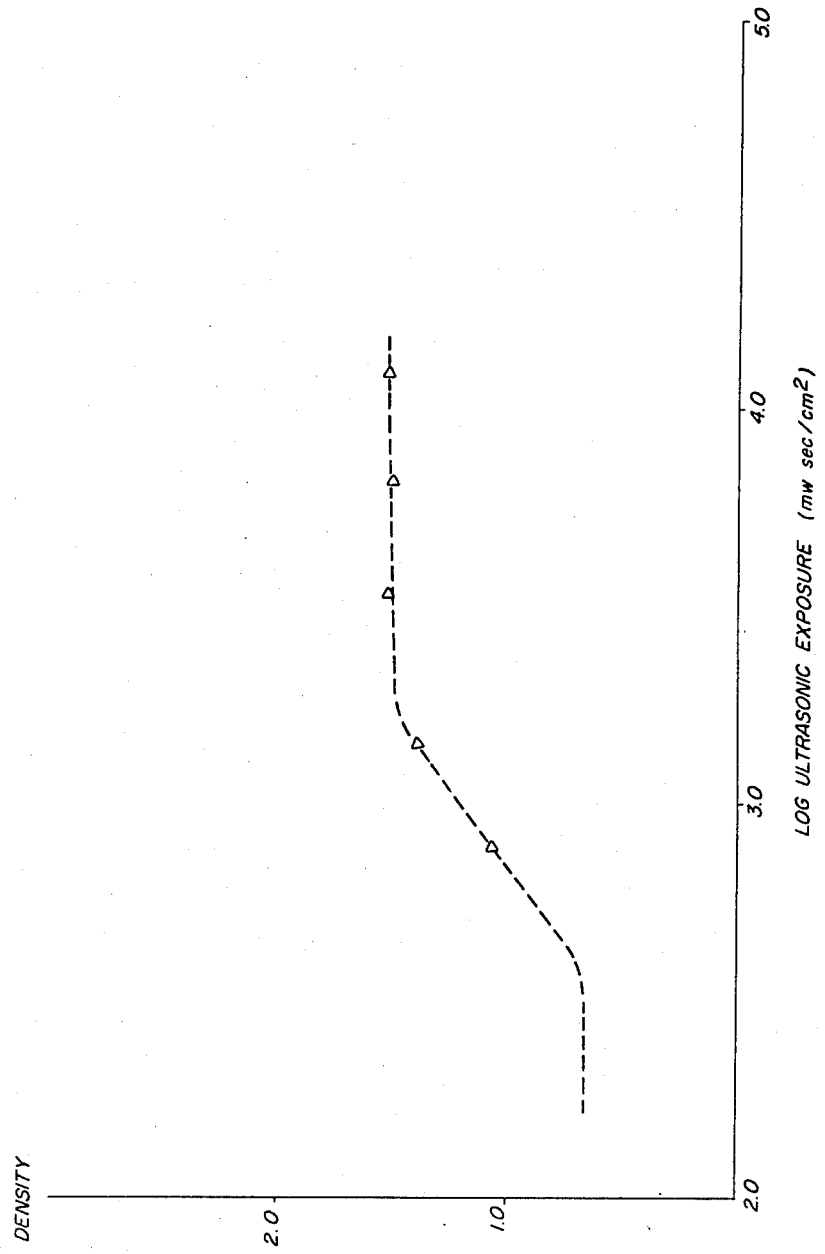

Using the sonographic sensitometer of Example 1 and, except as otherwise specifically noted, the exposure and processing procedures of Example 1, another strip was immersed for 10 seconds in the reservoir of the ultrasonic sensitometer, then exposed imagewise to ultrasonic energy for ten seconds and subsequently exposed uniformly to light through a 1.0 neutral density filter for eight seconds. FIG. 6 shows the ultrasonographic characteristic curve obtained.

EXAMPLE 5

Imaging a Silver Chloride Emulsion

Example 1, as applied to Strip 4, was repeated, except that a 0.2µ silver chloride emulsion, to which dye of the formula (3) had been added at a level of 1.8×10$^{-4}$ moles dye/mole Ag, was coated on a PETP film support to obtain silver coverage of 3.2 g/m$^2$ and gelatin coverage of 2.6 g/m$^2$.

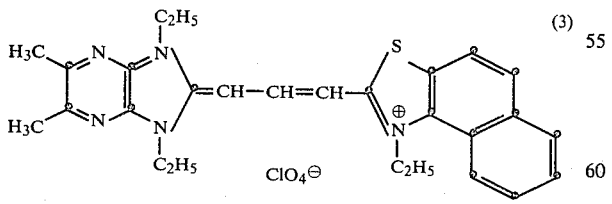

Figure 7:
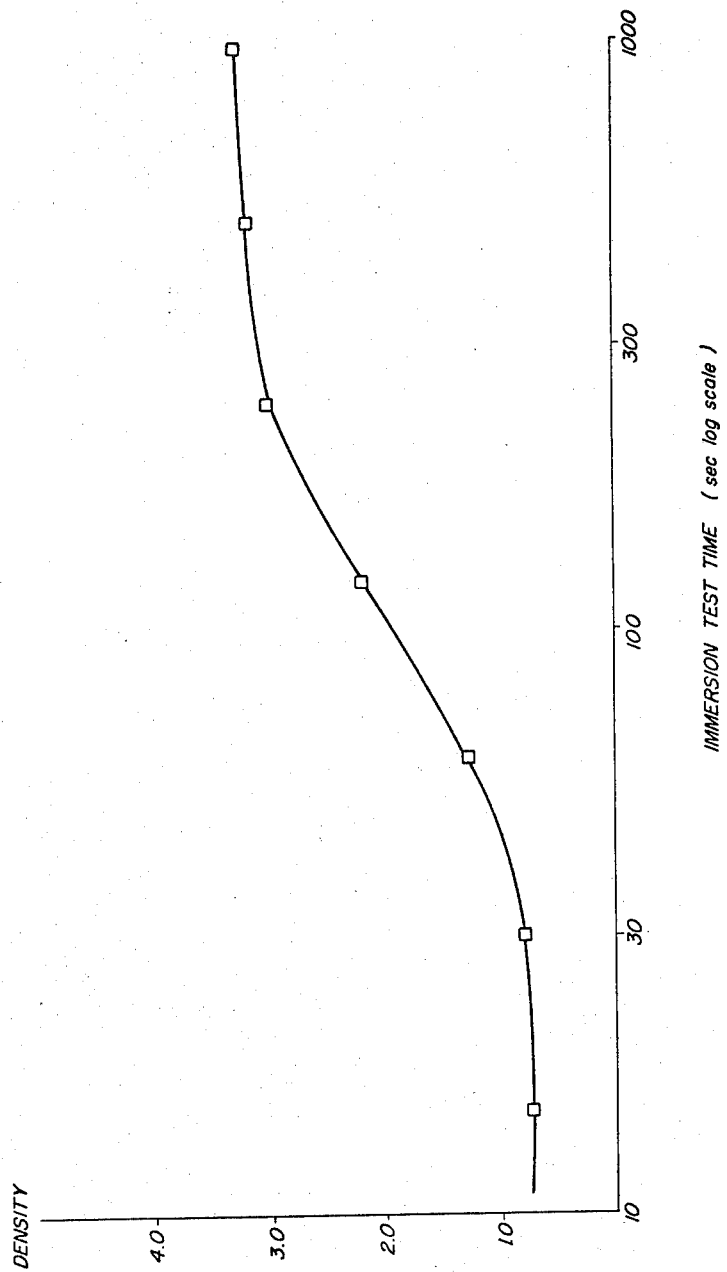
Figure 8:
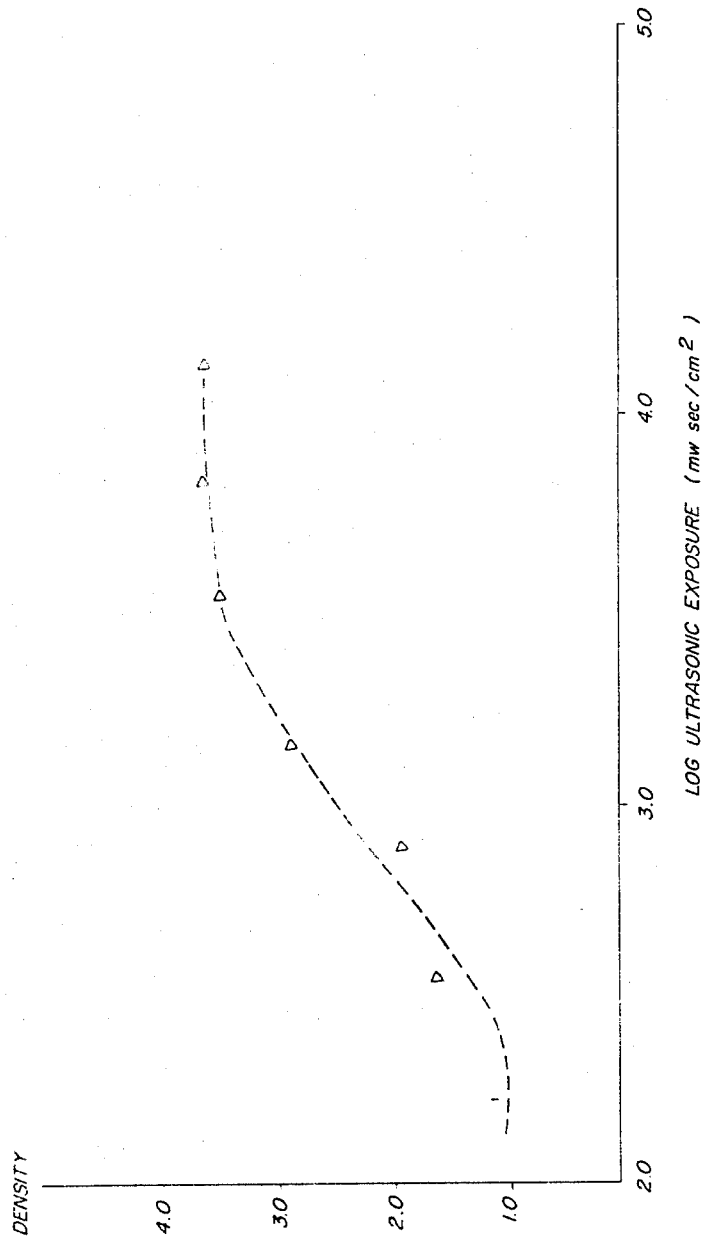

The coating was divided into several strips. Seven of these were used for immersion tests, the results of which are shown in FIG. 7, as a plot of developed density versus immersion time. Another strip was exposed in the sonographic sensitometer. FIG. 8 is the ultrasonographic characteristic curve (plot of developed density verus log ultrasonic exposure). Intense, distinct ultrasonographic images were formed. The characteristic curve shows the silver chloride emulsion to be suitable for ultrasonographic imaging according to this invention.

EXAMPLE 6

Varying Desensitizer Concentrations to Illustrate the Correlation of Imaging and Immersion Testing Example 1, as it applies to Strip 4, was repeated, except that three photographic elements were prepared differing only in desensitizing dye levels. The dye levels in moles of dye/mole silver were as follows:

Coating 1: 1.0×10$^{-4}$
Coating 2: 1.5×10$^{-4}$
Coating 3: 2.0×10$^{-4}$

Figure 9:
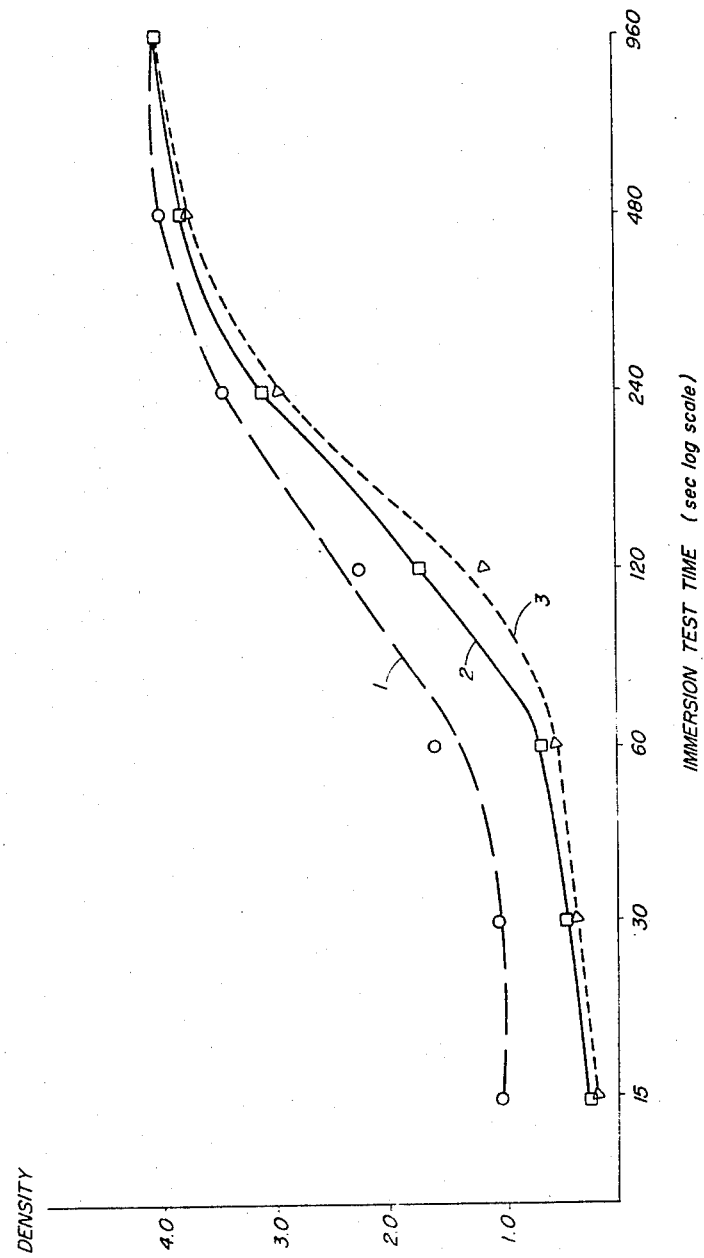
Figure 10:
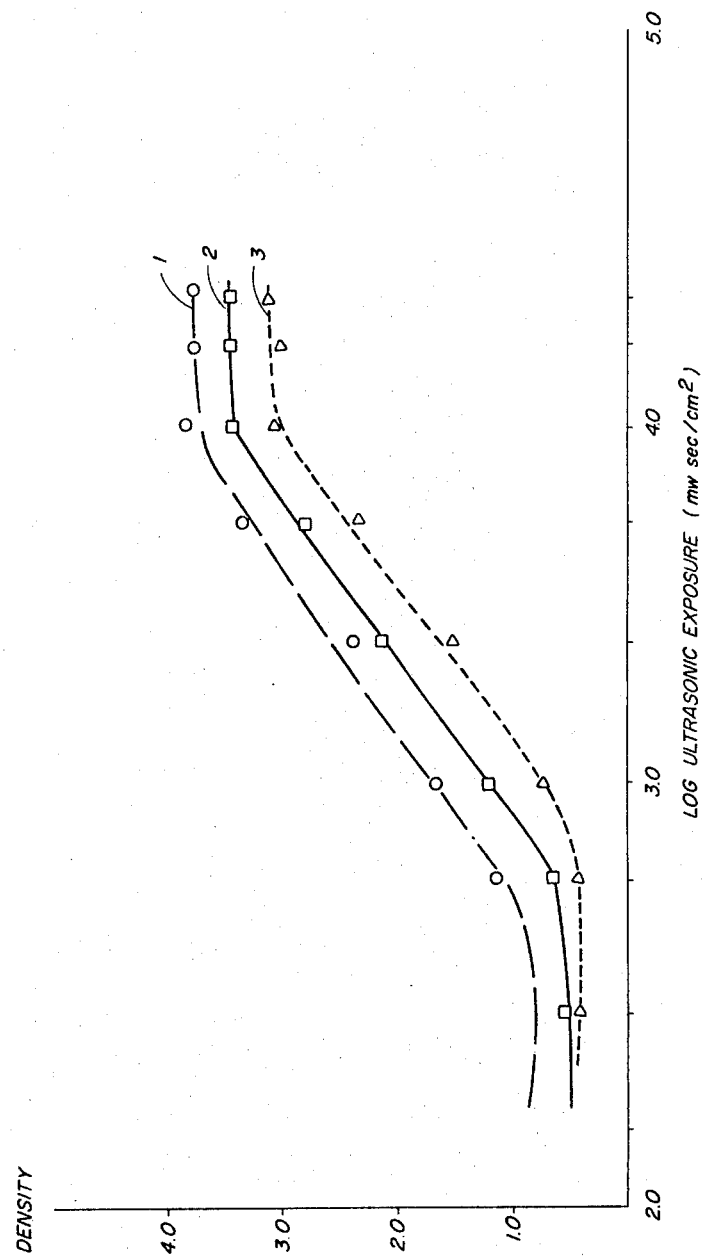

Each of the photographic elements were subdivided into a number of separate strips. Seven strips of each element were employed for immersion testing. Other strips were used for ultrasonic imaging. FIG. 9 shows the immersion test performance of each element, indicating that all of the elements are suitable for use in the practice of my invention. Further, FIG. 9 suggests that lower minimum or background densities will be obtained with the higher desensitizing dye levels and that contrast will also be increased. FIG. 10 shows the ultrasonographic characteristic curves obtained for the elements. Although all of the characteristic curves exhibited the same contrast, it can be seen that a general qualitative correlation exists between the immersion tests and the characteristic curves obtained.

The following desensitizers have been observed to exhibit a similar pAg dependence as the dye of formula (1). Similar ultrasonographic performance is obtained when these desensitizers are substituted for the dye of formula (1).

1. 1,1'-Dibutyl-4,4'-bipyridinium bromide
2. 3,7-Diamino-5-phenylphenazinium chloride
3. 1,1'3,3'-Tetraethyl-1H-imidazo[4,5-b]quinoxalinocarbacyanine chloride
4. 1-Methyl-3-[3-(1-methyl-2-phenyl-3-indolyl)-2-propen-1-ylidene]-2-phenyl-3H-indolium bromide
5. 1-Methyl-3-[3-(1-methyl-2-phenylbenz[g]indol-3-yl)-2-propen-1-ylidene]-2-phenyl-3H-benz[g]indolium bromide.

EXAMPLES 7 AND 8

Positive Imaging with Emulsions Containing Protonatable Dyes

A 0.2µ silver bromide emulsion, to which a dye according to formula (4) had been added to obtain a level of 2.0×10$^{-3}$ moles dye/mole Ag was coated on a PETP film support to achieve silver coverage of 3.2 g/m$^2$ and gelatin coverage of 2.7 g/m$^2$. An overcoat of 17.2 g/m$^2$ of gelatin was applied. The pH of the coating was adjusted using a pH 10 buffer solution. A coating strip was exposed immediately upon immersion in 0.1 N HCl in the sonographic sensitometer as described above, to ultrasonic energy for five seconds and subsequently to light through a Wratten 16 filter (to remove radiation in regions of inherent silver halide sensitivity) for five seconds and processed as in Example 1. The ultrasonic energy greatly accelerated the protonation of the dye by acid, thus destorying the spectral sensitizing action of the dye in exposed areas. The ultrasonically exposed areas showed up in the processed strips as clear or completely bleached circular areas against an opaque background. The diameter of the clear area in the coating was proportional to the power of the transducer in the sensitometer exposing that area. Similar results were obtained for coatings in which a dye according to formula (5) was substituted.

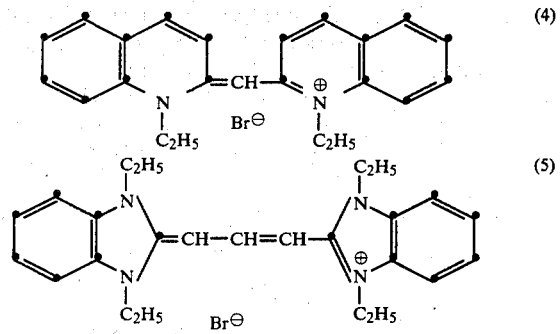

(4)

(5)

EXAMPLE 9

Imaging Stacked Ultrasonographic Films

A coating prepared as described in Example 1 was divided into several strips. Two of these were placed in a sonographic sensitometer, both with emulsion side down (toward the transducers), one superimposed over the other. The strips were exposed in water in the sonographic sensitometer containing a battery of eight transducers ranging stepwise in intensity from 0.0078 watt/cm$^2$ to 1.3 watts/cm$^2$. Both strips were immersed in water for fifteen seconds, then exposed imagewise to ultrasonic energy for ten seconds and subsequently exposed uniformly to light for ten seconds. Very dense images were produced corresponding to the higher powered transducers in the top strip. Less dense images were produced on the bottom strip. Another pair of strips were exposed in the same way, except that the top strip was superimposed over only half the bottom strip. The same results were observed, except that the uncovered portion of the bottom strip showed greater developed density. A third pair of strips were exposed as were the second pair, except that between the ultrasonic and light exposures, the top strip was moved sideways so that it was superimposed over a different section of the bottom strip during light exposure than during ultrasonic exposure. It was the area of the bottom strip over which the top strip was positioned during light exposure that showed the reduced developed density.

EXAMPLE 10

Imaging Response as a Function of Delayed Light Exposure

An element was prepared similar to Coating 2 in Example 6. Three strips of the coating, hereinafter designated Strip 1, Strip 2 and Strip 3, were exposed in the sonographic sensitometer and processed as in Example 6, except as stated. Each strip was immersed for twenty-four seconds in the water reservoir, exposed ultrasonically at stepped intensities for one second and exposed subsequently to light for sixteen seconds.

For Strip 1, light exposure immediately followed ultrasonic exposure. Strip 2 was allowed to remain immersed in the water for twenty seconds after ultrasonic exposure before it was given a light exposure. Strip 3 was allowed to remain immersed for forty-five seconds between ultrasonic and light exposures.

Figure 11:
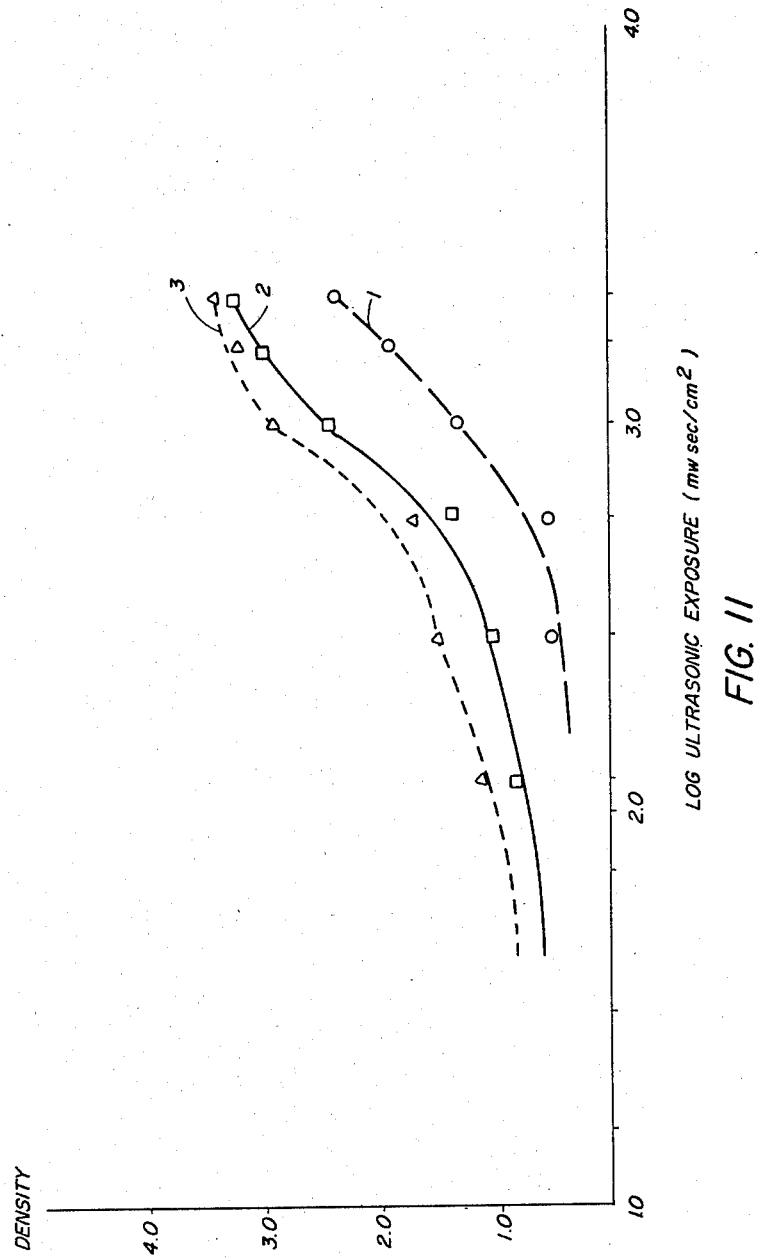

FIG. 11 shows the ultrasonographic characteristic curves for the three strips. The effect of delaying light exposure after ultrasonic exposure was to increase the density levels in exposed areas and to decrease the ultrasonic energy required to produce a given density. Stated another way, the delay in light exposure had the effect of further sensitizing the strips to light exposure, which can be viewed as an increase in ultrasonographic speed.

EXAMPLE 11

Illustrating a Favorable Ultrasonic Exposure Reciprocity Law Departure

Figure 12:
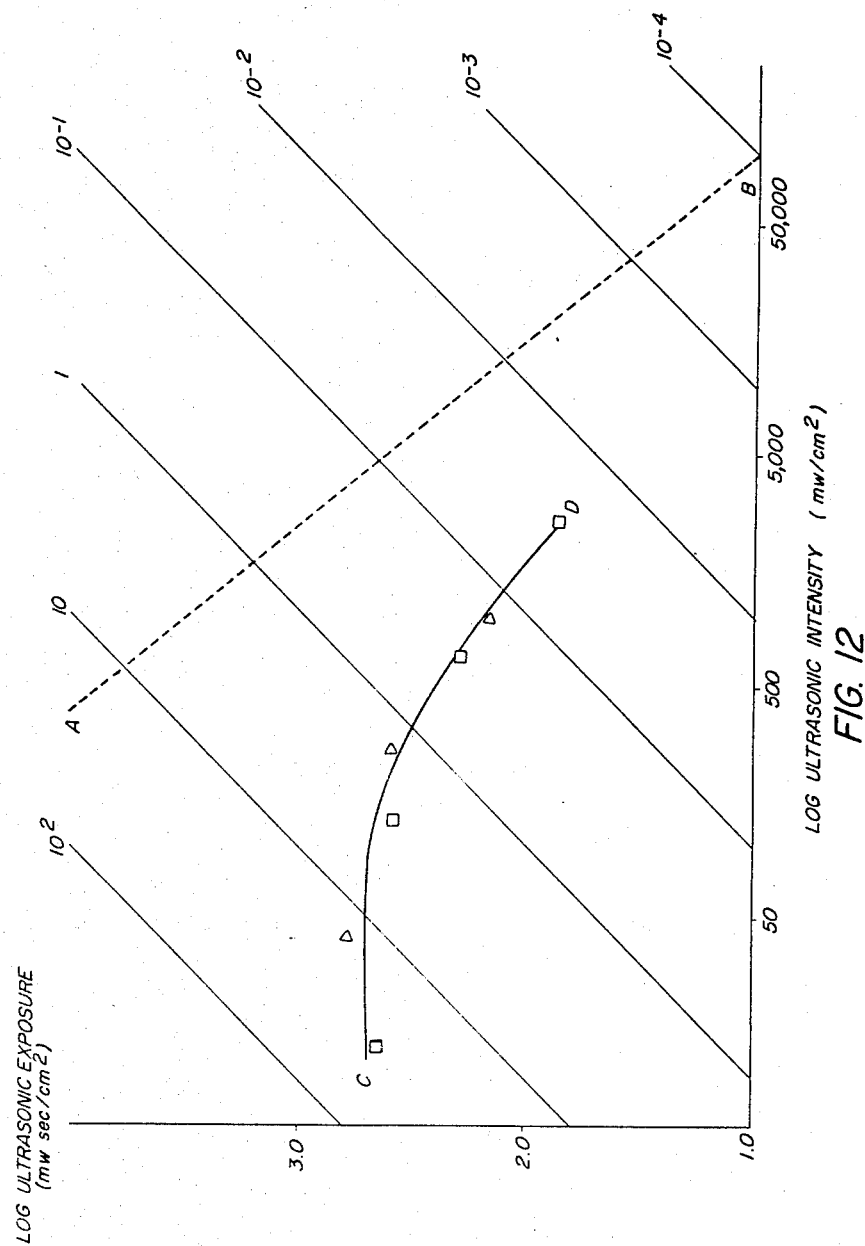
FIG. 12 is a plot of log ultrasonic intensity versus log ultrasonic exposure.

By reference to FIG. 12 the favorable ultrasonic exposure reciprocity law departure obtained through the practice of my invention can be observed. Ultrasonic intensity values plotted on a log scale and log ultrasonic exposure values form the abscissa and ordinate, respectively, of the figure. The numbered diagonal lines represent lines of equal times of ultrasonic exposure. For example, if it is desired to know the log ultrasonic exposure which will result from ultrasonic intensities applied for a time of 1 second, this can be read for a given intensity by finding the point on the diagonal line 1 (representing 1 second of exposure) which corresponds to a selected value of intensity and reading the corresponding log ultrasonic exposure value for the point. The diagonal line AB perpendicularly intersecting the time lines indicates a boundary between areas identified as being safe and unsafe for medical applications. The boundary is that established by a National Science Foundation survey team and published November 1973 in a report titled *Prospectives for Ultrasonic Imaging in Medical Diagnosis*. Any combination of exposure and intensity falling above and/or to the right of the line AB is considered unsafe or at least to present a risk of causing damage to living tissue. On the other hand, those combinations of intensity and exposure which lie beneath and/or to the left of the line AB are considered safe for the purposes of medical diagnosis.

If my process gave imaging results in accordance with the ultrasonic exposure reciprocity law, by using identical ultrasonographic elements which are identically exposed and processed, except that differing combinations of exposure times and intensities which produce an equal exposure as a mathematical product, all of the ultrasonographic elements should exhibit equal densities in ultrasonically exposed areas. If a curve of exposures and intensities resulting in a reference density were plotted in FIG. 12, the result would be a horizontal line.

To ascertain the adherence of the results obtained by my process to the ultrasonic exposure reciprocity law, I prepared, exposed and processed an element similarly as Strip 4 in Example 1, except as otherwise stated. The element was divided into strips which were ultrasonically exposed at varied times to achieve a reference density of 0.1 above $D_{min}$. The curve CD is a plot of the results. It is apparent that the curve CD lies within the safe region defined by the boundary AB. If the curve CD were entirely horizontal, as would be predicted by the ultrasonic exposure reciprocity law, the curve would intersect the boundary AB at an intensity of exposure of about 5,000 milliwatts per square centimeter. The significance of the declination of the curve CD as intensity increases is that, first of all, higher intensities can be reached without intruding into the unsafe region in achieving a given density level. Secondly, curve CD clearly illustrates that at higher intensities less exposure—i.e., less ultrasonic energy—is required to achieve a reference density in an ultrasonographic element. The declination of the curve CD from the horizontal represents a departure from the ultrasonic reciprocity law. The departure is favorable in that it allows lower exposures and higher intensities to be employed to yield a desired density in ultrasonically exposed areas. This lends an unexpected latitude to my process, particularly as applied to diagnostic applications.

EXAMPLE 12

Illustrating the Effect of Ultrasonic Exposure Pulsing

Figure 13:
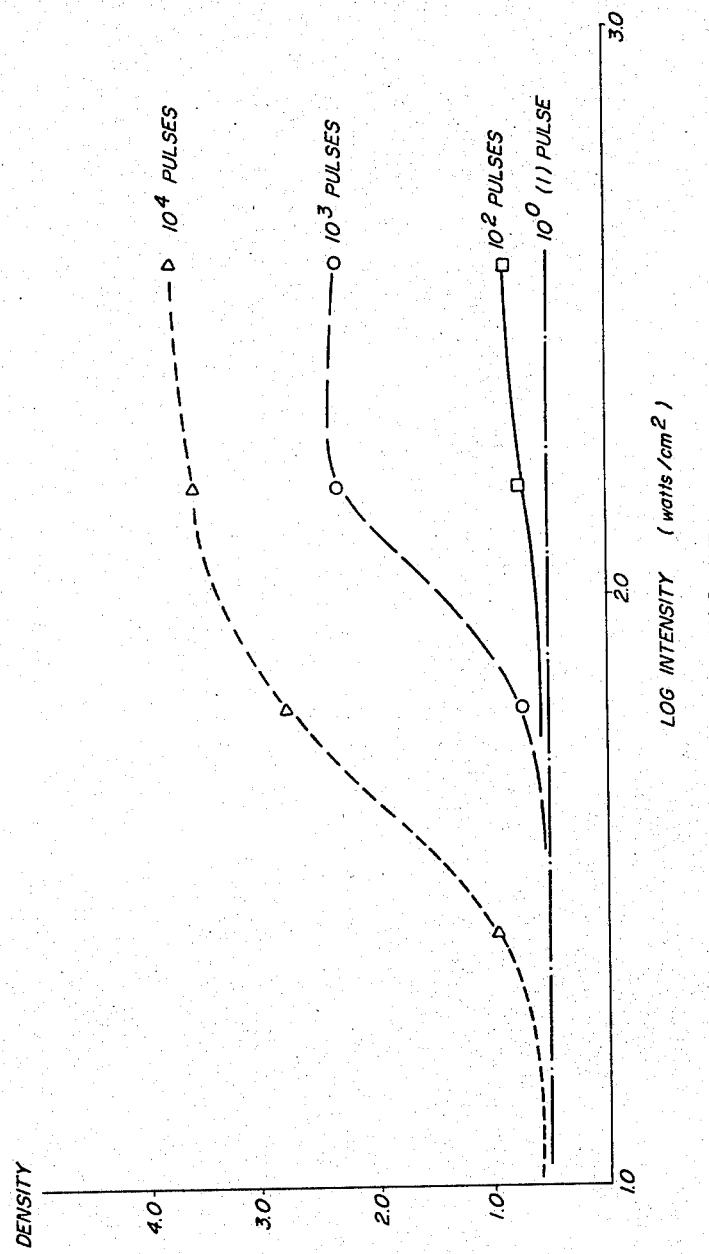
FIG. 13 is a plot of log ultrasonic intensity versis density in ultrasonically exposed areas.

This example employs strips of an element according to Example 1 as well as the exposure and processing procedures of that examples as applied to Strip 4 thereof, except as otherwise stated. Three separate strips were each exposed given stepped ultrasonic exposures with differing degrees of pulsing. Using a frequency of 5.212 megahertz, a pulse width of 3 microseconds and a pulse period (the pulse width plus the interval between pulses) of a millisecond, Strip 1 was exposed to 10° or 1 ultrasonic pulse. As can be noted in FIG. 13, this produced a horizontal characteristic curve, indicating that one pulse at these energy and intensity levels would not be useful in producing ultrasonographic images.

Strip 2 was given $10^2$ pulses. Noting FIG. 13, a relatively flat characteristic curve was produced. Strip 3, given $10^3$ pulses, showed a much greater difference between maximum and minimum densities, indicating that a clearly useful ultrasonographic image could be obtained. Strip 4, given $10^4$ pulses, produced a characteristic curve having a still larger difference between maximum and minimum densities. Comparing the curves produced by 100, 1000 and 10,000 pulses, it is apparent that the maximum densities obtained are additively related to the log of the pulses employed.

To determine the effect of pulsing if the total energy being supplied to an element were held constant, several strips were given constant exposures with differing numbers of pulses at two different power levels, 1.52 watt-seconds/cm$^2$ and 0.62 watt-second/cm$^2$. Each at a separate power level two strips were given a single pulse ($10^0$ pulse) of 10 milliseconds duration. This procedure was repeated with different strips at different stepped intervals. Each interval differed from that proceeding in that the number of pulses were increased by a factor of 10 while the duration of the pulses were decreased by a factor of 10, so that the total ultrasonic energy supplied to each strip was identical with that supplied to all of the other strips being exposed at that level of intensity.

Figure 14:
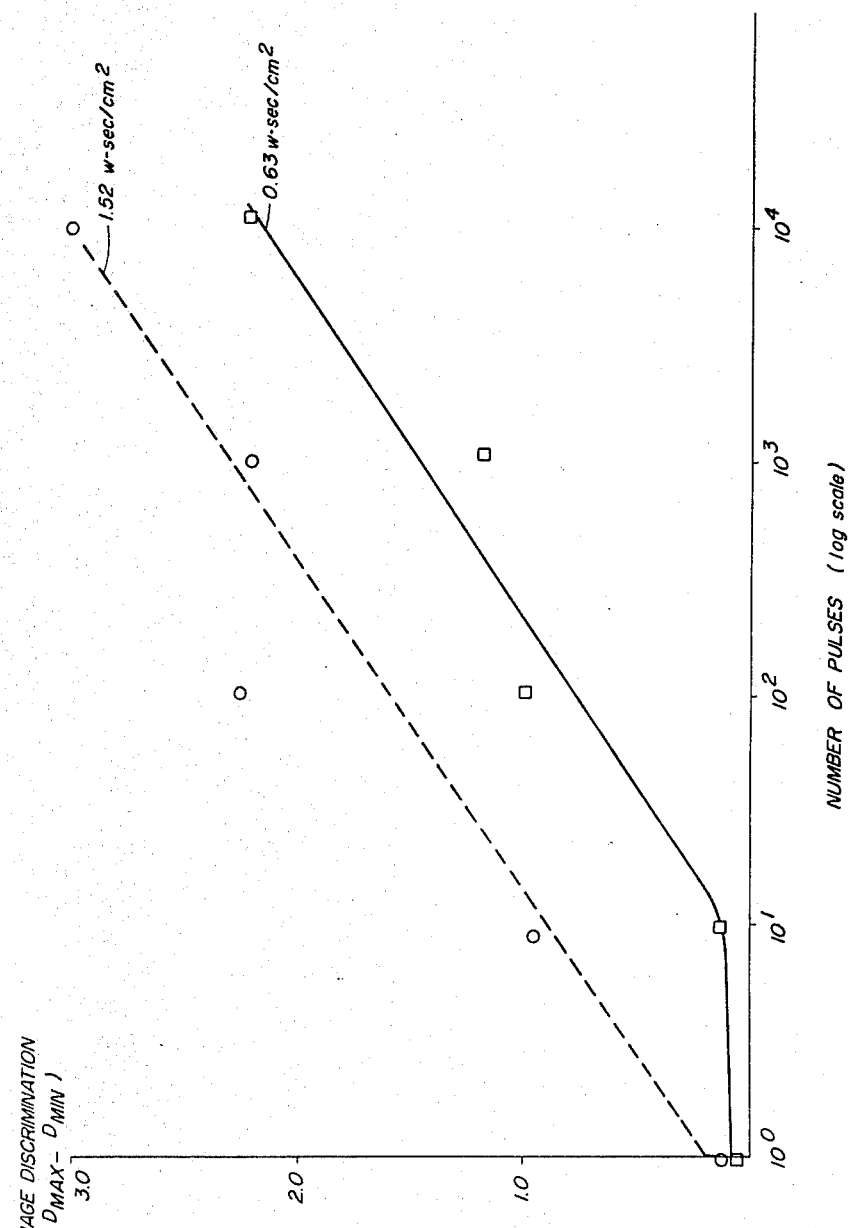
FIG. 14 is a plot of the number of pulses, plotted on a log scale, versus image discrimination (maximum density minus minimum density)

The results are graphically presented in FIG. 14. Image discrimination (maximum density minus minimum density) is plotted as an ordinate versus the number of pulses as an abscissa. It is apparent that image discimination was enhanced as the number of pulses increased and that greater image discrimination was obtained at the higher intensities of exposure. This demonstrates that much greater sensitivity levels for photographic elements employed in the practice of my process can be obtained when pulsed ultrasonic exposures are employed.

EXAMPLE 13

Illustrating the Effect of Light Exposure Pulsing at Differing Intensities

This example employs strips of an element according to Example 1 as well as the exposure and processing procedures of that example as applied to Strip 4 thereof, except as otherwise stated. Four separate strips were exposed to pulsed ultrasonic energy and simultaneously to pulsed light from a unit sold by General Radio Company of Concord, Massachusetts under the trademark Strobotac. For each strip, the sound exposure was the same—the pulse width was $10^{-6}$ second, the pulse period was $10^{-2}$ second and the total number of pulses was $10^3$ pulses. The maximum sound intensity for each pulse was 224 watts/cm$^2$.

The light pulses were of the same period and total number as the sound pulses and were synchronized with the sound pulses. Each of the strips was exposed to a different intensity of light pulses by varying the spacing between the light source and the separate strips. At the reference intensity $I_0$ the light source was 34 cm from the strip during light exposure.

Figure 15:
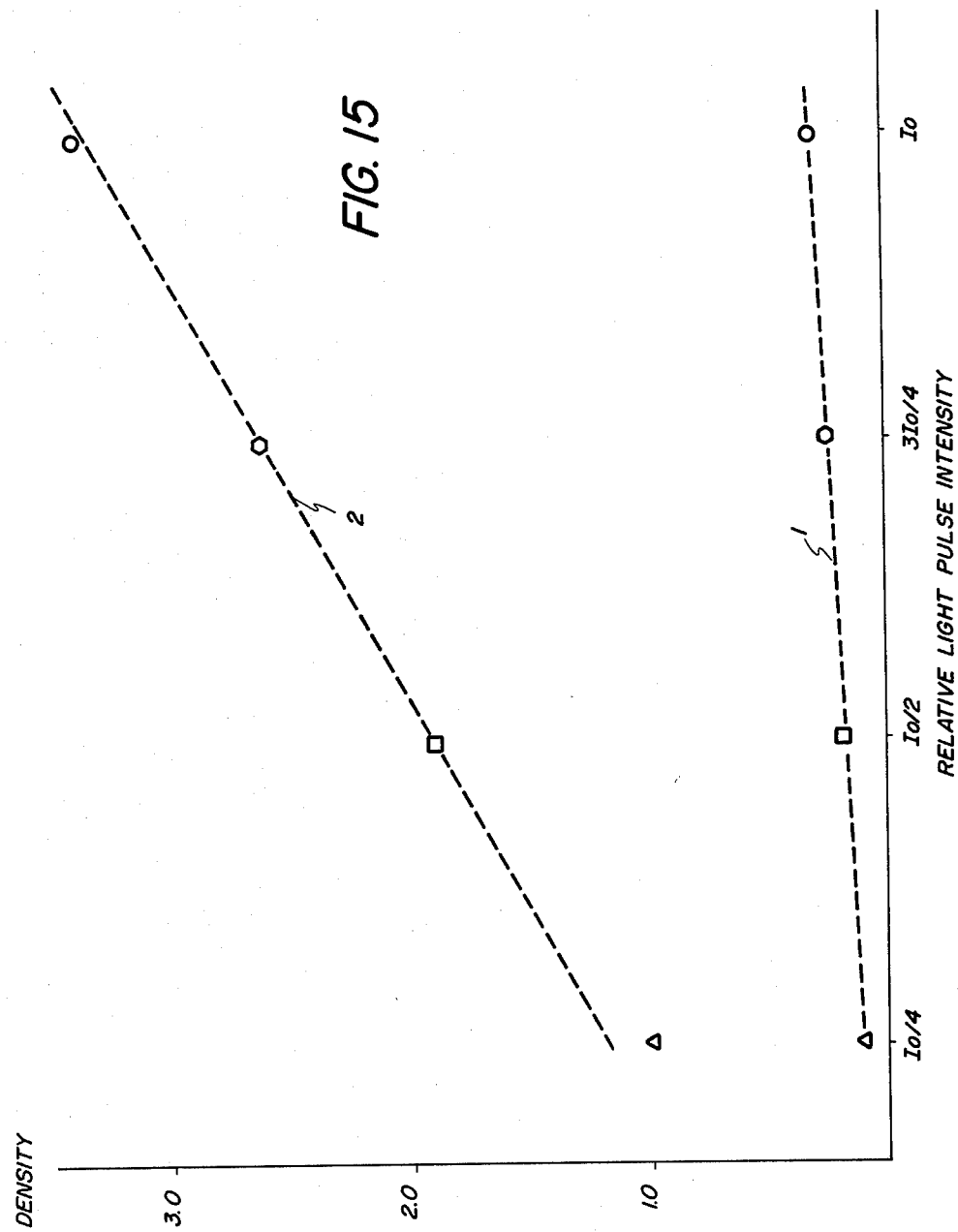
FIG. 15 is a plot of relative light pulse intensity versus density wherein separate curves are plotted for maximum and minimum density levels.

The results are summarized in FIG. 15, which is a plot of density as an ordinate versus relative light pulse intensity as an abscissa. One strip was exposed at the reference intensity of $I_0$; the remaining three strips were exposed at intensities which were each a fraction of $I_0$. The density that was observed in background areas—that is, areas which were light exposed, but not ultrasonically exposed—is identified by Curve 1 in FIG. 15. This is the plot of minimum densities. The density that was observed in image areas—that is, areas which are both ultrasound and light exposed—is identified by Curve 2 in FIG. 15. This is the plot of maximum densities. Comparing the maximum density curve with the minimum density curve, it is apparent that the minimum densities obtained rise only slightly as the intensity of light exposure is increased while the maximum densities increase dramatically. Similarly, the difference between the maximum and minimum densities increases dramatically as a function of pulsed light exposure intensity.

Another set of strips were processed similarly as described above, except that the total exposure given the second set of strips was varied holding the intensity of exposure constant. It was noted that increasing the exposure produced only a slight increase in maximum density and practically no change in minimum density. By comparison of the results obtained with the two sets of strips it was apparent that, although the exposure was allowed to increase with the intensity in the light exposure of the first step of strips, the dramatic increase in maximum density was principally a function of the increase in pulsed light exposure intensity rather than a function of any increase in total exposure.

EXAMPLE 14

Illustrating the Effect of Incorporating Silver Ions in the Polar Solvent

This example employs strips of an element similar to Example 1 as well as the exposure and processing procedures of that example as applied to Strip 4 thereof, except as otherwise stated. The sonographic sensitometer contained seven transducers operated at stepped maximum intensities ranging from 3.6 to 520 watts/cm$^2$.

Using two identical strips, each strip was immersed in the polar solvent for 10 seconds, given a continuous ultrasound exposure for 2 seconds and then given a 4 second light exposure after a 30 second delay. The sole difference between the procedure employed with each of the two strips was that in one instance the polar solvent was a $10^{-3}$ molar aqueous solution of silver nitrate and in the other instance the polar solvent was distilled water. Ultrasonographic characteristic curves (the type of curves appearing in FIG. 2) were plotted for each strip. At a density of 0.1 above the minimum density it was determined that the strip exposed in the aqueous silver nitrate solution was approximately an order of magnitude (10X) more sensitive than the strip immersed in distilled water. The strip immersed in the silver nitrate solution exhibited a maximum density of 5.0 while the strip immersed in water exhibited a maximum density of 1.4.

The procedure described above was repeated using two identical strips, but with pulsed ultrasound of $10^{-6}$ second pulse width, $10^{-4}$ second pulse period and $10^5$ pulses. Ultrasound exposure occurred over an elapsed time of 10 seconds. Light exposure was for 2 seconds instead of 4 seconds and was delayed after ultrasound exposure for only 1 second. At a density of 0.1 above the minimum density, the strip immersed in the silver nitrate solution was approximately four times more sensitive than the strip immersed in distilled water. The strip immersed in the silver nitrate solution exhibited a maximum density of 5.0 while the strip immersed in water exhibited a maximum density of 1.6.

EXAMPLE 15

Illustrating the Effect of Incorporating Bromide Ions in the Polar Solvent

This example employs an element similar to that of Example 1, except that instead of the desensitizing dye of Example 1, the desensitizing dye 1,1'-diethyl-6,6'-dinitrothiacyanine chloride was employed in a concentration of $1.25 \times 10^{-4}$ mole per mole of silver. To convert the element to a light sensitive form, it was washed in a distilled water bath for eight (8) minutes and dried overnight.

The element was exposed in a sonographic sensitometer similar in construction to that of Example 1, except the light exposure unit was an array of 132 tungsten lamps of one and one half watt each (commercially available under the trademark GE 31) equally spaced on a polished metal reflecting surface contained within a housing 10 by 40 cm on an edge. There were seven ultrasonic transducers which yielded a power (intensity) output at the film plane of 140, 35, 8.7, 2.2, 1.0, 0.33 and 0.125 watts/cm$^2$, respectively.

The element was placed in the ultrasonic sensitometer and immersed in $1.25 \times 10^{-4}$ molar aqueous potassium bromide polar solvent solution. The element was immersed in the polar solvent for 10 seconds before ultrasonic exposure, exposed imagewise to pulsed ultrasonic energy from the transducers (pulse width $10^{-6}$ second, pulse period $10^{-4}$ second and total number of pulses $10^5$) and then immediately exposed to light from the light unit for eight seconds. The element was developed in Kodak Developer D-19, fixed, washed and dried.

Maximum density areas were those which were not ultrasonically exposed, indicating that the ultrasonographic element was positive-working. Reduced density areas were laterally spaced and corresponded to the areas of ultrasonic exposure, except that the lowest powered transducer produced no visible image. The example illustrates that the imagewise application of ultrasound can be employed to raise the pAg of a photographic element and to desensitize it imagewise to light exposure as a result.

EXAMPLE 16

Illustrating Shifting the Balance of Internal and Surface Latent Image Forming Efficiencies A monodispersed 1.4 micron mean grain diameter gelatino-silver halide emulsion of the balanced internal and surface latent image forming efficiency type described in Evans U.S. Pat. No. 3,761,276 which was sulfur plus gold sensitized internally (in the grain core) and and externally (on the grain shell) was prepared, divided into separate portions, pAg adjusted and separately coated onto PTEP film supports to provide a silver coverage of 8.6 grams/meter$^2$ and a gelatin coverage of 13 grams/meter$^2$.

A strip from each element was exposed in an Eastman 1B sensitometer to a tungsten light source through a continuous step wedge. The strips were then processed in Kodak Developer D-19 (a surface developer) for five (5) minutes, fixed, washed and dried. The results are summarized below in Table I.

TABLE I

| Coating pAg | Maximum Density |
| --- | --- |
| 8.0 | .08 |
| 7.5 | .08 |
| 7.0 | .08 |
| 6.5 | 2.00 |
| 6.0 | 2.12 |
| 5.5 | 1.92 |

Table I clearly demonstrates that the elements coated at a pAg of 7 and above were highly desensitized (did not produce surface latent images) while at a pAg of 6.5 and below the elements exhibited a significant photographic response in forming surface latent images.

A strip of one of the elements coated at a pAg above 7.0 was exposed in a sonographic sensitometer of the same general type described in Example 15, except that only six ultrasonic transducers were present. The transducers were adjusted to the following power ratios: 1:2:5:16:43:73. The transducers ranged in power at the film plane from 5.8 to 640 watts/cm$^2$.

Figure 16:
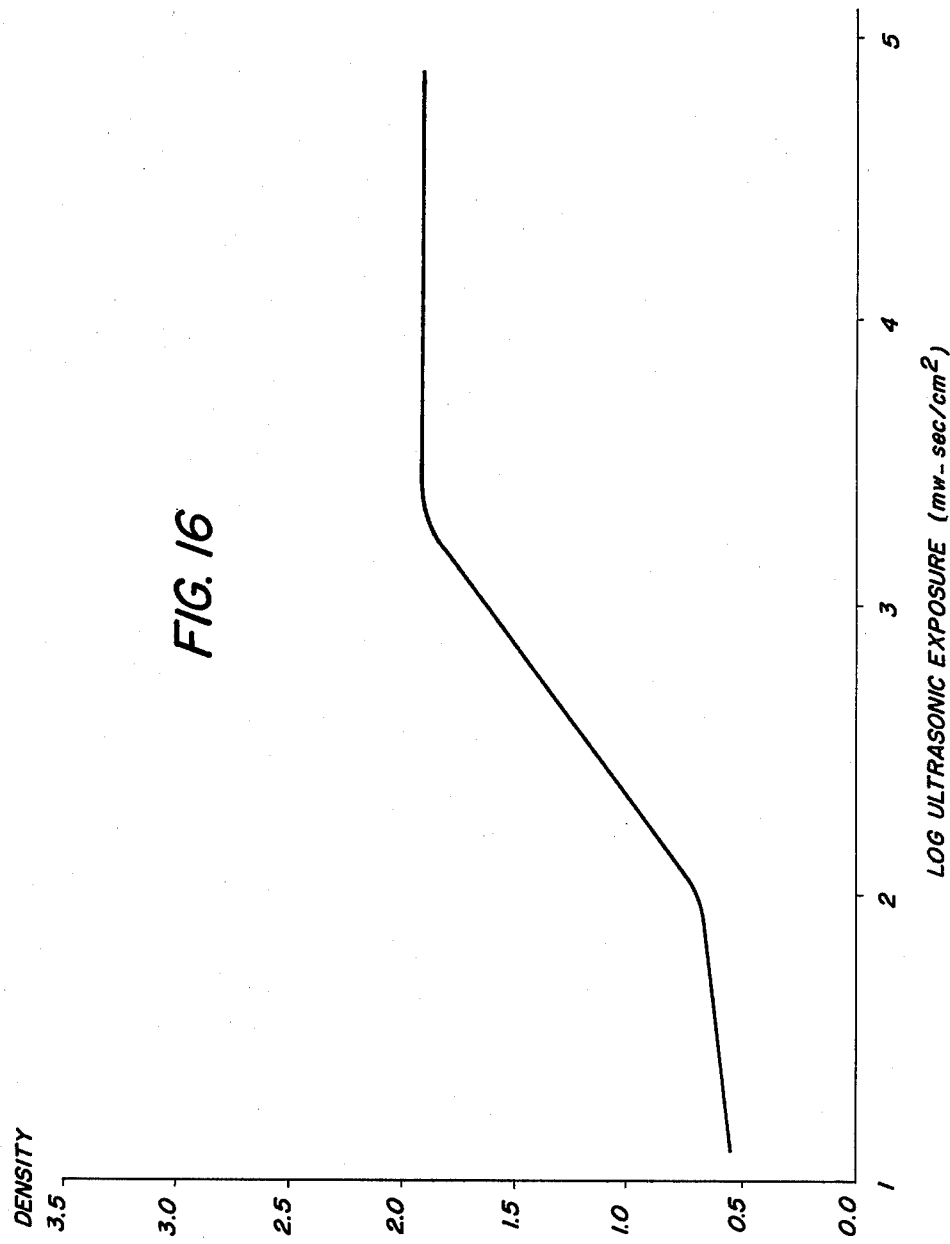

The strip was immersed in water for 10 seconds, exposed to pulsed ultrasonic energy (pulse width $-6$ second, pulse period $10^{-4}$ second, total pulses $10^5$) and then uniformly exposed to light for 8 seconds. The strip was processed as described above, except that development was for only 3 minutes. The ultrasonographic characteristic curve obtained indicated that the element was negative-working. The curve is shown in FIG. 16. When a second strip was similarly processed, but with continuous light exposure taking place simultaneously, a similar characteristic curve was obtained, but somewhat lower maximum densities were observed.

Figure 17:
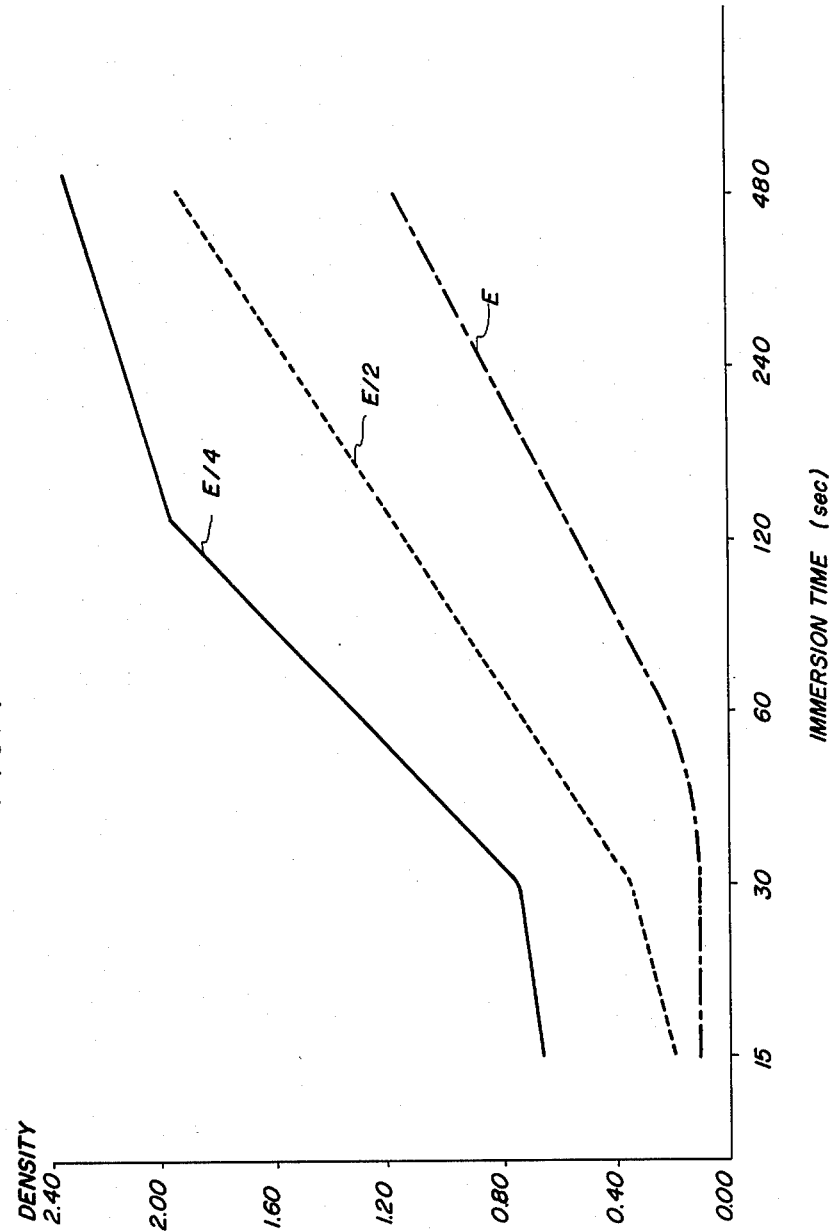

A number of strips were immersed in water in ultrasonic sensitometer described above for periods ranging from 15 to 480 seconds. At the end of the immersion period, light exposure was undertaken as described above or using exposure halving or quatering neutral density filters. The results obtained by these selection tests using each of three levels of light exposure are shown in FIG. 17. Comparing FIG. 16, FIG. 17 and Table I, it can be seen that the ultrasonographic imaging capability of the elements employed correlated with the coating pAg and with the results of the selection test. Both the selection tests and the actual ultrasonographic characteristic curve demonstrated the utility of the elements for use in my process.

EXAMPLE 17

Figure 18:
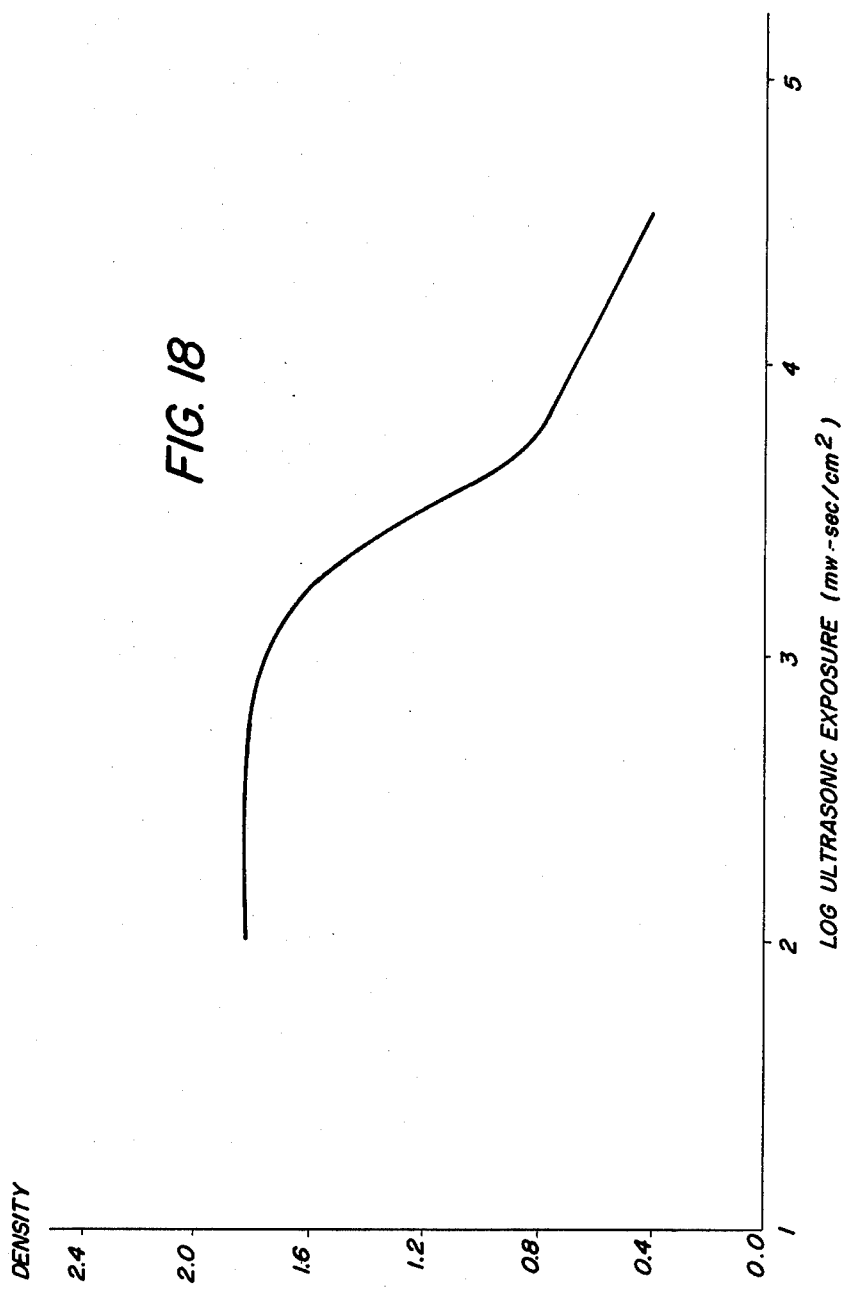

Illustrating a Positive-Working Element Employing an Emulsion Exhibiting a Shifting Balance of Surface and Internal Latent Image Forming Efficiencies An element similar to that ultrasonographically imaged in Example 16 was employed, except that the emulsion layer additionally contained 0.5 g per mole of silver of 4-hydroxy-6-methyl-1,3,3a,7-tetraazaindene. The element was immersed in the polar solvent for 10 seconds before ultrasonic exposure, ultrasonically exposed as in Example 15, and light exposed for 2 seconds after a 30 second delay. The ultrasonographic characteristic curve is plotted in FIG. 18. It can be seen that the element was initially light sensitive, but became less light sensitive (less susceptible to surface latent image formation) as the level of ultrasonic exposure increased. It is thus apparent that the element was positive-working. I believe that the tetraazaindene diffuses away from the silver halide grain surface as a function of ultrasound exposure, thus shifting the balance of latent image forming efficiencies from the surface to the interior of the silver halide grains. However, I do not wish to be bound by any particular hypothesis to explain the results observed.

EXAMPLE 18

Illustrating Internal Association of Polar Solvent

A strip of a photographic element as described in Example 1 was soaked for 250 seconds in water and placed in a sonographic sensitometer similar to that described in Example 1, except that the element was immersed in hexane as an ultrasonic energy transmission medium rather than a polar solvent. The sonographic sensitometer differed from that of Example 1 in that it contained six (6) ultrasonic transducers varying in power output at the film plane from 3.77 to 274 watts/cm$^2$. The ultrasonic exposure pulse width was $10^{-6}$ second, the pulse period $10^{-4}$ second and the total number of pulses was $10^5$. After ultrasonic exposure, the strip was allowed to remain in the hexane bath for 30 seconds before being given a uniform light exposure of sixteen seconds. The light source and subsequent processing were identical to that described in Example 1. The strip was observed to be positive-working, producing areas of reduced density corresponding to the five transducers of highest power output.

When the above procedure was repeated, but omitting the step of immersion in water and increasing the number of ultrasonic pulses by an order of magnitude, a similar result was observed, although the level of image discrimination was generally lower. Reduced density areas were produced by the three (3) transducers of higher power output.

EXAMPLE 19

Illustrating Solarization Exposure Effects

A monodispersed 0.55 micron mean grain diameter gelatino-silver bromide emulsion of the balanced internal and surface latent image forming efficiency type described in Evans U.S. Pat. No. 3,761,276 which was sulfur plus gold sensitized internally (in the grain core) and externally (on the grain surface) was prepared, divided into three separate portions which were adjusted to a pAg of 6.5, 7.0 and 8.0, respectively, and coated on cellulose acetate film support at a silver coverage of 4.31 grams/meter$^2$ and a gelatin coverage of 6.46 grams/meter$^2$.

Strips of the coatings were exposed to a tungsten light source in an Eastman 1B sensitometer through a continuous step wedge and processed in Kodak Developer D-19 (a surface developer), fixed, washed and dried. The photographic characteristic curves for the elements coated at pAg 6.5, 7.0 and 8.0 are shown in FIG. 19.

If one of the elements coated at a pAg 7.0 or 8.0—i.e., a high, surface desensitizing pAg level—is ultrasonically exposed according to my process so that a pAg level of 6.5 or less is obtained in ultrasonically exposed areas, it can be seen that the optimum light exposure to obtain a maximum density difference between ultrasonically exposed and unexposed areas would be at a log light exposure of about 2.4. This is above the light exposure levels which produce a maximum density in either the elements coated at pAg 7.0 or 8.0.

EXAMPLE 20

Illustrating An Embodiment With a Plurality of Varied Features

This example is essentially similar to Example 15, except as specifically stated. The pAg of the element was adjusted to 6.0 before the process was commenced. Instead of using a $1.25 \times 10^{-4}$ molar aqueous potassium bromide polar solvent solution in the ultrasonic sensitometer, distilled water was used. Light exposure was delayed for 40 seconds after ultrasound exposure. The light source was supplied with a slightly higher voltage, 28 volts as compared with 24 volts in Example 15, resulting in an intensity of 65,000 lux (lumen/m$^2$) as compared with 43,000 lux in Example 15.

Whereas in Example 15 the element was ultrasonographically positive-working, in this example the element was ultrasonographically negative-working. This is attributable to the choice of polar solvent and the adjustment of the pAg of the element before commencing process. Significantly better imaging sensitivity was observed as compared with the preceding examples that demonstrate ultrasonographically negative-working element imaging.

EXAMPLE 21

Illustrating Ultrasonographic Imaging Using an Integral Format Image Transfer Element Integral format image transfer photographic elements were employed for use in this example which were essentially similar in construction to those of Element 10, Example 48, Leone et al U.S. Pat. No. 4,030,925, except that the processing composition employed lacked carbon as an ingredient. The purpose of omitting the carbon was to permit light exposure of the silver halide emulsion layers after the processing composition had been spread between the integral imaging receiver and the cover sheet sections of the elements. Prior to use in the practice of this process the elements were each uniformly light exposed with white light to a degree slightly greater than that required to prevent dye transfer in ordinary use as a photographic element. The purpose of this initial exposure was to cause the silver halide emulsion layers to be reversed in a photographic sense, thereby being converted from direct-positive emulsions to photographically negative-working. The photographic elements were ultrasonographically positive-working.

Within 5 seconds of initial light exposure one element was placed in contact with a test object adjacent its integral imaging receiver surface, immersed in a water transport liquid bath at 20° C. and ultrasonically exposed with the test object interposed between the image transfer element and an ultrasonic trnasducer immersed in the bath. The test object was a butyl rubber (high ultrasound absorptive) isosceles triangle 40 by 50 by 50 mm on an edge having an 8 mm diameter circular hole near its center bonded to a 40 micron thick ultrasonically transparent poly(ethylene terephthalate) film sheet. The ultrasonic transducer used for exposure had a square active emitting surface facing the image transfer element of 19.8 cm$^2$. The transducer was operated at 5 megahertz to supply a peak power intensity at the test object plane of 540 milliwatts/cm$^2$. Ultrasound exposure was for 20 seconds. Ten seconds after the termination of ultrasound exposure the image transfer element was light exposed through the cover sheet surface with a Bauer E-16 electronic flash unit at a distance of 25 cm through a filter having a neutral density of 2.0. The photographic processing was allowed to proceed in the dark for 5 minutes following the second light exposure.

A clear image of the butyl rubber portion of the test object was produced. In the areas where the rubber triangle intercepted the exposing ultrasound a dark (almost black) red was produced while background, ultrasonically exposed areas were light red with a light cross-hatched pattern due to the diffraction effects in the ultrasonic radiation emitted from the square transducer.

When the procedure described above was repeated with a second image transfer element, but with ultrasound exposure being made through the cover sheet surface of the element, the results were essentially the same. This indicated that the image transfer element can be ultrasonically exposed through either major surface.

When the procedure described above was repeated with a third image transfer element, but with a second light exposure occurring through a neutral density filter of 1.0 and a 1.2 density orange filter, the ultrasonically unexposed areas were a dark (almost black) blue while the background areas were a cross-hatched light blue. This illustrated that only monochromatic light exposure of the image transfer element is required for imaging.

Using a fourth image transfer element, the procedure employed with the first element was repeated, except that ultrasonic exposure was for 40 seconds and the second light exposure was made by turning on the room fluorescent lights. The 5 minutes of processing which followed occurred then in room light. The ultrasonically unexposed areas were a dark, yellowish-green while background areas were a canary yellow.

When procedures essentially similar to those described above, but with the test object removed, were performed, the result was in each instance a colored cross-hatched pattern on a dark, essentially black background. The colored pattern was a rendition of the ultrasound diffraction pattern emitted by the ultrasonic transducer to the image transfer elements. Thus, in addition to being useful in producing ultrasonographic images of objects the image transfer elements were demonstrated to be useful in mapping the pattern of ultrasonic energy incident on the image transfer element.

To illustrate the applicability of the procedure to an image transfer photographic element of a peel apart format the edges of one of the image transfer elements were cut off to remove the edge bonding of the integral imaging receiver and the cover sheet sections of the element. When the element was immersed in the water bath, the processing solution between the cover sheet section and integral imaging receiver section remained in place and effectively sealed the edges to water ingress. Imaging effects similar to those described above were obtained, indicating that the procedure described above can be applied to either a peel apart or an integral format image transfer element.

In addition to the colors described above in ultrasonically unexposed areas, magenta and cyan cross-hatched patterns were also obtained using varied exposure conditions. Thus, a variety of pattern colors are attainable.

EXAMPLE 22

Illustrating the Use of Air as a Transport Medium

For use as an exposure apparatus, a Branson Sonifier (trademark) Model J32 was equipped with a titanium ultrasound transducer. The transducer was driven to emit an average ultrasound intensity level of approximately 75 watts/cm$^2$ at its tip at a frequency of 20 kilohertz. The element to be exposed was mounted beneath the tip of the ultrasonic transducer at a spacing of 1.5 mm. The element was supported on a transparent glass plate which was in turn supported by a lamp housing containing a 15 watt tungsten lamp spaced from the element by a distance of approximately 4 centimeters.

In the first series of exposures a photographic element was employed similar to that of Example 1, but lacking a desensitizing dye. The element was subdivided into Samples A, B and C. Sample A was exposed to light only for 30 seconds. Sample B was exposed to ultrasound only for 30 seconds. Sample C was exposed to light and ultrasound concurrently for 30 seconds. The samples were thereafter identically developed for 3 minutes in Kodak Rapid X-ray Developer, fixed, washed and dried. Sample A was substantially uniformly fogged. Sample B was not fogged, indicating that the intensity of ultrasound was insufficient to produce a developable latent image in the silver halide grains of the photographic element. Sample C was fogged, but in areas closest to the ultrasonic transducer the density was appreciably higher, indicating that the combined effect of the ultrasound and light was rendering the photographic element capable of forming a greater density.

A second series of exposures were undertaken substantially as described above, except that a photographic element like that of Example 1 was employed and a paper clip was interposed between the photographic element and the ultrasonic transducer to act as a test object for purposes of imaging. The test object did not contact ultrasonic transducer. The effect of the desensitizing dye was to reduce the initial sensitivity of the photographic element to light, thereby reducing the fog levels resulting from light exposure. Sample A, which received only a light exposure, showed no image. This was expected, since the test object was not between the lamp and the photographic element. Samples B and C simultaneously received light and ultrasound exposure. In the case of Sample B the test object was removed, while in the case of Sample C the test object was present. Subsequent to photographic processing as described above Sample B was darkened over an area adjacent the ultrasonic transducer. The image produced was an image of the pattern of ultrasonic exposure in the absence of the test object. Sample C also showed some darkening in the area nearest the ultrasonic transducer; however, the outline of the paper clip could also be seen extending out from the area closest to the ultrasonic transducer. This illustrated that imaging is possible according to this process using air as a transport medium.

EXAMPLE 23

Illustrating the Effects of Undercoating the Silver Halide Emulsion Layer or Layers Except as otherwise indicated the photographic elements were as described in Example 1 and the exposure apparatus for both ultrasound and light was as described in Example 15. The delay between ultrasonic and light exposure was 30 seconds and light exposure was for 16 seconds.

Three photographic elements were exposed differing in the following aspects: One of the photographic elements was coated with neither an undercoat or overcoat layer for the silver bromide emulsion layer. A second photographic element was coated with an overcoat layer of gelatin and a third photographic element was coated with an undercoat layer of gelatin. The photographic elements exhibited no significant difference in ultrasonic sensitivity. The element coated with an overcoat layer produced a lower discrimination (maximum density divided by minimum density) and a lower maximum density. The photographic element provided with a gelatin undercoat (that is, between the emulsion layer and the support) exhibited a higher maximum density and a higher discrimination. The increase in maximum density observed as compared to the control lacking either an overcoat or undercoat layer was approximately 1.0. This demonstrated a very significant advantage to employing an undercoat layer.

To investigate subdividing the silver halide emulsion layer a photographic element was prepared as described above having an emulsion layer and a gelatin undercoat. Two additional photographic elements were prepared using the same coating coverages of silver halide emulsion and gelatin, but subdividing the emulsion and gelatin into multiple layers. One of the elements had coated on the support a gelatin layer, an emulsion layer, a gelatin layer and an emulsion layer. The remaining element had three gelatin layers and three emulsion layers coated in the same sequence as the previous element. The ultrasonographic characteristic curves obtained demonstrated that the photographic elements each had the same sensitivity to ultrasound. The element having the single emulsion and single gelatin undercoat layers exhibited the lowest image discrimination and lowest maximum density. The element having two emulsion and two gelatin layers showed a significant enhancement in maximum density and image discrimination while the element having three emulsion layers and three gelatin layers showed a further enhancement in maximum density and image discrimination. This demonstrated the advantage of coating the silver halide emulsion as a plurality of layers rather than a single layer and in incorporating hydrophilic colloid layers between adjacent emulsion layers.

The invention has been described with particular reference to preferred embodiments thereof but it will be understood that variations and modifications can be effected within the spirit and scope of the invention.

What is claimed is:

1. A process of forming an ultrasonographic image employing a silver halide emulsion layer containing photographic element comprising imagewise exposing the photographic element to ultrasonic radiation at an intensity and for a duration sufficient to alter the exposure response of the element to electromagnetic radiation, but below that which will produce a latent image in the absence of externally applied electromagnetic radiation, the ultrasonic energy applied to the photographic element being less than 100 watt-sec/cm$^2$;

exposing the element to electromagnetic radiation, thereby producing a latent image therein defined by the ultrasonic radiation exposure; and photographically processing the element to produce a visible image corresponding to the latent image.

2. A process according to claim 1 wherein at least the silver halide emulsion layer of the photographic element is in contact with a transport liquid during ultrasonic exposure.

3. A process according to claim 2 wherein the transport liquid is a polar solvent.

4. A process according to claim 3 wherein the photographic element is selected from among those which when contacted with the polar solvent exhibit a variance in density of at least 0.1 when exposed to the electromagnetic radiation in accordance with the electromagnetic exposure step at selected time periods ranging from 10 seconds to 10 hours following contact with the polar solvent and then photographically processed in accordance with the visible image forming step.

5. A process according to claim 4 wherein the photographic element is selected from among those which when immersed in the polar solvent exhibit a variance in density of at least 0.3 when exposed in accordance with the electromagnetic exposure step at selected time periods ranging from 10 seconds to 10 hours following immersion and then photographically processed in accordance with the visible image forming step.

6. A process according to claim 1, 2, 3, 4 or 5 wherein the emulsion layer is initially desensitized to electromagnetic radiation and is ultrasonographically negative-working.

7. A process according to claim 3, 4 or 5 wherein the emulsion layer is sufficiently desensitized to electromagnetic radiation so that when contacted with the polar solvent for 30 seconds and then given an exposure to electromagnetic radiation according to the electromagnetic exposure step and photographically processed, it exhibits a density of less than 1.0.

8. A process according to claim 7 wherein the emulsion layer is sufficiently desensitized to electromagnetic radiation so that when immersed in the polar solvent for 30 seconds and then given an exposure to electromagnetic radiation according to the electromagnetic exposure step and photographically processed, it exhibits a density less than 0.5.

9. A process according to claim 6 wherein the emulsion layer is initially desensitized by increasing the pAg of the emulsion.

10. A process according to claim 9 wherein the emulsion layer is initially desensitized by halide ion addition to elevate the pAg of the emulsion.

11. A process according to claim 10 wherein the pAg is elevated with bromide ions.

12. A process according to claim 10 wherein the pAg is elevated with chloride ions.

13. A process according to claim 9 wherein the emulsion layer contains a desensitizer in addition to halide ions.

14. A process according to claim 13 wherein the additional desensitizer becomes less desensitizing at a lower pAg.

15. A process according to claim 9 wherein the emulsion layer contains silver halide grains which exhibit a balance between surface and internal latent image forming efficiencies which can be shifted as a function of pAg and which favor internal latent image formation at the elevated pAg.

16. A process according to claim 6 wherein the element is processed in a surface developer and the emulsion layer is initially desensitized to electromagnetic radiation through the presence in the emulsion layer of silver halide grains which exhibit a balance between surface and internal latent image forming efficiencies which can be shifted as a function of pAg and which favor internal latent image formation at an elevated pAg.

17. A process according to claim 1, 2, 3, 4 or 5 wherein the emulsion layer contains silver halide grains which form either a surface or an internal latent image as a function of pAg.

18. A process according to claim 17 wherein the silver halide grains include an internal dopant and external chemical sensitization.

19. A process according to claim 18 wherein the silver halide grains are internally and externally sulfur and gold chemically sensitized.

20. A process according to claim 1, 2, 3, 4 or 5 wherein the silver halide emulsion layer contains a sensitizer.

21. A process according to claim 20 wherein the sensitizer is a spectral sensitizer and the emulsion layer is electromagnetically exposed outside its region of native spectral sensitivity and within its region of spectral sensitization.

22. A process according to claim 3, 4 or 5 wherein the silver halide emulsion layer contains a spectral sensitizer, the emulsion layer is electromagnetically exposed outside its region of native spectral sensitivity and within its region of spectral sensitization, the polar solvent is at an acid pH and ultrasonic exposure accelerates localized protonation of the spectral sensitizer to a nonsensitizing form.

23. A process according to claim 3, 4 or 5 wherein the silver halide emulsion layer contains a spectral sensitizer, the emulsion layer is electromagnetically exposed outside its region of native spectral sensitivity and within its region of spectral sensitization, the spectral sensitizer is initially in a nonsensitizing protonated form, the polar solvent is at a basic pH and ultrasonic exposure accelerates localized deprotonation of the spectral sensitizer to its spectral sensitizing form.

24. A process according to claim 21 wherein the spectral sensitizer is a quinoline or benzimidazole cyanine spectral sensitizing dye.

25. A process according to claim 6 wherein the steps of ultrasonic exposure and electromagnetic exposure are at least in part concurrently performed.

26. A process according to claim 1, 2, 3, 4 or 5 wherein the steps of ultrasonic exposure and electromagnetic exposure are sequentially performed.

27. A process according to claim 3, 4 or 5 wherein the photographic element is allowed to remain in contact with the polar solvent for a period of from 10 to 200 seconds following ultrasonic exposure and before electromagnetic exposure.

28. A process according to claim 3, 4 or 5 wherein the photographic element is allowed to remain in contact with the polar solvent for a period of from 15 to 50 seconds following ultrasonic exposure and before electromagnetic exposure.

29. A process according to claim 1, 2, 3, 4 or 5 wherein the ultrasonic frequencies employed are in all instances greater than 1 megahertz.

30. A process according to claim 1, 2, 3, 4 or 5 wherein the ultrasonic radiation applied to the emulsion layer during imagewise ultrasonic radiation exposure is pulsed.

31. A process according to claim 30 wherein the pulses and duration between pulses are less than 0.1 second.

32. A process according to claim 1, 2, 3, 4 or 5 wherein the electromagnetic radiation applied to the emulsion layer is pulsed.

33. A process according to claim 32 wherein the pulsed electromagnetic radiation is applied at an average intensity below the transition intensity for the emulsion layer.

34. A process according to claim 3, 4 or 5 wherein the polar solvent is an aqueous solution.

35. A process according to claim 34 wherein the aqueous solution is a photographic developer.

36. A process according to claim 34 wherein the aqueous solution contains a water soluble halide salt.

37. A process according to claim 36 wherein the water soluble halide salt is a water soluble bromide salt.

38. A process according to claim 34 wherein the aqueous solution contains a water soluble silver salt.

39. A process according to claim 34 wherein the element is placed in contact with the aqueous solution by being immersed therein.

40. A process according to claim 2 wherein a plurality of photographic elements are stacked together and simultaneously ultrasonically imagewise exposed.

41. A process according to claim 1, 2, 3, 4 or 5 wherein the electromagnetic exposure is at least that required to produce a density of 0.1 above the minimum density and less than that required to produce a density of 0.1 above the solarization density.

42. A process according to claim 41 wherein the electromagnetic exposure is at least that required to produce a density of 0.5 above the minimum density and less than that required to produce a density of 0.5 above the solarization density.

43. A process according to claim 1, 2, 3, 4 or 5 wherein the visible image is a dye image.

44. A process according to claim 43 wherein the dye image is formed by reacting an oxidizing agent and a dye-image-generating reducing agent in the presence of a catalytic silver image, whereby the oxidizing agent and the dye-image-generating reducing agent are chosen to be substantially inert to oxidation-reduction in the absence of a catalyst.

45. A process according to claim 1, 2, 3, 4 or 5 wherein the visible image is formed by developing the latent image to a visible silver image.

46. A process according to claim 1, 2, 3, 4 or 5 wherein the photographic element is provided with a support and with a transport liquid permeable layer in contact with the silver halide emulsion layer and interposed between the emulsion layer and the support.

47. A process according to claim 46 wherein the photographic element is provided with a plurality of silver halide emulsion layers and with a plurality of transport liquid permeable layers each being interposed between the support and a contiguous silver halide emulsion layer.

48. A process of forming a visible image employing a silver halide emulsion layer containing photographic element wherein the emulsion layer contains silver halide grains and, adsorbed thereon, a substance chosen from among silver halide emulsion addenda which are diffusible in a polar solvent and which are capable of altering the sensitivity of the silver halide grains to electromagnetic radiation when adsorbed comprising imagewise exposing the emulsion layer, while in contact with a polar solvent, to ultrasonic radiation at an intensity and for a duration sufficient to alter the exposure response of the emulsion layer to electromagnetic radiation, but below that which will produce a latent image in the absence of externally applied electromagnetic radiation, the ultrasonic energy applied to the photographic element being less than 100 watt-sec/cm$^2$, nonimagewise exposing the element to electromagnetic radiation, thereby producing a latent image therein defined by the ultrasonic radiation exposure, and photographically processing the latent image to form a visible image corresponding to the latent image.

49. A process of forming a visible image employing a silver halide emulsion layer containing photographic element wherein the emulsion layer contains silver halide grains, and adsorbed thereon, a substance chosen from among silver halide emulsion addenda which are capable of altering the sensitivity of the silver halide grains to electromagnetic radiation when adsorbed and which can be modified by a chemically diffusible reactant to alter their influence on the sensitivity of the silver halide grains comprising imagewise exposing the emulsion layer, while in contact with the diffusible reactant, to ultrasonic radiation at an intensity and for a duration sufficient to alter the exposure response of the emulsion layer to electromagnetic radiation, but below that which will produce a latent image in the absence of externally applied electromagnetic radiation, the ultrasonic energy applied to the photographic element being less than 100 watt-sec/cm$^2$, nonimagewise exposing the element to electromagnetic radiation, thereby producing a latent image therein defined by the ultrasonic radiation exposure, and photographically processing the latent image to form a visible image corresponding to the latent image.

50. A process of forming a visible image employing a silver halide emulsion layer containing photographic element wherein the pAg of the emulsion layer has been adjusted to a light desensitizing level comprising imagewise exposing the emulsion layer, while in contact with a polar solvent, to ultrasonic radiation at an intensity and for a duration sufficient to increase the exposure response to the emulsion layer to electromagnetic radiation, but below that which will produce a latent image in the absence of externally applied electromagentic radiation, the ultrasonic energy applied to the photographic element being less than 100 watt-sec/cm$^2$, nonimagewise exposing the element to electromagnetic radiation, thereby producing a selectively developable surface latent image therein defined by the ultrasonic radiation exposure, and photographically processing the selectively developable latent image with a surface developer to form a visible image corresponding to the latent image.

51. A process according to claim 50 wherein the emulsion layer includes a desensitizer.

52. A process according to claim 51 wherein the desensitizer becomes less desensitizing at a lower pAg.

53. A process according to claim 50 wherein the pAg of the emulsion layer is adjusted to a desensitizing level with bromide or chloride ions.

54. A process according to claim 50 wherein ultrasonic radiation exposure is pulsed and the pulses and the duration between pulses are less than 0.1 second.

55. A process according to claim 50 wherein ultrasonic and electromagnetic exposure is sequentially performed and an interval of from 10 to 200 seconds occurs therebetween.

56. A process of forming a visible image employing a silver halide emulsion layer containing a photographic element wherein the emulsion layer contains a spectral sensitizing dye which can be protonated to a colorless form comprising imagewise exposing the emulsion layer, while in contact with an acid polar solvent, to ultrasonic radiation at an intensity and for a duration sufficient to accelerate protonation of the spectral sensitizing dye to its colorless form in exposed areas, but below that which will produce a latent image in the absence of externally applied electromagnetic radiation, the ultrasonic energy applied to the photographic element being less than 100 watt-sec/cm$^2$, nonimagewise exposing the element to electromagnetic radiation of a wavelength which can be absorbed by the ultrasonically unexposed spectral sensitizing dye to produce a latent image therein defined by the ultrasonic radiation exposure, and photographically processing the latent image to a visible image corresponding to the latent image.

57. A process of forming a visible image employing a silver halide emulsion layer of a photographic element wherein the emulsion layer contains a protonated precursor of a spectral sensitizing dye comprising imagewise exposing the emulsion layer, while in contact with a basic polar solvent, to ultrasonic radiation at an intensity and for a duration sufficient to accelerate deprotonation of the precursor to a spectral sensitizing dye in exposed areas, but below that which will produce a latent image in the absence of externally applied electromagnetic radiation, the ultrasonic energy applied to the photographic element being less than 100 watt-sec/cm$^2$, nonimagewise exposing the element to electromagnetic radiation of a wavelength which can be absorbed by the ultrasonically produced spectral sensitizing dye, thereby producing a latent image therein defined by the ultrasonic radiation exposure, and photographically processing the latent image to form a visible image corresponding to the latent image.

58. A process of forming a visible image employing a silver halide emulsion layer containing a photographic element wherein the emulsion layer contains silver halide grains which form either an internal or a surface latent image as a function of pAg, imagewise exposing the emulsion layer, while in contact with a polar solvent capable of altering its pAg, to ultrasonic radiation at an intensity and for a duration sufficient to imagewise accelerate alteration of the pAg of the emulsion layer, but below that which will produce a latent image in the absence of externally applied electromagnetic radiation, the ultrasonic energy applied to the photographic element being less than 100 watt-sec/cm$^2$, nonimagewise exposing the element to electromagnetic radiation, thereby producing an internal latent image in the emulsion layer therein defined by the ultrasonic radiation exposure, forming a surface latent image in the emulsion layer which is a complement of the internal latent image, and photographically processing the element with a surface developer in forming a visible image corresponding to the latent image.

59. A process according to claim 58 wherein the surface and internal latent images are concurrently formed by electromagnetic radiation exposure.

60. A process according to claim 58 wherein the emulsion layer is at a pAg prior to ultrasonic exposure which favors the formation of an internal latent image.

61. A process according to claim 58 wherein the silver halide grains are of the converted-halide type.

62. A process according to claim 58 wherein the silver halide grains contain an internal dopant and surface chemical sensitization.

63. A process according to claim 62 wherein the silver halide grains are internally doped with a middle chalogen and a noble metal sensitizer.

* * * * *